United States Patent
Wang

(10) Patent No.: US 11,606,667 B2
(45) Date of Patent: Mar. 14, 2023

(54) PRECISE POSITIONING SYSTEM AND METHOD OF USING THE SAME

(71) Applicant: WangLabs, LLC, Marlboro, NJ (US)

(72) Inventor: Michael Wang, Marlboro, NJ (US)

(73) Assignee: WangsLabs, LLC, Marlboro, NJ (US)

( * ) Notice: Subject to any disclaimer, the term of this patent is extended or adjusted under 35 U.S.C. 154(b) by 0 days.

(21) Appl. No.: 15/924,142

(22) Filed: Mar. 16, 2018

(65) Prior Publication Data

US 2018/0288569 A1 Oct. 4, 2018

Related U.S. Application Data

(60) Provisional application No. 62/560,148, filed on Sep. 18, 2017, provisional application No. 62/472,898, filed on Mar. 17, 2017.

(51) Int. Cl.
| | |
|---|---|
| *G01S 5/14* | (2006.01) |
| *H04W 4/02* | (2018.01) |
| *H04W 4/33* | (2018.01) |
| *H04W 4/029* | (2018.01) |
| *G01S 1/04* | (2006.01) |
| *H04W 84/18* | (2009.01) |

(Continued)

(52) U.S. Cl.
CPC .......... *H04W 4/023* (2013.01); *G01S 1/0428* (2019.08); *G01S 5/14* (2013.01); *H04W 4/025* (2013.01); *H04W 4/029* (2018.02); *H04W 4/33* (2018.02); *H04W 4/024* (2018.02); *H04W 64/003* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 4,305,074 A | * | 12/1981 | Barzana | ............... G01S 13/42 |
| | | | | 342/100 |
| 6,433,742 B1 | * | 8/2002 | Crawford | ............... H01Q 1/242 |
| | | | | 343/700 MS |
| 2004/0152420 A1 | | 8/2004 | Redi et al. | |

(Continued)

FOREIGN PATENT DOCUMENTS

| | | |
|---|---|---|
| CN | 103858995 A | 6/2014 |
| CN | 104837118 A | 8/2015 |

(Continued)

OTHER PUBLICATIONS

International Search Report for PCT/US18/0023028, dated Jun. 11, 2018 (11-pages).

(Continued)

*Primary Examiner* — German Viana Di Prisco

(74) *Attorney, Agent, or Firm* — Joseph Farco; Norris McLaughlin PA

(57) ABSTRACT

A location system, comprises multiple nodes, each of which receiving and transmitting signals from and to user equipment. The system further comprises a processor configured to determine a location of the user equipment in a space having at least one node. The system is configured to interprets the location of the user equipment based on power of at least one signal transmitted to at least one of the nodes, a received signal strength of the user equipment at one of the nodes, and distances between the user device and at least two nodes.

68 Claims, 30 Drawing Sheets

(51) Int. Cl.
*H04W 64/00* (2009.01)
*H04W 4/024* (2018.01)

(56) References Cited

U.S. PATENT DOCUMENTS

| | | |
|---|---|---|
| 2005/0195109 A1 | 9/2005 | Davi |
| 2011/0105097 A1 | 5/2011 | Tadayon |
| 2012/0039310 A1 | 2/2012 | Dahl et al. |
| 2013/0103608 A1* | 4/2013 | Scipioni ................ G06Q 30/02 705/346 |
| 2013/0207843 A1* | 8/2013 | McGowan ............... H01Q 3/40 342/373 |
| 2013/0324147 A1 | 12/2013 | Ong et al. |
| 2014/0287772 A1* | 9/2014 | Saunders .............. H04W 4/029 455/456.1 |
| 2014/0327579 A1 | 11/2014 | Hart et al. |
| 2014/0361078 A1* | 12/2014 | Davidson ........... G06K 7/10356 235/385 |
| 2015/0119079 A1* | 4/2015 | Tarlazzi ................ H04W 24/00 455/456.1 |
| 2015/0327018 A1 | 11/2015 | Rehnberg et al. |
| 2015/0355308 A1 | 12/2015 | Ishida |
| 2016/0043478 A1* | 2/2016 | Hartenstein .......... H01Q 1/2291 343/835 |
| 2016/0069978 A1 | 3/2016 | Rangarajan et al. |
| 2016/0323754 A1* | 11/2016 | Friday ..................... H04W 4/80 |
| 2016/0341811 A1* | 11/2016 | Langlois ............... G01S 5/0284 |
| 2016/0343187 A1* | 11/2016 | Trani .................... H04W 4/021 |
| 2018/0006688 A1* | 1/2018 | Cariou ................. H04B 7/0452 |

FOREIGN PATENT DOCUMENTS

| | | |
|---|---|---|
| CN | 106105054 A | 11/2016 |
| WO | 2015104224 A1 | 7/2015 |

OTHER PUBLICATIONS

EP Search Report for corresponding application EP18767621.8 dated Jan. 19, 2021.
CN Office Action issued in corresponding related application CN 201880032952.8 dated Sep. 28, 2022, and translation.
CN Search Report issued in corresponding related application CN 201880032952.8 dated Sep. 22, 2022.

* cited by examiner

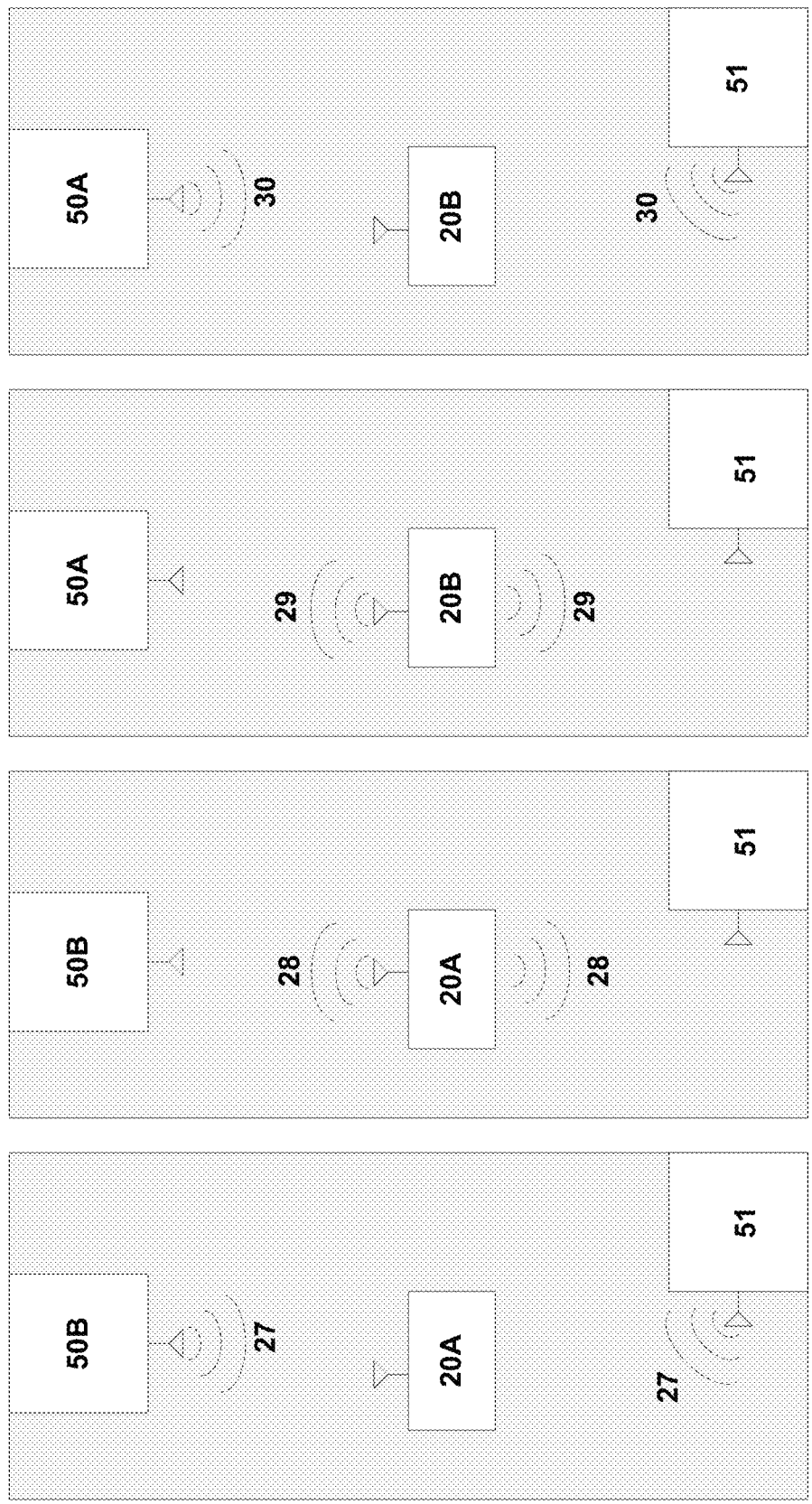

PRECISE POSITIONING SYSTEM AND METHOD OF USING THE SAME

RELATED PATENT APPLICATIONS

This application claims the benefit of priority of U.S. Provisional Patent Application Ser. No. 62/472,898, filed Mar. 17, 2017, U.S. Provisional Patent Application Ser. No. 62/560,148, filed Sep. 18, 2017, the disclosures of each of which being incorporated herein by reference in their entirety.

FIELD OF THE INVENTION

One use for the invention is to establish a Precise Positioning System (PPS) using wireless technology. Another use for the invention is to establish a method for operating a PPS. In each system and method for PPS, therein lies additional devices, structures, and architectures (including software architecture and/or algorithms) to enable precision in enclosed space positioning determinations. And while the PPS may be preferably used in indoor spaces, any space, including partially or completely open spaces (i.e., not indoors), may benefit from use of the systems and methods disclosed.

In one aspect, an exemplary PPS reduces the impact of noise on positioning performance. In another aspect, an exemplary PPS reduces the impact of interferences, including multipath interferences, on positioning performance. In still another aspect, an exemplary PPS reduces the impact of in-building wall attenuation on positioning performance. And in yet another aspect, an exemplary PPS includes reductions in antenna radiation pattern impairment.

There are various applications using a PPS to solve specific problems with locating objects in a space, whether indoor, outdoor, or a hybrid of the two.

SUMMARY

A location system comprises a plurality of nodes, wherein each of the plurality of nodes receives and transmits signals from a user equipment device and a processor configured to determine a location of the user equipment device in a space having at least one of the plurality of nodes, wherein the processor interprets the location of the user equipment device based on power of at least one signal transmitted to at least one of the plurality of nodes, a received signal strength of the user equipment device at the at least one of the plurality of nodes, and distances between the user device and at least two of the plurality of nodes.

An exemplary location system as previously stated may have its processor located within the user equipment device.

An exemplary location system as previously stated may have its processor located within at least one of the plurality of nodes An exemplary location system as previously stated may have a processor located within each of the plurality of nodes.

An exemplary location system as previously stated may have the processor interpret the location of the user equipment device based on information from a network server connected to one of the user equipment device or one of the plurality of nodes.

An exemplary location system as previously stated may operate in a space having a plurality of nodes.

An exemplary location system as previously stated may operate in a space having at least three nodes, wherein each of the at least three nodes may measure received signal strengths of at least one other node as well as the user equipment device.

An exemplary location system as previously stated may identify the location of the user equipment device based on a pair of distances and received signal strengths between at least two nodes.

An exemplary location system as previously stated where the space contained at least four nodes and each of the at least four nodes receives signals of substantially equal power from the user equipment device.

An exemplary location system may also have a processor that interprets the location of the user equipment device based on a ratio of received signal strengths of the user equipment device from at least two of the at least four nodes.

A location unit comprises at least one transceiver, a processor coupled to the at least one transceiver, a casing enclosing the processor and the at least one transceiver, and a plurality of antenna coupled to the at least one transceiver, wherein each of the plurality of antenna has an operational angle defined by the casing, and wherein the plurality of antenna achieve a uniform antenna gain for a plurality of positions about the casing.

The location unit may also have a plurality of antenna with a unique received signal strength that varies with the operational angle for each of the plurality of antenna. In another embodiment, each of the plurality of antenna may be offset from one another about the casing and share operational angles with at least one of the plurality of antenna. Alternatively, each of the plurality of antenna are offset from one another about the casing and possess non-overlapping operational angles.

The location unit may also have a transceiver coupled to each of the plurality of antenna.

The location unit may also include a processor that encodes a data packet based on which antenna in the plurality of antenna is used to transmit the data packet. Alternatively, each of the plurality of antenna in the location unit may transmit a plurality of data packets simultaneously.

An object position location methodology may include receiving an advertising signal from a user device, receiving a command signal from the user device following the advertising signal, receiving at least one communication from at least one node, calculating a distance to the at least one node based on the received signal strength of the at least one communication, and calculating a position of the user device based on at least one received signal strength of one of the advertising signal or the command signal and the distance to the at least one node.

The object position location methodology may also include receiving at least one communication from at least three nodes to calculate the position of the user device. Alternatively, the object position location methodology may obtain at least one communication from at least four nodes and calculate the position of the user device based only on ratios involving at least one received signal strength from each of the at least four nodes.

DESCRIPTION OF THE DRAWINGS

FIG. 13 illustrates an exemplary slave node and master user equipment combination for a PPS.

FIG. 14 illustrates another exemplary slave node and master user equipment combination for a PPS.

FIG. 15 illustrates an exemplary master node and slave user equipment combination for a PPS.

FIG. 16 illustrates another exemplary master node and slave user equipment combination for a PPS.

Figure 1:
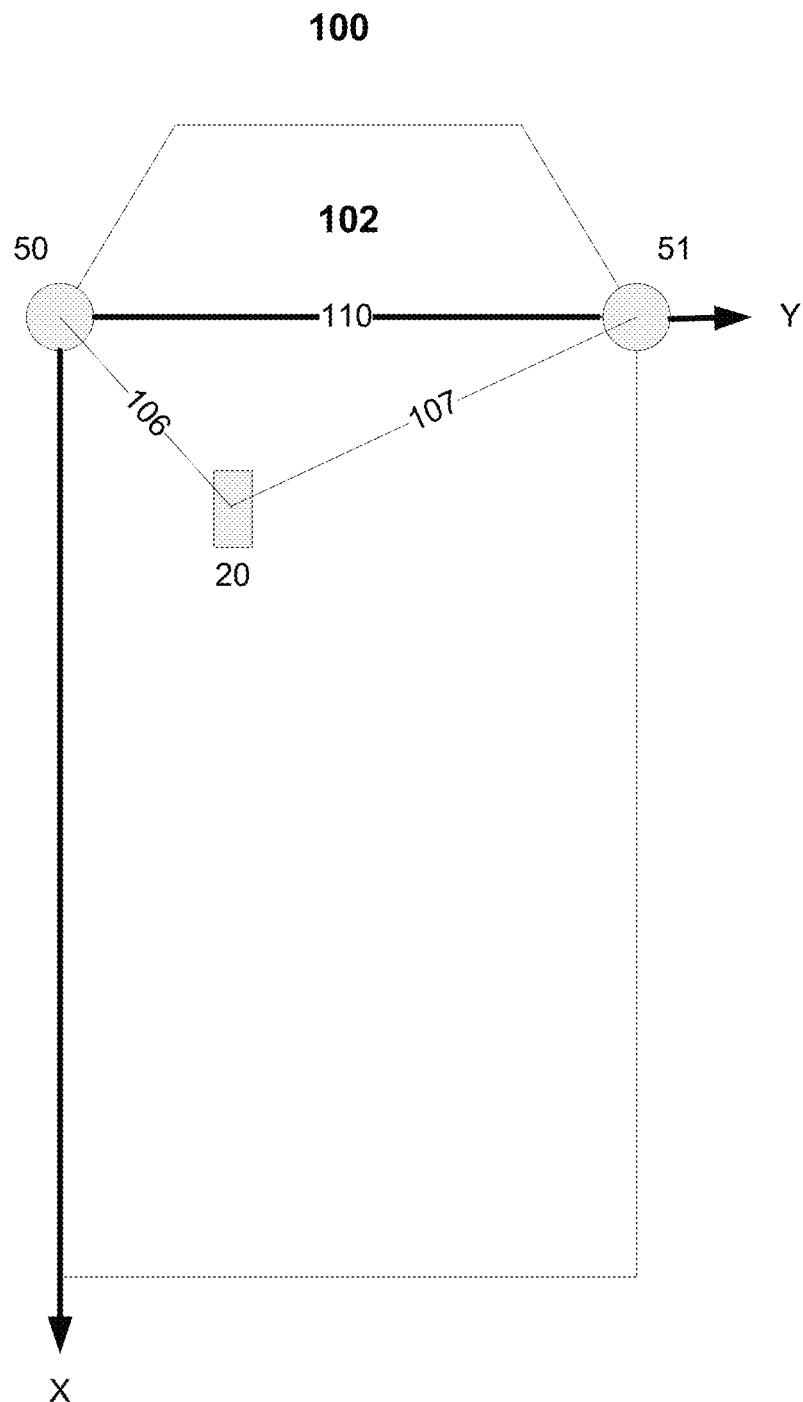
FIG. 1 illustrates an exemplary two-dimensional PPS.

In the drawings like characters of reference indicate corresponding parts in the different and interchangeable and interrelated figures. Parts and components of each figure may be substitutes for other components in other figures to achieve the various methods and embodiments disclosed herein. Methods and protocols disclosed in any embodiment may be run in any order so as to affect their disclosed goals and/or enable performance of the systems as described. Additionally, any one embodiment may utilize any method or protocol described and in any portions, sequences, and combinations thereof.

DETAILED DESCRIPTION

For purposes of the disclosures herein, the following terms and understandings of the same apply unless otherwise indicated by the record for this case. A node represents a wireless device/station that may be installed on or within a stationary object in a space (e.g., a wall, ceiling, floor, a piece of furniture) or on or within a mobile object (e.g., an automobile) and in any location that acts to position an object. The node may use any wireless technology known to those skilled in the art that is able to transmit electronic, optical, infrared, or acoustic signal, such as, for example, Bluetooth Low Energy ("BLE").

In a preferred embodiment, one or more nodes are used for a PPS. An exemplary PPS may estimate the coordinates (e.g., Cartesian (x, y, z) location) of user equipment ("UE"). An exemplary UE may take the form of a cellular phone, a wearable device or a tag placed on any object, or other machinery capable of receiving and/or transmitting systems. An exemplary PPS may include multiple nodes, at least one UE, an Internet access point (e.g., WiFi, 3G/4G/5G, or iPhone), and a cloud server (FIG. 23) for database management and data analytics.

PPS Embodiments

According to the illustrative exemplary embodiment depicted in FIG. 1, a 2-dimensional ("2D") PPS measurement system 100 may have at least two nodes, 50 and 51, that can estimate Cartesian coordinate (x, y) position for an UE 20. One example application is an in-car seat positioning system, where the UE 20 may be a smartphone or any other device that can receive signals from the nodes 50, 51. In this exemplary application, a 2D PPS 100 may allow a node 50, 51 located inside an automobile 102 to accurately identify in which part of the automobile each person is found. With knowledge of the location of each passenger in an automobile 102, the resultant information may enable personalized adjustments to enhance safety and comfort. The location of UE 20 vis-à-vis a first node 50 may be determined by the system 100 as position 106, while the location of UE 20 vis-à-vis a second node 51 may be determined by the system 100 as position 107. The location of the first node 50 vis-à-vis the second node 51 may be determined by the system 100 as position 110.

Figure 2:
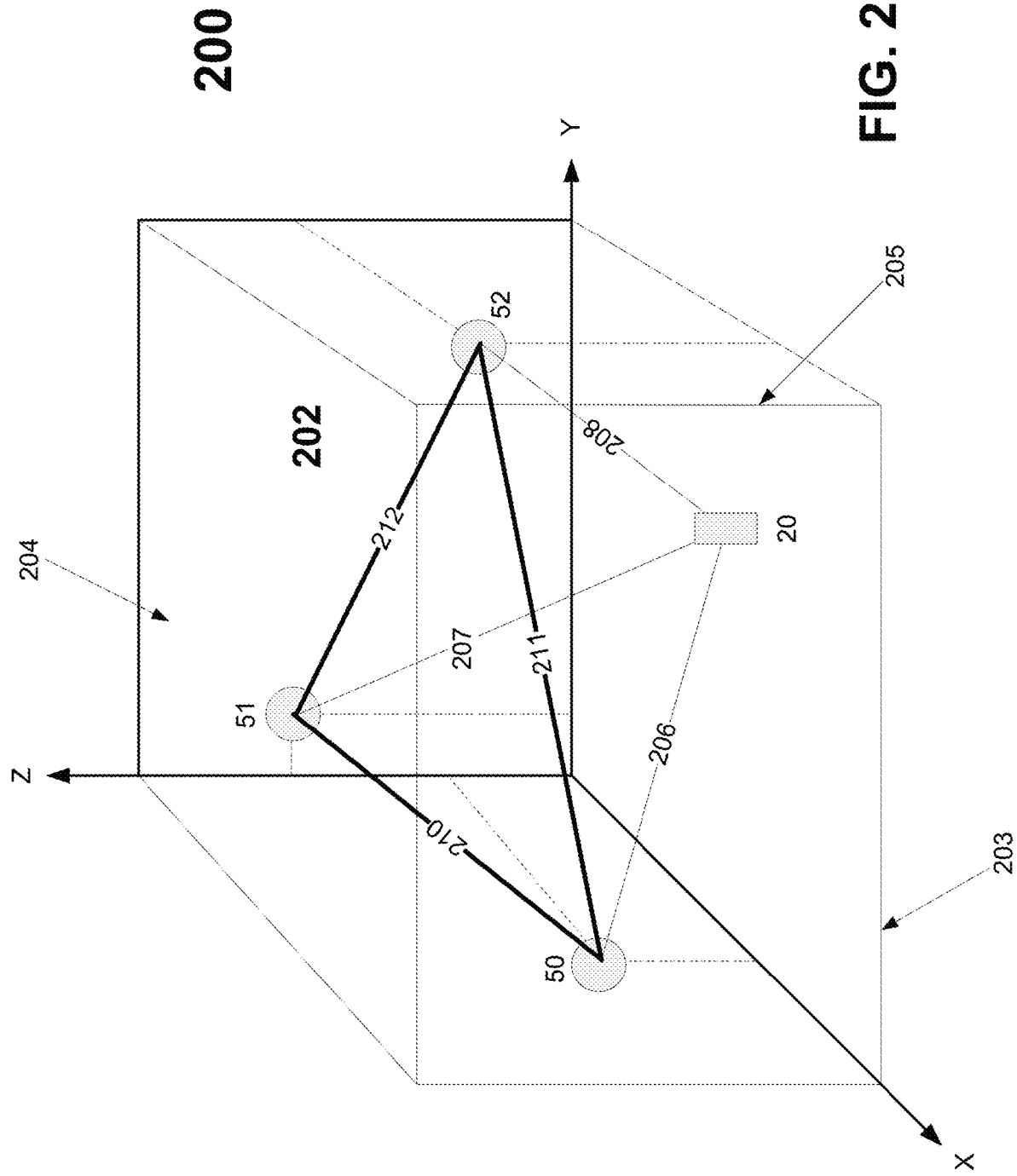
FIG. 2 illustrates an exemplary three-dimensional PPS.

According to the illustrative exemplary embodiment depicted in FIG. 2, a 3D PPS measurement system 200 requires at least three nodes, 50, 51, and 52, for use in estimating the Cartesian coordinate position (x, y, z) for the UE 20 within an enclosure 202, such as, for example, a room of a dwelling or retailer. In this illustrative example, each of nodes 50, 51, and 52 may be mounted or affixed to a wall 205 of the enclosure 202. An UE 20 may be located at a point between the walls 205 of the enclosure 202 as well as the enclosure floor 203 and ceiling 204. The location of UE 20 vis-à-vis a first node 50 may be determined by the system 200 as position 206, the location of UE 20 vis-à-vis a second node 51 may be determined by the system 200 as position 207, and the location of UE 20 vis-à-vis a second node 52 may be determined by the system 200 as position 208. The location of the first node 50 vis-à-vis the second node 51 may be determined by the system 200 as position 210, the location of the first node 50 vis-à-vis the third node 52 may be determined by the system 200 as position 211, and the location of the second node 51 vis-à-vis the third node 52 may be determined by the system 200 as position 212.

Figure 3:
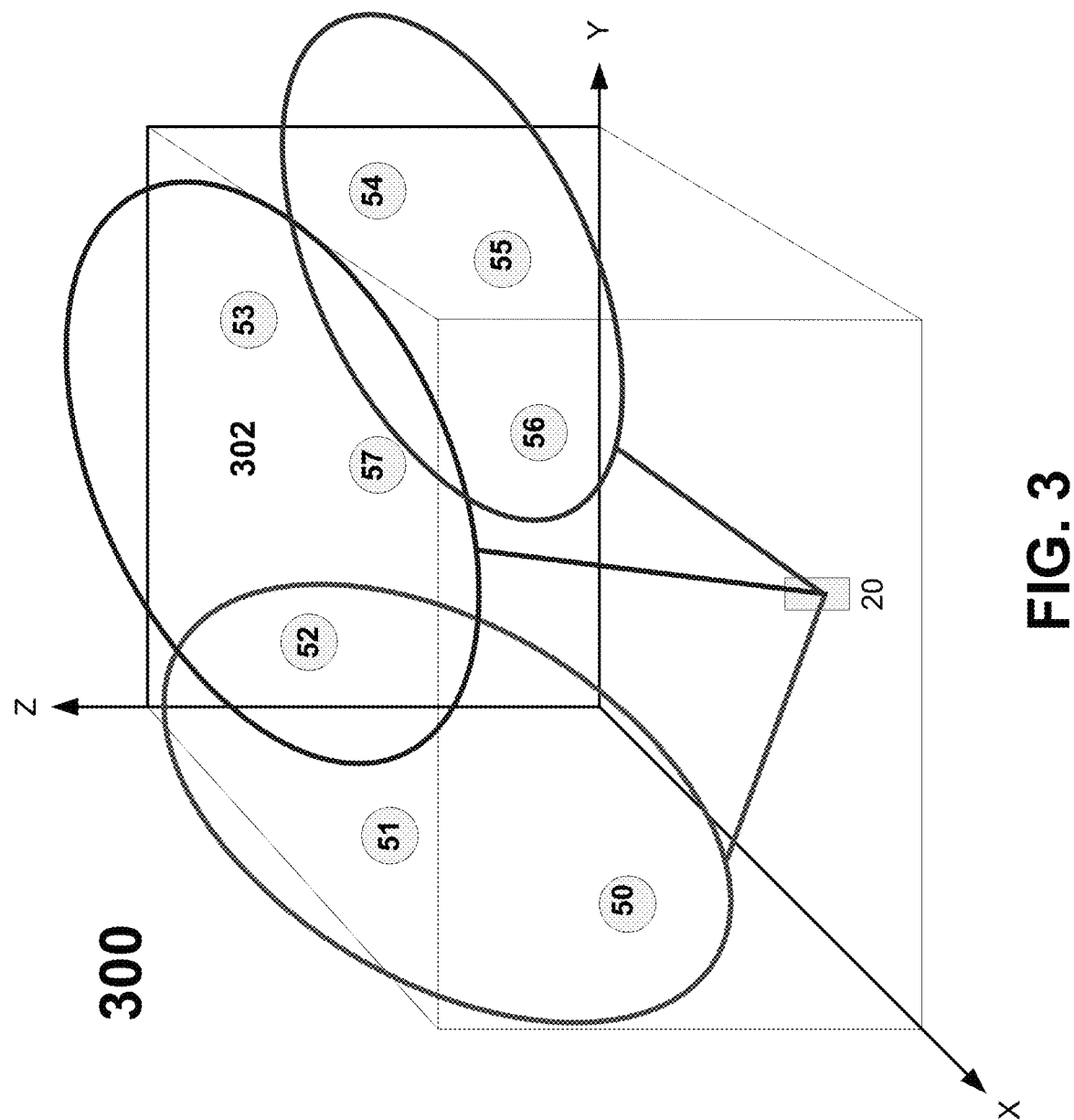
FIG. 3 illustrates an exemplary node network PPS.

According to the illustrative exemplary embodiment depicted in FIG. 3, a network of nodes 50-57 within a PPS measurement system 300 may be utilized in an enclosure 302, such as a room, to construct a 2D PPS 100, a 3D PPS 200, or a combination of the same. In accordance with the disclosures herein, an increase in the number of nodes and array of positions within an exemplary system, including systems 100, 200, or 300, improves position resolution and better performance by filtering out more noise and reducing multipath signals and signal interference by way of increasing spatial diversity.

In an exemplary embodiment according to the teachings related to FIG. 3, one benefit of using increased number of nodes in an exemplary PPS 100, 200, or 300 is an increased number of permutations of locating a given UE 20 in a 2D or 3D space. For example, in a 3D enclosure, 302, the total number of possible determined locations of a UE 20 in three dimensional Cartesian coordinates is as follows in Equation 1:

$$C_N^3 = \frac{N!}{(N-3)! * 3!} = \frac{N*(N-1)*(N-2)}{6} \quad \text{Equation 1}$$

According to the aforementioned exemplary embodiment, there may be a total of $C_N^3$ number of measurements for a single UE 20. Each measurement measures the UE's position from a different orientation in space. By further filtering the multiple measurements, the noise, interference and multipath may be reduced. In one aspect of this exemplary embodiment, multiple measurements may be made by redundant nodes with the goal of increasing space diversity and filtering out noise and interference. An exemplary table provided below may illustrate how redundant nodes achieve special diversity according to the exemplary embodiment of the present invention herein described:

| Nodes (N) | 3 | 4 | 5 | 6 | 7 | 8 | 9 | 10 | 11 | 12 |
|---|---|---|---|---|---|---|---|---|---|---|
| $C_N^3$ | 1 | 4 | 10 | 20 | 35 | 56 | 84 | 120 | 165 | 220 |

Where $C_N^3$ refers to the iterations of 3D location determinations of a UE 20 in a given space. Those skilled in the art would appreciate such other permutations of 2D, 4D, etc. location determinations of a UE 20 in a given space.

Figure 4:
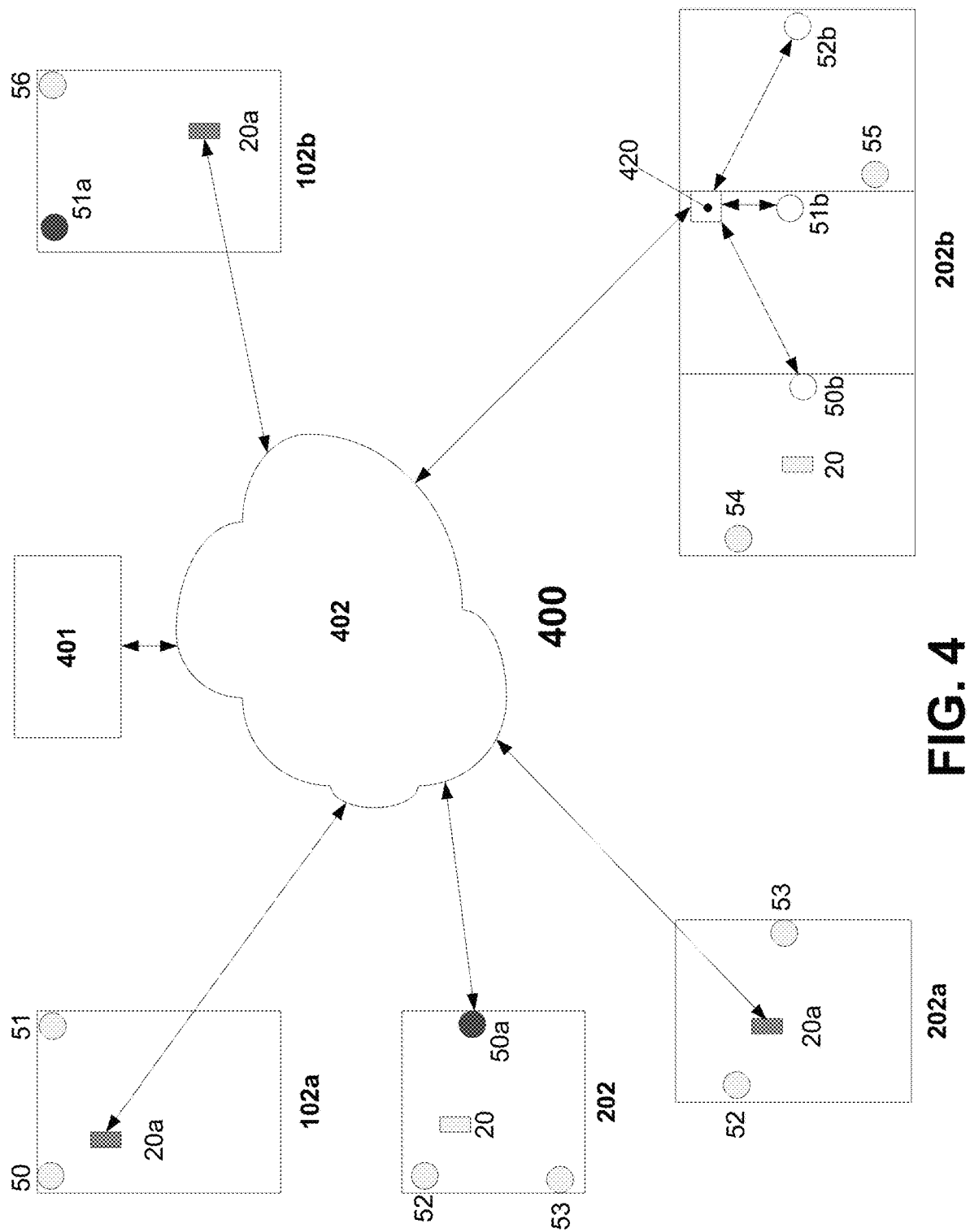
FIG. 4 illustrates an exemplary PPS with cloud server and node variety.

According to the illustrative exemplary embodiment depicted in FIG. 4, a PPS cloud network system 400 may comprise a plurality of nodes 50-56, 50a-b, 51a-b, 52b. In one embodiment, a first plurality of nodes 50-56, may be BLE-only nodes. According to this embodiment, each such node 50-56 lacks direct Internet access, but it may connect to the internet through a smartphone UE 20a. In further accordance with this embodiment, each of nodes 50a and 51a may be a combination of BLE and a 5G access point having direct internet access. In further accordance with this embodiment, each of nodes 50b, 51b, and 52b may be a combination of BLE and a WiFi access point 420. In another embodiment, a BLE node (e.g., nodes 52, 53 in enclosure 202) may connect to the Internet through a BLE+5G node (like node 50a in enclosure 202).

In an exemplary PPS cloud network system 400, a network 402 interconnecting numerous nodes 50-56, 50-51a, and 50-52b within enclosures 102, 102a-b, 202, 202a-b, or 302, or any other enclosures disclosed or known to those skilled in the art based on such disclosures provides data acquisition, database management, data analytics, and PPS control to a PPS server 401. The server 401 may take the form of a computer or network of the same for the purposes of processing, utilizing, and deriving value from the various data acquisition, database management, data analytics, and PPS controls from network 402.

Any PPS herein described may utilize one or more methods and combinations of the same to locate a UE. In other words, an exemplary PPS 100/200/300/400 may use any of the foregoing methodologies depending on the node (s) used to locate a UE.

An exemplary method of measuring distance between a node and a UE may be as follows in Equation 2:

$$r^2 = \frac{E}{RSS} \quad \text{Equation 2}$$

where "E" is the power of the signal transmitted by the node at 1 meter distance from the node, "RSS" is the Received Signal Strength as measured at the UE, and "r" is the distance between the node and the UE. The aforementioned exemplary method is particularly preferred where a node in a PPS uses power-based distance measurements, such as, for example, BLE.

Following the aforementioned exemplary method of measuring distance between a node and a UE, a one-dimensional PPS ("1D PPS") can calculate a distance between a node and an UE ("r") using what follows as Equation 3:

$$r = \sqrt{\frac{E}{RSS}} \quad \text{Equation 3}$$

Following the aforementioned exemplary method of measuring distance between a node and a UE, a two-dimensional PPS ("2D PPS"), such as, for example, for a plurality of nodes used in an enclosure as depicted in FIG. 1, may calculate a distance between a first node 50 and an UE 20 ("$r_1$") and a distance between a second node 51 and an UE 20 ("$r_2$"). An exemplary system of equations to calculate $r_1$ and $r_2$ may be as follows in Equation 4:

$$RSS_1 = \frac{E_1}{(r_1)^2} \quad \text{Equation 4}$$
$$RSS_2 = \frac{E_2}{(r_2)^2}$$

where, "$RSS_x$" is the Received Signal Strength (RSS) at the UE for the first node 50 (x=1) and the second node 51 (x=2). An exemplary RSS may be measured as a received RF power filtered over a short time period (e.g., making use of an RSS estimation algorithm described). However, as known to those skilled in the art, a wireless physical layer standard may define the RSS. For example, an exemplary BLE standard defines RSSI (Received Signal Strength Indicator), which is a specific RSS definition for the BLE standard.

In an exemplary method, the value of $E_x$ may be derived by calibrating the node signal at 1 meter while simultaneously storing the corresponding RSS value for that node. For example, a plurality of BLE nodes 50 and 51 separated by a distance 110 have measured RSS values $RSS_{O1}$ and $RSS_{O2}$, respectively, as the RF or other signal is measured by the recipient node. In other words, $RSS_{O1}$ corresponds to the RSS of node 50 as measured by node 51 across distance 110 and $RSS_{O2}$ corresponds to the RSS of node 51 as measured by node 50 across distance 110. According to this exemplary method, the following Equation 5 may be utilized to determine the value of $E_1$ for node 50 and $E_2$ for node 51:

$$E_1 = RSS_{01} * d^2$$

$$E_2 = RSS_{02} * d^2 \qquad \text{Equation 5}$$

Following calibration of $E_x$, an exemplary PPS may derive any distance 106, 107 to UE 20 and each node 50/51 via real-time measurement of the RSS at the UE 20 using the following Equation 6:

$$(r_1)^2 = \frac{E_1}{RSS_1} = \frac{RSS_{01} * d^2}{RSS_1} \qquad \text{Equation 6}$$

$$(r_2)^2 = \frac{E_2}{RSS_2} = \frac{RSS_{02} * d^2}{RSS_2}$$

In further accordance with the aforementioned exemplary methodology, the PPS may obtain a two-dimensional position for UE 20 in Cartesian coordinates using the following exemplary operations as Equation 7:

$$(x - x_1)^2 + (y - y_1)^2 = r_1^2 \qquad \text{Equation 7}$$

$$(x - x_2)^2 + (y - y_2)^2 = r_2^2$$

$$\ldots$$

$$(x - x_i)^2 + (y - y_i)^2 = r_i^2$$

where for a given $(x_i, y_i)$, the value of "i" is based on the location of the i-th node in the system, e.g., n≥2 for a 2D PPS. Accordingly, the above operation provides for "N" equations, one for each node in the PPS. In a preferred embodiment, any two nodes, corresponding to any two equations above, may be used to calculate a 2D position estimation of the UE.

An exemplary permutation derivation, such as that provided for in Equation 1, may be used to calculate the total number of permutations of 2-equation combinations. Accordingly, each permutation may offer an estimation of a UE 20 position from a different angle in space. In an exemplary method, increasing the number of nodes increases the spatial diversity of the UE's position estimation thereby improving system accuracy.

In an exemplary three-dimensional PPS ("3D PPS"), such as, for example, for a plurality of nodes used in an enclosure as depicted in FIG. 2, a distance may be measured between a first node 50 and an UE 20 ("$r_1$"), a distance between a second node 51 and an UE 20 ("$r_2$"), and a distance between third node 52 and an UE 20 ("$r_3$"). An exemplary system of equations to calculate $r_1$, $r_2$ and $r_3$ may be as follows in Equation 8:

$$(r_1)^2 = \frac{E_1}{RSS_1} = \frac{RSS_{21} * d_{21}^2}{RSS_1} \qquad \text{Equation 8}$$

$$(r_2)^2 = \frac{E_2}{RSS_2} = \frac{RSS_{12} * d_{12}^2}{RSS_2}$$

$$(r_3)^2 = \frac{E_3}{RSS_3} = \frac{RSS_{13} * d_{13}^2}{RSS_3}$$

where $RSS_{xi}$ is the calibration power received by node "x" for node "i" over a distance $d_{xi}$, $RSS_i$ is the received power measured by the UE transmitted from node i; $r_i$ is the calculated UE distance from node i. For example, a plurality of BLE nodes 50, 51, and 52 may each be separated from one another by a distance, such as a distance 210 between node 50 and 51, distance 211 between node 50 and 52, and distance 212 between node 51 and 52. Upon receipt of a calibration signal, e.g., an RF signal, over any of distances 210, 211, and/or 212, the recipient node measures the RSS value, e.g., $RSS_{x1}$ for the RSS signal received from node 50 over distance 210, $RSS_{x2}$ for the RSS signal received from node 51 over distance 210, and $RSS_{x3}$ for the RSS signal received from node 52 over distance 212. In a preferred embodiment, equation 8 may only apply to nodes and UE located within the same enclosure (e.g., not separated by walls).

In an alternative embodiment, an exemplary 3D PPS 200 may simultaneously capitalize on an increased number of nodes in the enclosure 202. In this way, the following may be an exemplary series of RSS calibration signal measurements: $RSS_{21}$ for the RSS signal received from node 50 at node 51 over distance 210, $RSS_{31}$ for the RSS signal received from node 50 at node 52 over distance 211, $RSS_{12}$ for the RSS signal received from node 51 at node 50 over distance 210, $RSS_{32}$ for the RSS signal received from node 51 over distance 212 at node 52, $RSS_{23}$ for the RSS signal received from node 52 over distance 212 at node 51, and $RSS_{13}$ for the RSS signal received from node 52 at node 50 over distance 211. Thus, there would be a plurality of RSS values for each node, e.g., $RSS_{0i}$ value is a combination of RSS signals received at various nodes. By averaging the multiple calibration signal measurements for the same node, Equation 8 may be expanded as follows:

$$(r_1)^2 = \frac{E_1}{RSS_1} = \frac{1}{2}\left(\frac{RSS_{21} * d_{21}^2}{RSS_1} + \frac{RSS_{31} * d_{13}^2}{RSS_3}\right)$$

$$(r_2)^2 = \frac{E_2}{RSS_2} = \frac{1}{2}\left(\frac{RSS_{12} * d_{12}^2}{RSS_2} + \frac{RSS_{32} * d_{23}^2}{RSS_2}\right)$$

$$(r_3)^2 = \frac{E_3}{RSS_3} = \frac{1}{2}\left(\frac{RSS_{23} * d_{23}^2}{RSS_3} + \frac{RSS_{13} * d_{13}^2}{RSS_3}\right)$$

In further accordance with the aforementioned exemplary methodology, the PPS may obtain a three-dimensional position for UE 20 in Cartesian coordinates using the following exemplary operations as Equation 9:

$$(x - x_1)^2 + (y - y_1)^2 + (z - z_1)^2 = r_1^2 \qquad \text{Equation 9}$$

$$(x - x_2)^2 + (y - y_2)^2 + (z - z_2)^2 = r_2^2$$

$$\ldots$$

$$(x - x_N)^2 + (y - y_N)^2 + (z - z_N)^2 = r_N^2$$

where for a given $(x_i, y_i, z_i)$, the value of "i" is based on the location of the i-th node in the system, e.g., n≥3 for a 3D PPS. Accordingly, the above operation provides for "N" equations, one for each node in the PPS. In a preferred embodiment, any three nodes, corresponding to any three equations above, may be used to calculate a 3D position estimation of the UE.

An exemplary permutation derivation, such as that provided for in Equation 1, may be used to calculate the total number of permutations of 3-equation combinations.

Accordingly, each permutation may offer an estimation of a UE 20 position from a different angle in space. In an exemplary method, increasing the number of nodes increases the spatial diversity of the UE's position estimation thereby improving system accuracy.

In an exemplary four-dimensional PPS ("4D PPS"), such as, for example, for a plurality of nodes used in an enclosure as depicted in FIG. 2, a UE may transmit a signal to all nodes and each node measures a received RSS value. Alternatively, each node in the network may transmit the same signal power to the UE. In a preferred embodiment, the UE transmits a calibration signal of equal strength to all nodes in the system, e.g., $E_1=E_2=E_3=E_4$ in following equation:

$$(r_1)^2 = \frac{E_1}{RSS_1} = \frac{E}{RSS_1}$$
$$(r_2)^2 = \frac{E_2}{RSS_2} = \frac{E}{RSS_2}$$
$$(r_3)^2 = \frac{E_3}{RSS_3} = \frac{E}{RSS_3}$$
$$(r_4)^2 = \frac{E_4}{RSS_4} = \frac{E}{RSS_4}$$

Equation 10

In an exemplary embodiment, a 4D PPS method may utilize its equations to calculate the position of the UE 20 in terms of x-coordinates, y-coordinates, z-coordinates, and E-coordinates. However, where the identification of E is unnecessary, the equations derived from Equation 10 may take the following form:

$$RSS_1*[(x-x_1)^2+(Y-y_1)^2+(z-z_1)^2]-RSS_2*[(x-x_2)^2+(y-Y_2)^2+(z-z_2)^2]=0$$

$$RSS_2*[(x-x_2)^2+(Y-y_2)^2+(z-z_2)^2]-RSS_3*[(x-x_3)^2+(y-Y_3)^2+(z-z_3)^2]=0$$

$$RSS_3*[(x-x_3)^2+(Y-y_3)^2+(z-z_3)^2]-RSS_4*[(x-x_4)^2+(y-Y_4)^2+(z-z_4)^2]=0 \quad \text{Equation 11}$$

Thus, according to the above exemplary 4D PPS embodiment and methodology, a UE's three-dimensional position in space may be identified without a calibrated transmission power E, such as, for example, a BLE power transmission.

According to another exemplary method of measuring distance, the PPS may measure the latency of the signal traveling between a node and an UE. In one aspect of this exemplary method, latency may be defined by time of flight ("TOF"). In another aspect of this exemplary method, latency may be defined by time of arrival ("TOA"). In yet another aspect of this exemplary method, latency may be defined by round trip delay ("RTD").

An exemplary method of measuring distance between a node and a UE taking into consideration latency may be as follows:

$$r=dT*C$$

where "C" is the speed of light for radio frequency, or speed of sound for acoustic, "dT" is the time latency for a signal traveling from a Node to an UE, and "r" is the distance between the Node to UE. The aforementioned exemplary method is particularly preferred where a node in a PPS uses latency-based distance measurements, such as, for example, UWB.

For example, a node may first transmit a signal to the UE, which then returns the signal back to the Node by adding the UE information with a fixed processing time. At this point, the node may measure the latency from transmitting the signal to receiving it back using one or more of the aforementioned aspects of this methodology, including any others known to those skilled in the art. An exemplary time latency may comprise signal round trip latency plus a fixed UE processing latency. Where, for example, an UE processing time latency is fixed and pre-known, a signal traveling time or time latency, dT, may be measured, and the distance "r" calculated.

Figure 5:
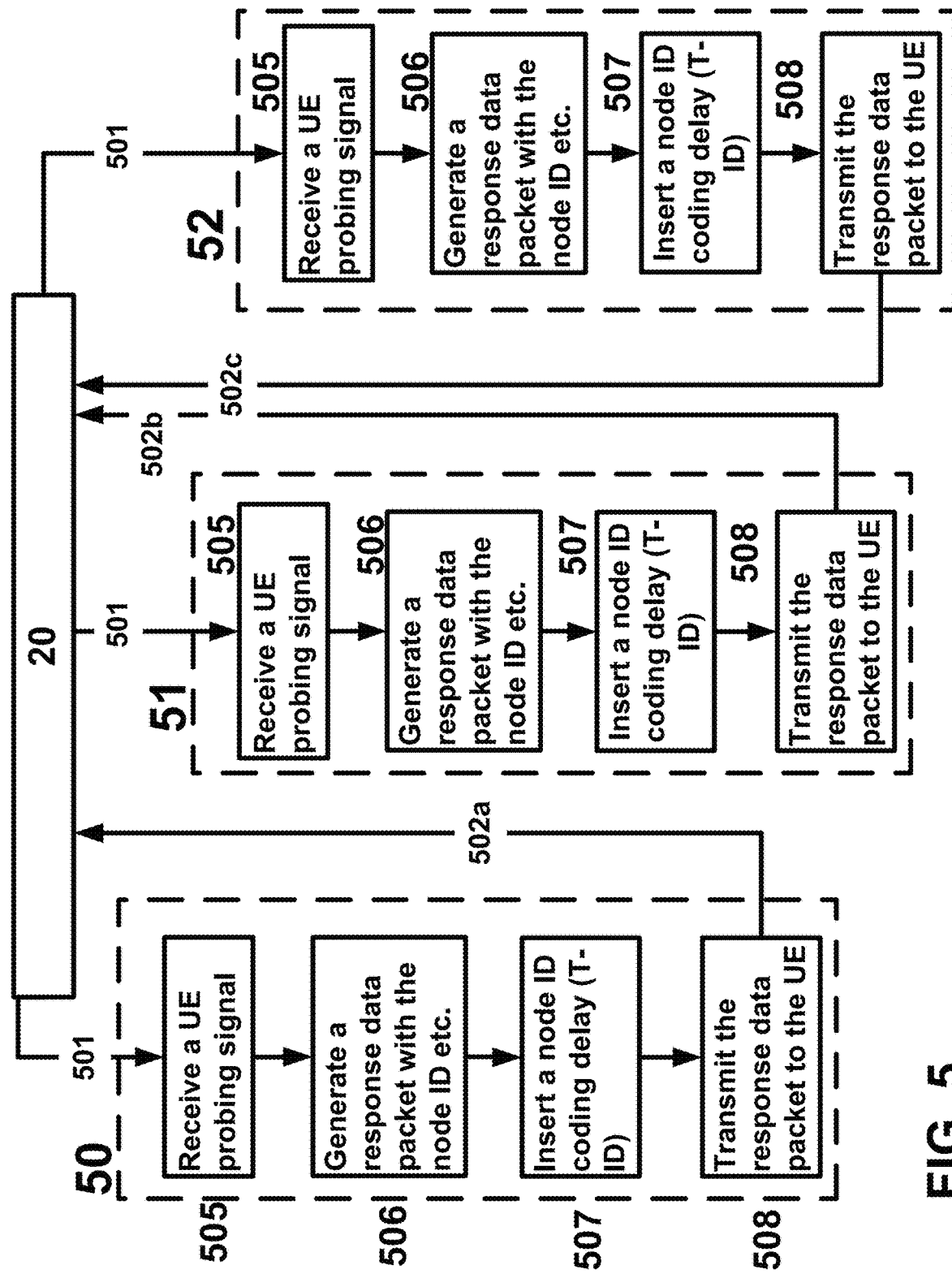
FIG. 5 illustratively provides for exemplary round trip time in another embodiment of PPS.

According to the illustrative exemplary embodiment depicted in FIG. 5, a UE 20 transmits a probing signal 501 to all nodes 50-52 in a PPS. The probing signal 501 may be radio frequency, acoustic, or light (LED) signal, or other signals known to those skilled in the art. According to this illustrative exemplary embodiment, each node first receives the probing signal 501 (step 505) and then generates a response data packet, which may include information such as the node ID, node position (step 506). Following generation of the response data packet, the node may transmit the response data packet 502a/502b/502c to the UE 20 (step 508). In certain embodiments, a node ID coding delay ("T-ID") may be inserted prior to transmission of the response data packet (step 507).

In an exemplary embodiment according to that illustrated in FIG. 5, a total node processing latency ("T_Node") may be fixed and substantially the same for all nodes in the PPS. Calculation and storage of the total node processing latency for each node in the system would preferably be completed during the node hardware/software design ("HW/SW") and manufacture calibration. In another exemplary embodiment, the final transmitting time for each node may be T_Node plus an additional node-specific delay T_ID, which is coded for identifying the node ID (step 507) and to avoid collisions in case of multiple nodes have same distance to the UE 20.

When the UE 20 receives the node response data packet (such as, for example, 502a/502b/502c), the UE 20 may determine the arrival time of the particular node response data packet, and then calculate the total latency by summing up the round trip delay using the following:

$$\text{Latency}_{Total}=\Sigma RTD(\text{node}_n)+T\_ID(\text{node}_n)+T\_\text{node}(\text{node}_n)$$

With the total latency known, the PPS may calculate the UE-to-Node distance.

According to these embodiments, technologies used for UE transmission probing signals (e.g., signal 501) may be the same as or different from an exemplary node-to-UE response signals (e.g., 502a/502b/502c). In one example, a UE-to-Node probing signal may use acoustic signal in speed of sound (343 m/sec) while the Node-to-UE response signal used in the same PPS may use radio frequency signal in speed of light (300 m/μsec). An exemplary PPS may be compatible for both received power and time difference methods.

In an exemplary PPS, the accuracy of a given positioning measurement relies on the quality of distance-RSS power calibration for each node. In an exemplary embodiment, the quality may require real-time calibration due to battery power changing over time. Accordingly, the hardware of each node module (different manufacturer, model, version, etc) may dictate the type and amount of calibration. However, it may be plausible to reduce individualized hardware calibration programming using a real time node calibration technique as herein detailed.

In an exemplary real-time node calibration technique for a PPS, a given node "i" may have a calculated calibration $E_i$, as provided for in Equation 7:

$$E_i=RSS_{xi}*d_{xi}^2$$

Figure 6A:
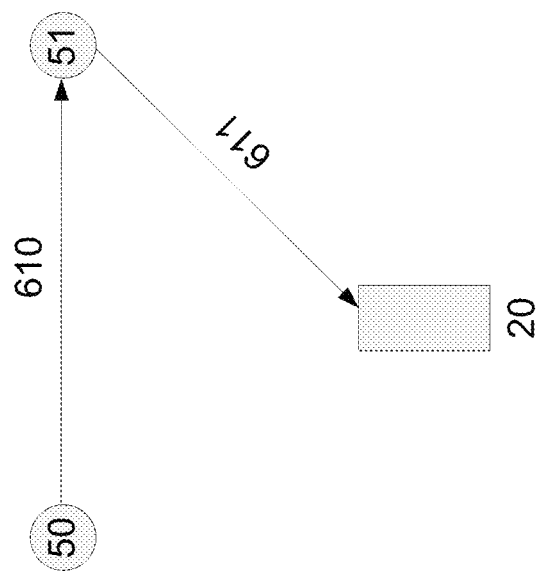
FIGS. 6A and 6B illustratively provide for exemplary calibration in another embodiment of PPS.
Figure 6B:
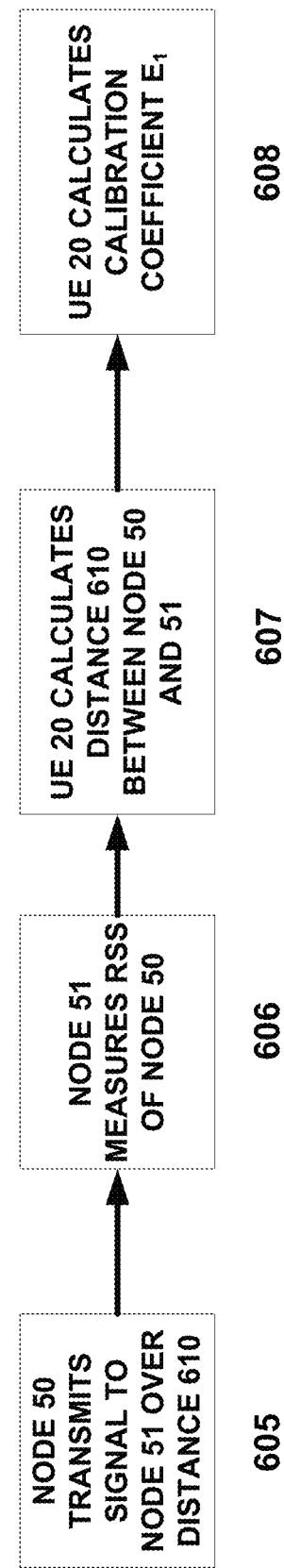

According to the illustrative exemplary embodiment depicted in FIG. 6A, a node 50 may be real-time calibrated via node 51 through UE 20. An exemplary operation of the exemplary system of FIG. 6A may be illustratively shown in FIG. 6B, and in particular, steps 605 through 608.

According to this exemplary embodiment, a node 50 transmits a signal to another node, e.g., node 51, over a distance 610 (step 605). The recipient of the signal, e.g., node 51, then measures the RSS of node 50 in one of numerous ways described herein (step 606). Following measurement of the RSS of node 50, the UE 20 calculates the distance 610 between nodes 50 and 51 based on the measurements of node 50's RSS (step 607). With the information gathered, UE 20 may calculate the calibration coefficient for node 50 (step 608). In an exemplary methodology, the routine followed in step 608 may use the following algorithm:

$$E_{50} = RSS_{50} * d_{610}^2 = RSS_{50} * [(x_2-x_1)^2 + (y_2-y_1)^2 + (z_2-z_1)^2]$$

where the position of node 50 is $x_1, y_1, z_1$ and the position of node 51 is $x_2, y_2, z_2$.

Figure 7:
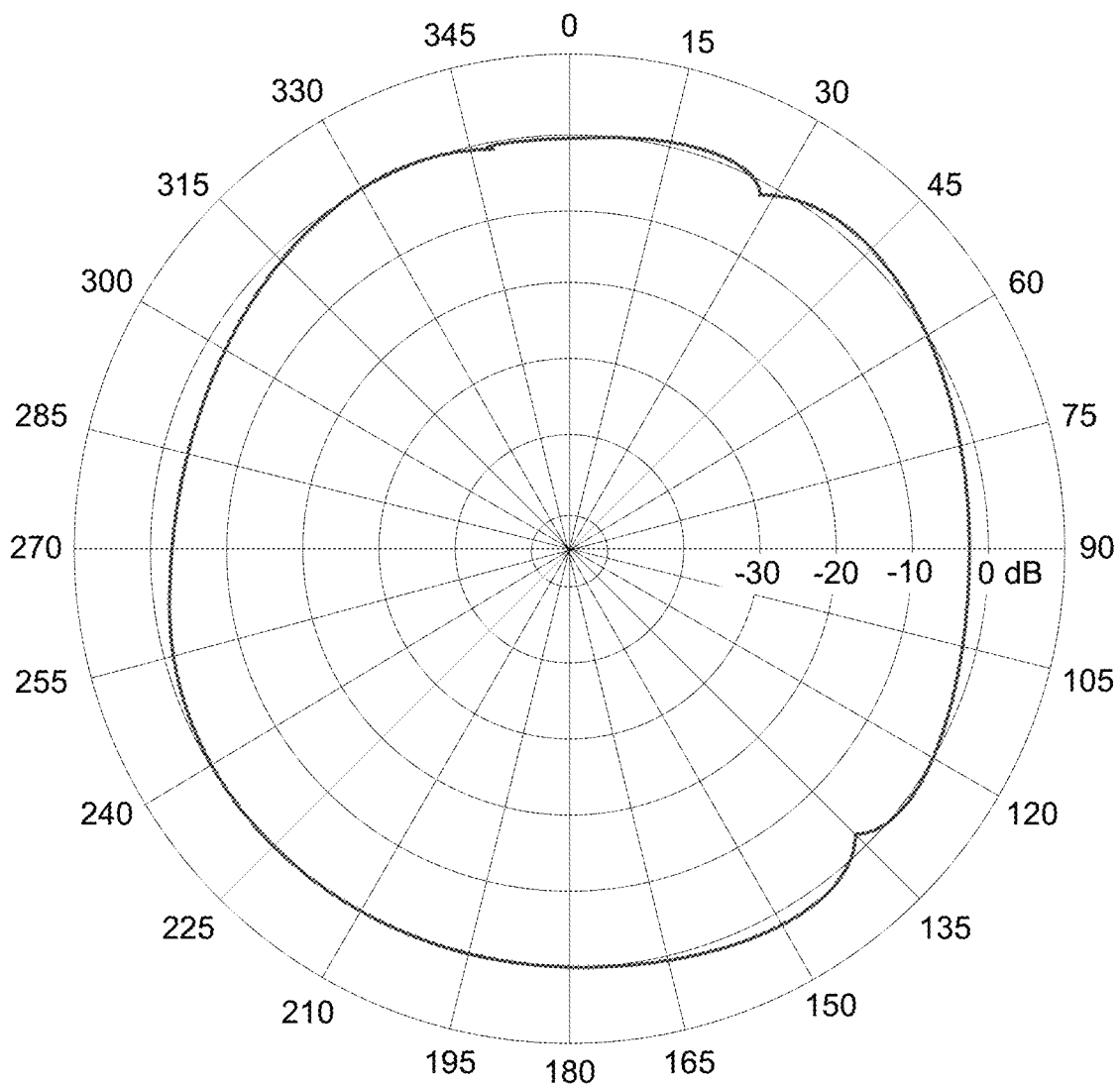
FIG. 7 illustrates an exemplary antenna pattern.

In another exemplary embodiment, measurement accuracy may be improved via compensation for signal antenna impairment or obstruction. In a specific example, a BLE transmitting frequency (BLE channel) may have different signal gains at different frequencies, or, in other words, the signal gain on a particular BLE channel is a function of the frequency on that channel. In another specific example, a BLE antenna radiation pattern may have different power at differing directions. An exemplary antenna radiation pattern may be illustratively provided for in FIG. 7. According to FIG. 7, an antenna radiation pattern may include an XY cut, XZ cut and YZ cut for a given orientation of an antenna 40 placement about a Cascadian coordinate system.

An exemplary gain for the antenna pattern may be represented as follows:

$$gAntPattern(\alpha, \theta),$$

where $\alpha$ (vertical), $\theta$ (horizontal) is the angle (in degree) of an antenna radiation pattern for a given orientation of antenna placement.

In a further exemplary embodiment, a measurement calibration coefficient "E" designed for improved accuracy due to signal antenna compensation may be derived as follows as Equation 12:

$$E = E_0 * gFreq(BLE\_channel) * gAntPattern(\alpha, \theta) \quad \text{Equation 12}$$

where $E_0$ is pre-calibrated RSSI at 1 meter; gFreq (BLE_channel) is used for compensating E at an exemplary BLE receiver based on received BLE frequency channel; and gAntPattern($\alpha, \theta$) is used for compensating E when calculating the UE position.

Figure 8:
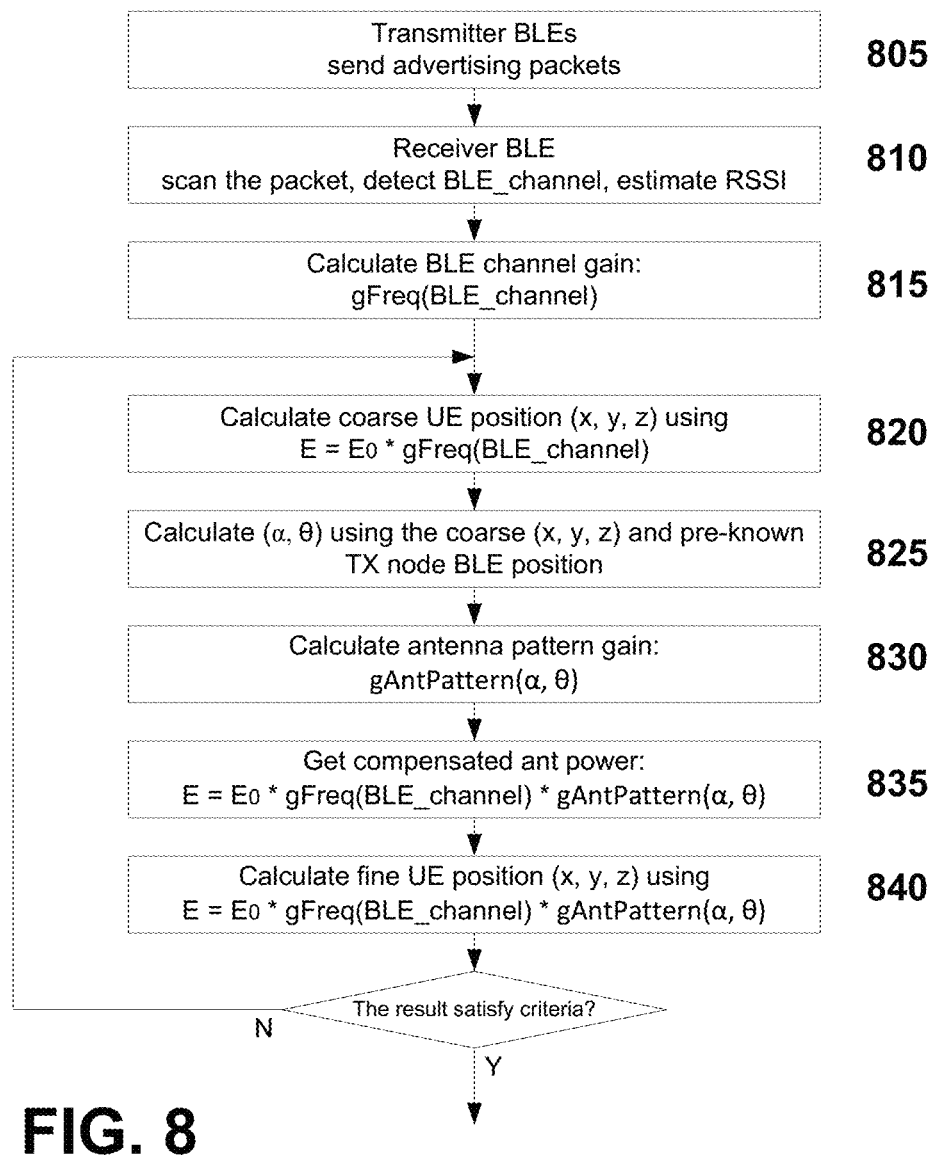
FIG. 8 illustratively provides for exemplary antenna pattern compensation in another embodiment of PPS.

According to the illustrative exemplary embodiment depicted in FIG. 8, an exemplary antenna impairment compensation methodology may be carried out for BLE nodes. As illustrated, an exemplary methodology may involve feedback loops for calculating UE positioning based on a precision scale, e.g., coarse or fine. An exemplary filter may also be applied to a coarse position (e.g., those positions which may utilize RSSI that suffer from frequency and/or antenna radiation pattern impairments) to update the course position to be closer to a fine position. An exemplary filter that may be used in accordance with the exemplary methodology depicted in FIG. 8 may take the following form:

$$x = (1-a) * x + a * x\_new$$

$$y32(1-a) * y + a * y\_new$$

$$z = (1-a) * z + a * z\_new$$

where, {x, y, z} is estimated UE position at each feedback loop, {x_new, y_new, z_new} is estimated UE position after impairments compensation at step 840.

With further reference to the illustrative exemplary methodology depicted in FIG. 8, in one embodiment, a transmitter node, such as a BLE, may send advertising packets to a receiver node (Step 805). The receiving node may then scan the packet, detect the BLE channel, and estimate an RSSI using methodologies known to those skilled in the art, including those disclosed herein (Step 810). The BLE channel gain may then be calculated in accordance with algorithm of step 815. Following the BLE channel gain calculation, the coarse positioning of the UE may be derived (Step 820). The $\alpha$ (vertical) and $\theta$ (horizontal) of an antenna radiation pattern may be calculated using the coarse position of the BLE node as well as any pre-known transmitter node position (Step 825). Following therefrom, the antenna pattern gain may be calculated (Step 830), and a compensated antenna power coefficient is derived (Step 835). With the compensated antenna power coefficient, a fine UE position may be calculated (Step 840). The resulting fine UE position may be compared to a pre-set or dynamic criteria to ensure for proper use in the PPS.

In another exemplary embodiment of a PPS, the use of a plurality of antenna, e.g., an antenna array, within one or more PPS nodes may reduce antenna impairments across one or more different spatial directions.

In a first embodiment, a node may use at least 2 antennas sharing the same BLE device. The at least 2 antennas may be placed in some degree offset to maximize the unique gain in a desired area.

In a second embodiment, a node may use at least 2 antennas corresponding to at least 2 BLE devices. For purposes of illustration, the polarization of the 2 antennas may be orthogonal. Accordingly, a receiver BLE may receive 2 RSSIs from the same node, and thereafter combine the 2 RSSIs to substantially filter out antenna radiation/polarization impairment.

In a third embodiment, a node may use a plurality of antennas, e.g., an antenna array, placed to increase spatial diversity and polarization diversity. In an exemplary PPS utilizing an antenna array for a PPS node one benefit may be to reduce antenna impairments across different spatial directions. In a first embodiment, a node may use 2 antennas sharing the same BLE device. The 2 antennas may be placed in some degree offset to maximize the unique gain in desired area. In a second embodiment, a node may use 2 antennas with 2 BLE devices. According to this embodiment, the polarization of the 2 antennas may be orthogonal. Thus, a receiver BLE may receive 2 RSSIs from the same node and then combine the 2 RSSIs to filter out the antenna radiation/polarization impairment. In an exemplary aspect of the third embodiment, a node may use an antenna array comprising 3 or more antenna placed in a manner to increase spatial diversity and polarization diversity.

Figure 9A:
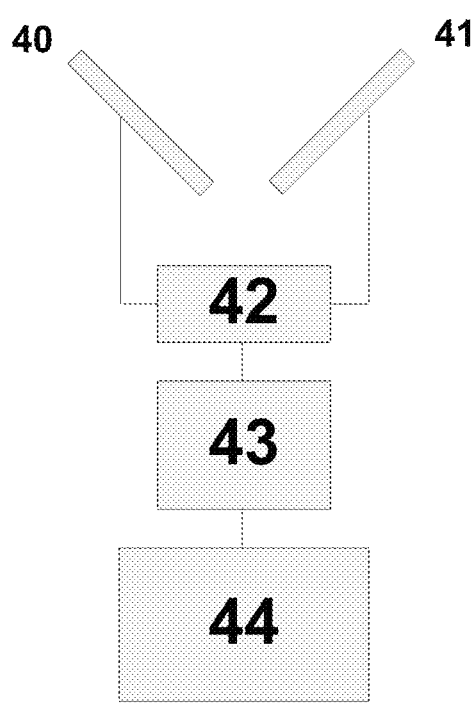
FIGS. 9A-G illustrate an exemplary multi-antenna array and use of same in another embodiment of PPS.

In an exemplary multi-antenna PPS, including a BLE PPS node system, one object may be to use multiple antennas to achieve space and polarization diversity, improve antenna performance, and/or determine the angle of departure and arrival for the signal, e.g., the BLE signal. As illustratively provided for in the exemplary embodiment according to FIG. 9A, multiple antennas 40, 41 share a single BLE transceiver 43 (or other wireless technologies like WiFi, UWB, etc) in a time division multiplexed fashion using an antenna switch 42, e.g., an RF antenna switch. Resort may be made to CPU/data processing capabilities in the processor part 44 of the PPS to enable signal processing as well as processes to achieve the space and polarization diversity. An exemplary CPU may include the capability to transmit data encoding, implement receiver data decoding and processing, calculating equations (e.g., including those described herein and known to those skilled in the art), post-processing of any data, and inter-node or intra-node communications, including Internet communications depending on the application.

Figure 9B:
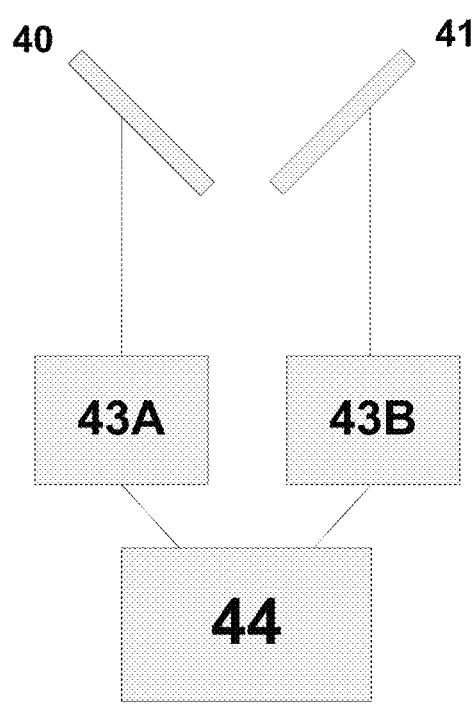

As illustratively provided for in the exemplary embodiment according to FIG. 9B, each antenna 40/41 may have its own transceiver 43, 43A, and/or 43B, such as a BLE transceiver, to permit simultaneous operation. According to this exemplary embodiment, different antennas may be placed in different positions or orientations and may have different antenna radiation and polarization patterns, e.g., pattern of FIG. 7.

Figure 9C:
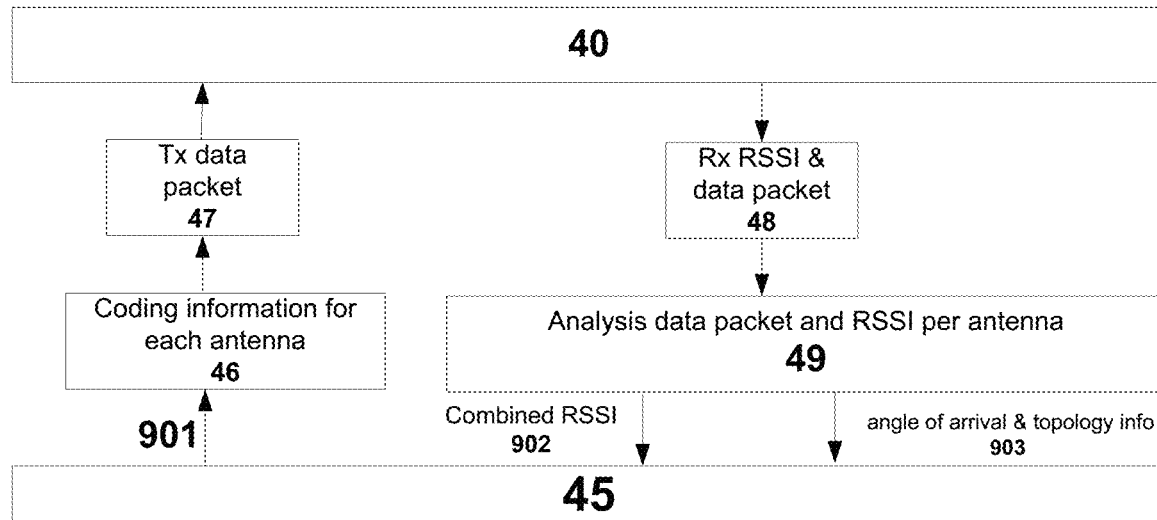

As illustratively provided for in the exemplary embodiment according to FIG. 9C, each antenna 40 may transmit 901 and receive 902-903 signals to do work. In an exemplary embodiment, each antenna 40 may be designed to have a specific radiation and polarization pattern that may be different from other antennas 41 (not shown). In another exemplary embodiment, each antenna 40 may be located such that the combined effects of the multiple antennas may be optimized for beneficial space diversity, polarization diversity, and angle of departure and arrival for the signal, e.g. a BLE signal. In a preferred embodiment, an exemplary multi-antenna system may be designed to generate a set of antennae RSSI fingerprints that may be used for space diversity, polarization diversity, and angle of departure and arrival for an emitted signal, such as a BLE signal. In an exemplary embodiment, a multi-antenna design may be applied on both the transmitter device (e.g., node 50 or UE 20) and a receiver device (e.g., corresponding node 51 or UE 20). In another exemplary embodiment, a multi-antenna design may mix a plurality of antenna signals with any individual antenna single together. For example, a transmitter may be an exemplary PPS node 50 with an antenna array 40, 41 while an exemplary UE 20 may have a single antenna 40 (e.g., where UE 20 is a smartphone). As will be described more fully, even with a single antenna 40, UE 20 may be able to receive and distinguish between signals from an antenna array 40, 41 based on the different coding applied to each signal of each antenna in the array 40.

In a first aspect of this exemplary embodiment, multiple antennas 40 may share a same BLE transmitter 43 using time-division multiplex. In a second aspect of this exemplary embodiment, multiple antennas 40 may use multiple BLE transceivers 43A, 43B to transmit multiple data packets simultaneously as shown in FIG. 9B.

Referring again to the illustrative embodiment of FIG. 9C, an exemplary PPS positioning algorithm 45 may first generate a transmit data packet 46, 47 for each antenna 40. In a preferred embodiment, this first generation of transmission 901 may allow different antenna 40 to transmit different data packets 47 at desired time by desired transmitting order. In a further aspect of this embodiment, an exemplary transmission data packet 901 may be encoded with an antenna ID 46 that may allow the PPS receiver to identify which data packet is from which antenna. The transmitted data packet 47 may then be sent to each antenna 40 of the PPS receiver.

Figure 9D:
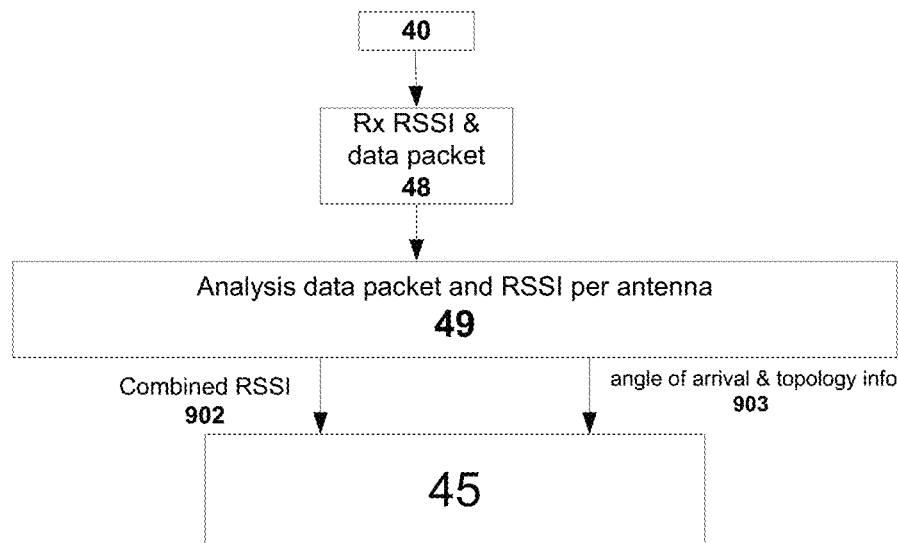

It is also contemplated that a UE may receive from antenna array 40 multiple transmit signals 48 that undergo analysis and RSSI calculations 49. In an exemplary embodiment, upon receiving the multiple RSS 902 from the multiple transmit antennas 40 of a node 50, an exemplary receiver, e.g., a UE 20, may also perform space and polarization diversity processing, and angle of departure detection and processing 903. And while an array of antenna 40 have been described, as per the illustrative embodiment of FIG. 9D, a single receiving antenna 40 may receive a plurality of antenna signals 48 from transmit nodes 50 by time division or code division.

In another exemplary embodiment, an exemplary angle of departure with the multiple transmitting antennas 40 may be calculated in the following manner: (i) when a node 50 has multiple antennas 40, the UE 20 may receive multiple RSS, which may be characterized by a vector, such as:

$$V_{RSS} = (RSS_1, RSS_2, RSS_N)$$

where N is the number of antenna, $RSS_i$ is the UE received RSS from antenna i.

According to this exemplary embodiment, the value for $V_{Rss}$ may be normalized by the following equation:

$$F_{Rss} = f(V_{Rss}, N_{Rss})$$

where $N_{Rss}$ is the factor for normalization. The $F_{Rss}$ is the signal vector of the multiple antennas that represent each antenna's RSS contribution in the N antennas.

In further accordance with this embodiment, an exemplary antenna 40 design and location placement may be given different signal vector $F_{Rss}$ values for different angles of departure. Consequently, an exemplary receiver may store a copy of the signal vector map for the multiple antennas 40 of the node 50. An exemplary signal vector map may be a relationship between an angle of departure and its corresponding signal vector value of the N antennas. Thus, when an exemplary UE 20 receives a RSS vector $V_{Rss}$ from the node 50, the UE receiver may further estimate the received signal vector value, and compare it with the stored signal vector map. In one embodiment, when an exemplary UE 20 receiver locates a best matched signal vector on the signal vector map, a corresponding angle of departure of the antenna may be determined (e.g., via point selection or interpolation) and thereby be detected.

In other embodiments, there may be numerous usages of a detected angle of departure information, such as, for example (i) for RSS based positioning (e.g., where an UE 20 may compensate the antenna 40 radiation and polarization gain) and (ii) for non-RSSI based positioning (e.g., where an UE 20 may calculate location based on the angle of departure (from transmit node) and the angle of arrival (for the UE receiver) information).

According to other exemplary embodiments of a PPS, an antenna 40 ideally has a uniform radiation pattern permitting each UE 20 to receive a unique RSSI value from any angle of departure of a node antenna 40. An antenna array as described herein may provide a means by which a uniform radiation pattern can be achieved by placing multiple antennas 40 such that their combined radiation patterns result in an antenna gain that may be uniform at different angle of departures.

Another example of a combination methodology to achieve uniform radiation patterns may involve use of the weighted average across the multiple antennas 40 by assuming a node 50 receives $RSS_1$ from antenna I, where N is the total number of antennas of a node. Then the combined multiple antenna RSSI may be calculated as follows:

$$C_{RSS} = fc(RSS_1, RSS_2, \ldots RSS_N)$$

where $C_{RSSI}$ is the combined RSS from the N antennas. In an exemplary embodiment, the combination algorithm fc( )

may be dynamically adapted based on one or more of the following: the received RSSI, the angle of departure, node topology, and application environment factors, etc.

Figures 9E, 9F:
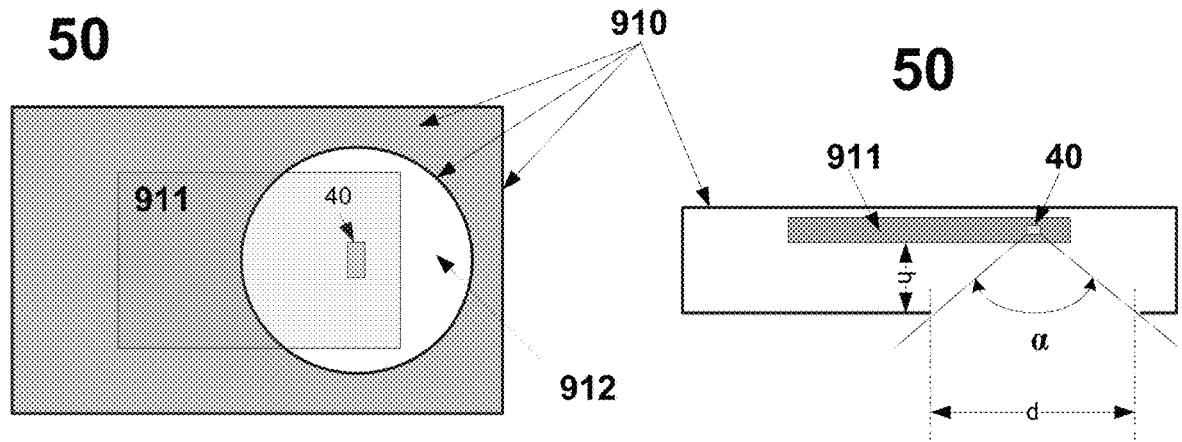

With reference to the illustrative embodiment of FIGS. 9E and 9F, an exemplary node 50 casing design 910 may control operational angle of the antenna 40 while blocking multipath from non-operational angle. In one aspect of this illustrative embodiment, an exemplary antenna 40 on a PPS control board 911 may have an operational angle α controlled by the dimensions of an open space or non-metal area 912 and the casing 910 of the node 50.

According to these illustrative embodiments depicted in FIGS. 9E and 9F, an antenna 40 may be placed substantially concentric with a non-metal area 912 so that its signal, e.g., a BLE RF signal, may be transmitted to UE 20 receiver through the open space coincident with operation angle α for the node 50. An exemplary operational angle α may be defined by:

$$tag(\alpha/2)=(d/2)/h$$

where "d" corresponds to the distance between the opening in node 50 casing 910 for the operational angle α and "h" is the distance between the casing and the antenna 40 mounting to the PPS board 911. In a preferred embodiment, an exemplary "d" and "h" may be such as to form a rectangular perimeter in which case an operation angle over the longer length may need to be greater than the operation angle over the shorter length.

Consequently, and in accordance with this exemplary embodiment, any angle outside of the operational angle may be deemed a non-operational angle for the node 50. In one aspect, the non-operational angle is covered by metal casing 910 to deter signal transference. Consequently, little or no multipath can go through the non-operational angle of antenna 40. In another aspect, the operational angle α may be any open space without metal casing 910, although the operational angle α may be covered by a casing or material known to those skilled in the art that would still allow signal transmission to antenna 40.

Figure 9G:
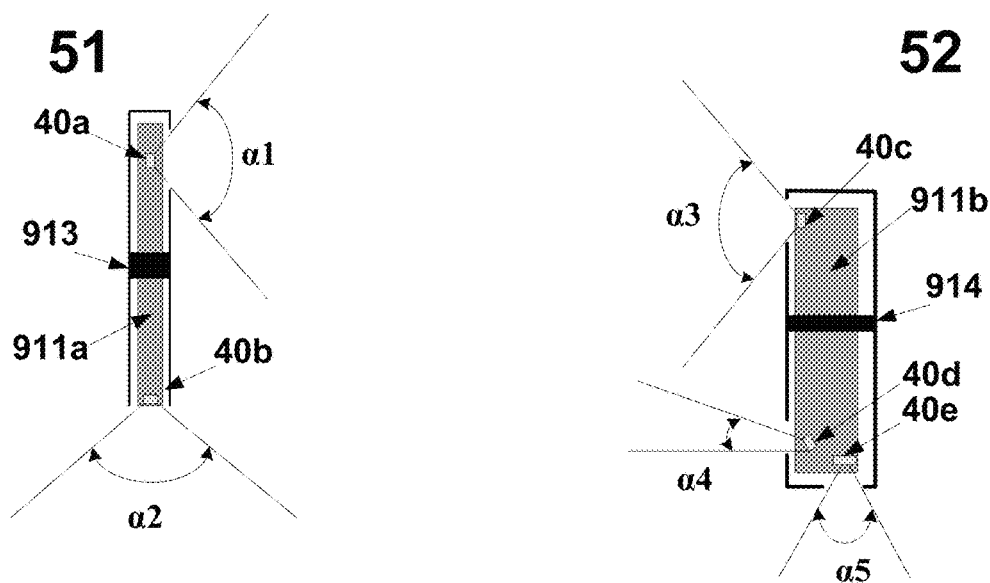

According to the illustrative embodiment of FIG. 9G, a node 51 may contain a plurality of antenna 40a and 40b coupled to a PPS board or other suitable processing equipment 911a. In an exemplary embodiment, antenna 40a may be isolated from antenna 40b to improve resolution of signals emitted from each and/or increase directionality distinctions between the two antenna for processing of signals transmitted and received by the same. According to this exemplary embodiment, an isolation bar or enclosure 913 may be used to isolate antenna 40a from antenna 40b. However, were an isolation bar or enclosure 913 may not be utilized, the granularity of the radiation pattern from antenna 40a and 40b may improve as a result of their co-transmission of radiation. In an exemplary embodiment, different antenna 40a and 40b may have different operation angles α1 and α2, respectively, to cover a broader range of environments about the node 51. While antenna 40a and 40b are illustratively shown oriented with respect to one another at 90 degrees, these antenna may be placed in circular, acute, or other angles and arrangements for particular applications and/or node encasing structures. In an exemplary embodiment, antenna 40a and 40b may be arranged in a pattern that places themselves proximal to the outer perimeter of a wall or surface on which node 51 may be mounted.

As further illustratively provided for in FIG. 9G, an exemplary node 52 may have a plurality of antenna 40c, 40d, and 40e having operation angles α3, α4, and α5, respectively. Each of the plurality of antenna 40c-e may be coupled to a processor or other control circuity 911b. As illustratively provided, an isolation bar 914 may be situated between antenna 40c and antenna 40d and 40e. In an exemplary embodiment, the overlap between angles α3 and α4 statistically lowers the standard of deviation for signals received and transmitted within in the overlap range. In another exemplary embodiment, the isolation bar 914 may increase the resolution and granularity of portions of signal α4 that are also impacted by signals α3.

In yet another exemplary embodiment of the illustrative nodes 51 and 52 of FIG. 9G, isolation bar 913/914 may be capable of opening and closing in response to system needs, e.g., increased granularity and resolution at one or more node antenna. Alternatively, antenna may have their power modulated depending on the need to increase resolution for the node signals in an antenna array. For example, an exemplary node 52 may have full power provided to antenna 40c and 40e and quarter power to 40d until the need for greater resolution of space 1001 readable by antenna 40d. When the system calls for increased resolution of the portion of the space 1001 that is readable by antenna 40d, node 52 may be provided a control signal to activate an isolation bar 914.

In accordance with multi-antenna array PPS nodes, a PPS node 50 placed on a door or other form of entry or access device may have 2 antennas 40: one antenna placed toward the inside of the space 1001 and another placed toward outside of the space 1001 (e.g., a node 50 with two antenna 40, 41, with antenna 40 facing inside the home and antenna 41 facing outside the home). In an exemplary embodiment, each antenna 40, 41 may have a casing 910 that has a desired operational angle α as described herein. In another exemplary embodiment, the 2-antenna node 50 may use BLE or WiFi or 3GPP (2G/3G/4G/5G), etc. and may operate on UE 20 with or without a PPS application according to methodologies described herein, and further in conjunction with a PPS cloud server 2300 for data analytics.

In a preferred embodiment of detecting a UE 20 coming into or leaving a space 1001 (e.g., a house), a first step may involve a PPS node 50 detecting who is entering or leaving a house. In situations where a PPS app is installed on the user's UE 20 (e.g., Smartphone), the PPS node 50 detects the position and moving routine of the UE 20 using 1D PPS technology as described herein. Alternatively, if a PPS app is not installed on the UE 20, the PPS node 50 detects the position and moving routine of the user using PPS passive positioning technology as described herein. In a second step, after detecting a UE 20 entering or leaving a space 1001 (e.g., the house). a notification message may be sent to the owner of the house; a message may be sent to the user's UE 20 (e.g., smartphone); a house speaker system may play a welcome message and any voicemails upon entering the space 1001; or a departure message (e.g., "don't forgot taking medicine") or issue a warning that an object required is located farther from the UE 20 as the user departs (e.g., car keys are located in another room and may be forgotten if not retrieved, turn off the television). In an exemplary third step, if the server identified the UE 20 user is an authorized user, then a Smart door lock (e.g., IoT Smart Door) may automatically open the door when the user tries to enter the house, or lock the door when the user leaves the house.

In an exemplary embodiment, a PPS may employ equation 8 while a node and UE are located in the same free space of an enclosure, e.g., without blocking objects there between, or where the risk of wall attenuation is either non-existent or no greater than a selected maximum distance on the x-, y-, and/or z-coordinates based on the free space of an enclosure. Where blocking objects exist in a given enclosure, an exemplary PPS may employ additional functions to adjust for attenuation due to presence of objects in the enclosure. In on embodiment, a wall inside a room may be treated as a divider between two rooms, particularly where the wall separates the room into two parts. In another embodiment, a room that is not rectilinear in shape may be divided into multiple enclosures of differing shape to fit the room.

Figure 10A:
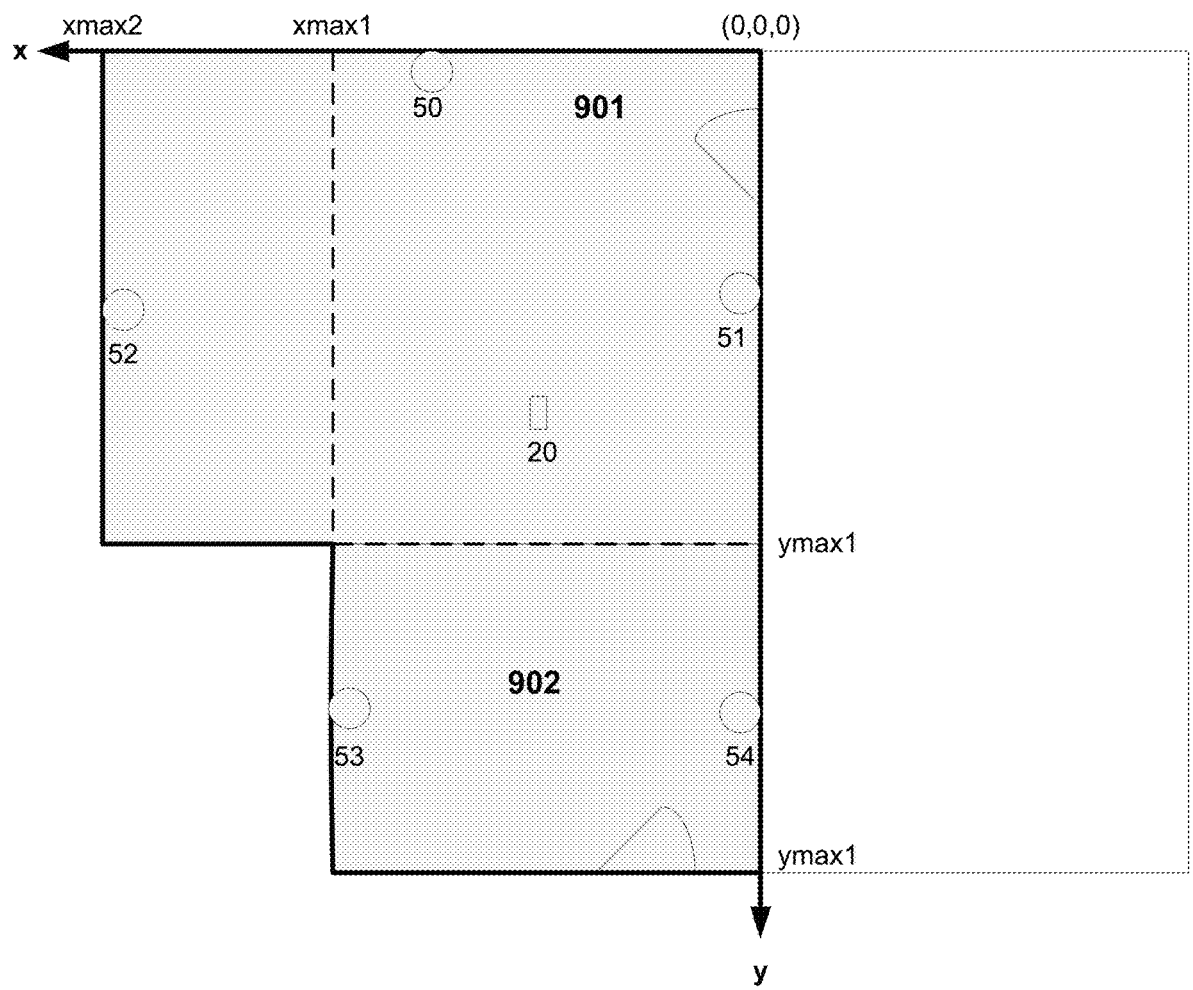
FIGS. 10A-B illustrate an exemplary method of using another embodiment of PPS in multi-room enclosures.

With reference to the illustrative exemplary methodology depicted in FIG. 10A and in an exemplary embodiment, a wall attenuation signal can be reduced by calculating the UE distance to each node, as shown in Equation 7, and then calculating the UE 20 position (x-, y-, and z-position) as shown in Equation 8. According to this exemplary methodology, if the UE's Cartesian coordinates locate it within the room 901, the analysis would include the result of the positioning and confirm its accuracy. However, if the coordinates do not locate the UE 20 within room 901, then the process may be repeated to determine whether the UE 20 is located within room 902 through iterative node 50-54 comparisons. Alternatively, a wall attenuation signal can be reduced using the Equation 8 and 9 methodologies above while further obtaining the RSS of the UE 20 at each node 50-54. Through iterative comparisons, the stronger the RSS value, the higher likelihood that the UE inhabits the same room 901/902 as the node(s) reporting those RSS values. In this way, the PPS may determine that a UE is in one room but not another.

In another further embodiment of an exemplary PPS, identification of an exemplary node network 50-52 in a room and UE 20 position may allow for determination of a measurement for a portion, if not the entirety, of the boundaries of an exemplary room 901. For example, a PPS node 50 may measure the RSSI between a plurality of nodes 51, 52, to approximate distance between the nodes based on the known manufacturing coefficient $E_i$ of the node.

In another exemplary embodiment, when a UE is in a room, there is a potential to receive many wireless signals. For example, where an exemplary node is a BLE-type node, an exemplary UE may receive BLE signal from a first room (901), or another room (902), such as rooms on other floors. Furthermore, such an exemplary UE may also receive signals from smart phones, PCs, iPads, and laptops, etc. In a preferred embodiment, only those nodes inside the UE 20 room (as illustratively shown in FIG. 9, room 901) are the signals UE 20 may receive and process, with any remainder BLE sources classified as noise or interference and removed or cancelled out.

Figure 10B:
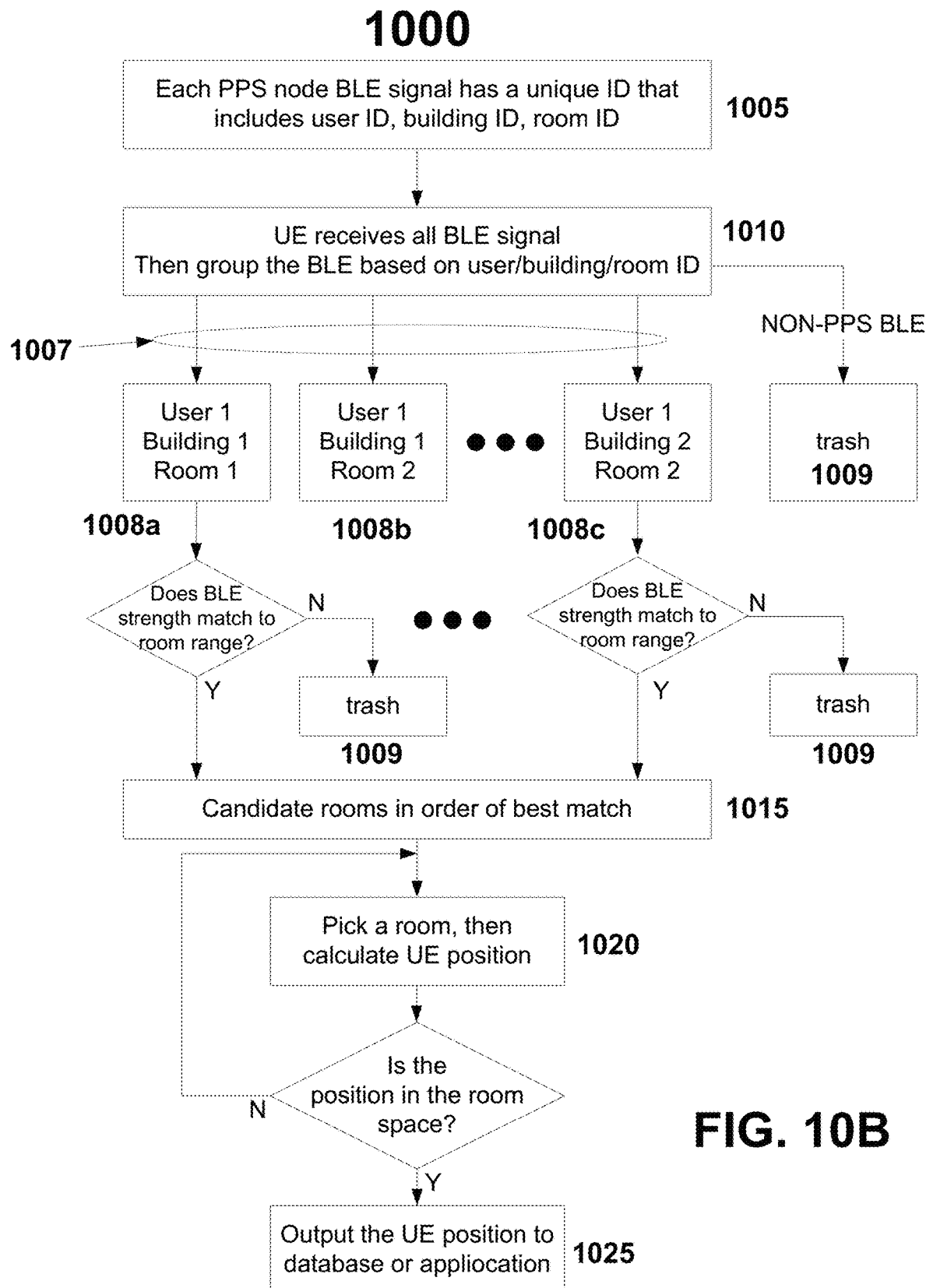

With reference to the illustrative exemplary methodology depicted in FIG. 10B, the PPS may identify the expected BLE node and determine how to filter out noise/interfering BLE signals. In a first exemplary step of an exemplary methodology 1000, an installation step (1005) may provide for all nodes being assigned an unique PPS node ID, which may include customer id, building id, room id and other user profile information and hardware/software ("HW/SW") tracking information.

In a second exemplary step (1010), an exemplary UE may receive many BLE signals from different sources requiring the UE to filter out non-expected BLE signals from non-PPS nodes or from neighboring floors or neighboring rooms. Accordingly, an exemplary UE preferably may group PPS BLE signals based on the same user id, same building id and same room id. Alternatively and additionally, the exemplary UE may group BLE signals 1007 for an exemplary PPS by virtue of which room it is located in vis-à-vis surrounding rooms, i.e., have multiple rooms 1008a, 1008b, 1008c, including current UE room, neighboring rooms and neighboring floors. In this alternative and additional action pursuant to step 1010, an exemplary PPS may create a candidate room list base on matching of BLE strength to the room size (step 1015).

Following exemplary grouping step 1010, an exemplary methodology 1000 may filter out unexpected BLE signals, e.g., removing those BLE signals that do not match the PPS node id (step 1009) and checking how many node BLE is received from each room. In an exemplary filtration method, if a total number of valid, received node BLE signals for a room is less than expected, then this room may be delisted from the candidate room list since these signals may be leaking in from other floors and other rooms.

In a fourth exemplary step 1020, an exemplary methodology 1000 calculates UE position for a room on the candidate room list and determines whether the UE position is inside the room. If a UE position is within a room space, the result may be output to the PPS (step 1025). Otherwise, an exemplary step 1020 may permit iterative selection of each room in an exemplary candidate room list and repeat the UE position calculation (step 1020).

For estimating a UE position, a transmit BLE may repeat transmission of an advertising signal until the receiver BLE receives a desired number of RSSI measures or reaches a maximum measurement time period. The set of RSS measurements over time is the time diversity inputs.

The BLE noise, multipath and interference may be space-angle dependent, e.g., a different space angle may receive different multipath and interference. An exemplary method of space diversity may be to use more redundant nodes in a room. For example, a room may only need 3 nodes to calculate a 3D UE position, but by installing 6 nodes in the room, there may be considered 3 redundant nodes. In an exemplary method of space diversity, selection of 3 out of the 6 nodes may be made to perform a single UE position measurement. Each permutation of nodes in the series and their corresponding measures of UE position derive from different space angles. According to this example, the total number of 3 of N nodes is $N(N-1)(N-2)/6$ (see Equation 1), or 20 measurements for N=6. In this way, with 6 nodes installed in a room, there may be up to 20 measurements for the same UE position that receives BLE signal from different space angle. Accordingly, by combing the information from the 20 measurements, noise, multipath and interference may be reduced.

Upon receipt of multiple measurements from either time diversity (for RSS), or space diversity (for position), an exemplary PPS may apply a filter by combing multiple measurements to generate a better estimated result. An example of combination (filtering) is: maximum-ratio combining ("MRC"), equal-gain combining, selection combining, adaptive weighing, and other filtering techniques known to those in the signals art.

MRC may use signal-to-noise ratio of each measurement as a weight to combine all measurement elements and calculate the final combined UE position. Equal-gain combining may average over all of the measurements using equal-gain.

Selection combining may remove some measurements that have low confidence level, and only combine the measurements that have high confidence level. The confidence level includes signal-to-noise ratio, RSS range vs. room space, RSS statistical analysis, UE's moving speed, and other parameter comparisons known to those skilled in the art.

A more generic filter may be applied, such as, by applying a weight on each measurement. For example, a specific measurement may include a weight equal to zero or adaptive weights generated by analyzing a set of measurements and other information such as history, UE moving speed, and inputs from other sensors (accelerometer, gyroscope, magnetometer, etc.).

In an exemplary embodiment of a PPS, there may be a PPS Simple node (PPS SN) and a PPS Network node (PPS NN). A PPS SN may be a stand-along BLE node without built-in Internet access in the node structure. A PPS NN may be a BLE node with built-in Internet access (e.g., WiFi, Ethernet, 5G) in the node.

Figure 11:
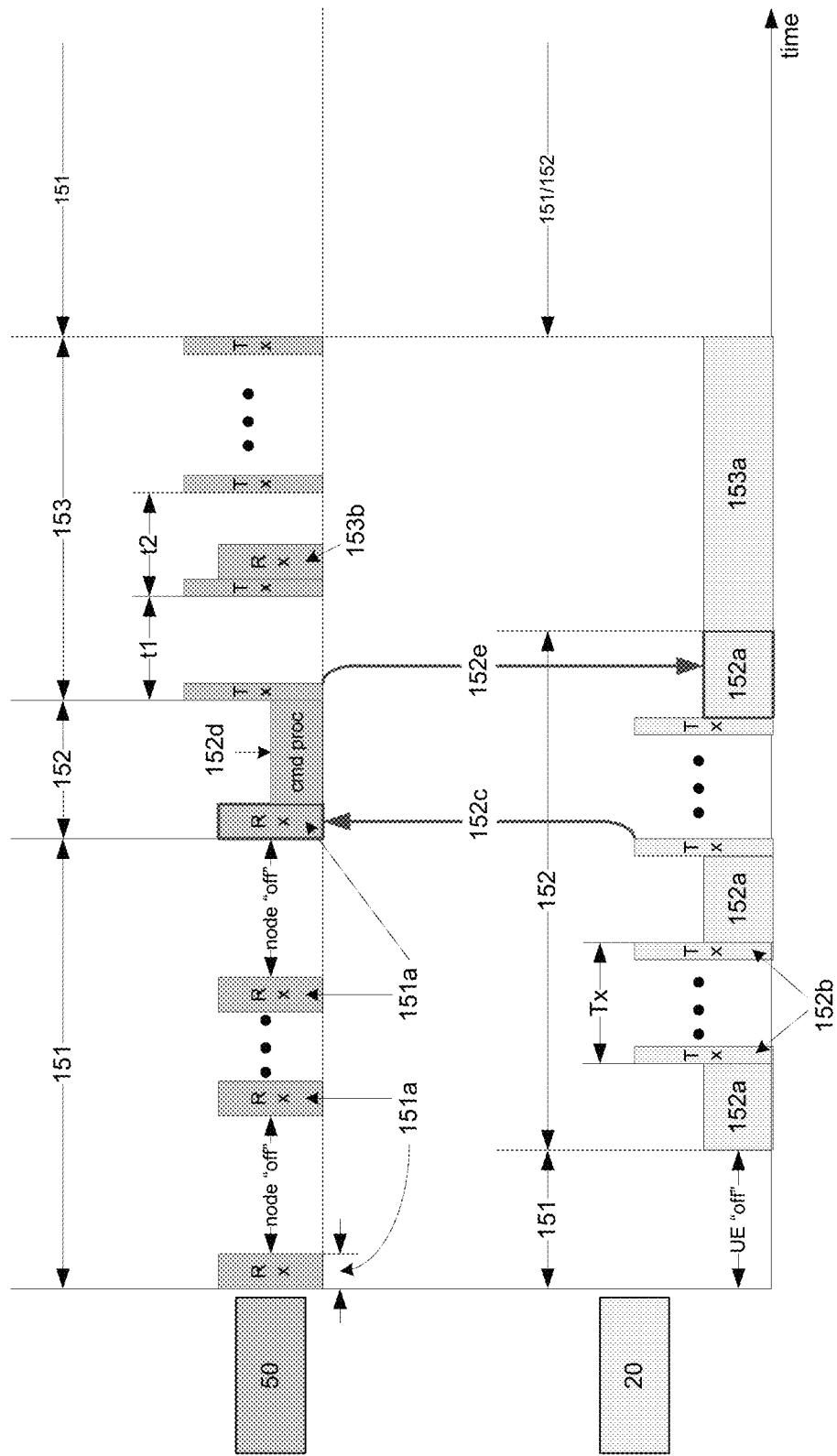
FIG. 11 illustrates an exemplary interactivity between a node and a user equipment device.
Figure 11A:
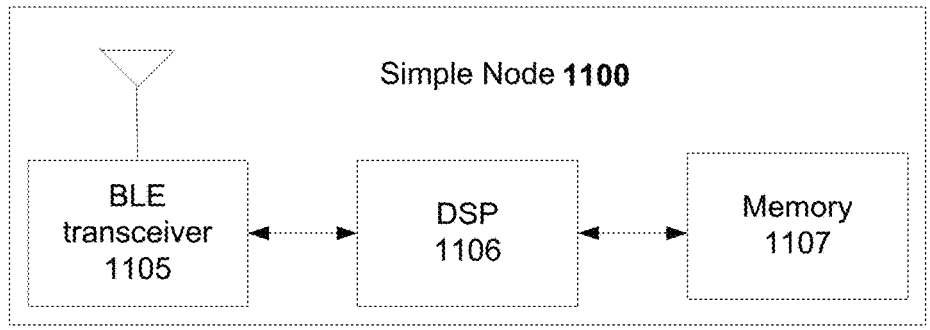
FIGS. 11A-B illustrate an exemplary simple node and operation in another embodiment of PPS.
Figure 11B:
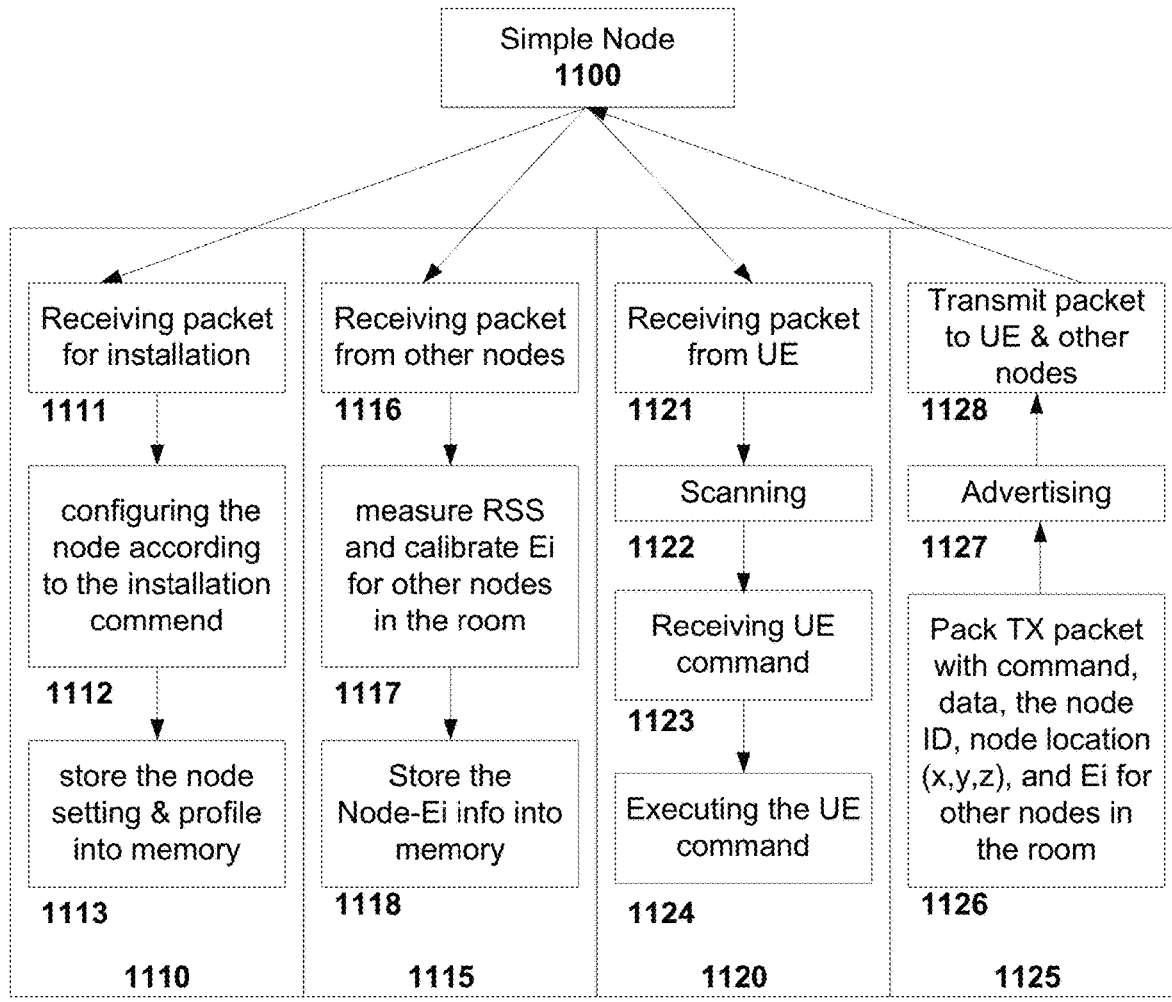

An exemplary PPS SN 1100 may be illustratively provided for in FIGS. 11A and 11B. According to the illustrative embodiment of FIG. 11A, an exemplary PPS SN may be represented as a hardware block diagram. An exemplary PPS SN 1100 may comprise a BLE antenna and transceiver 1105 that transmits/receives BLE RF signal and data packet, a DSP core 1106 that processes PPS functions, and a memory 1107 to store node profile and PPS-processing information as described herein and/or obtained following any of the disclosed methodologies.

According to the illustrative embodiment of FIG. 11B, an exemplary PPS SN 1100 may be represented in software block diagram fashion. According to this illustrative embodiment, an exemplary PPS SN 1100 may have a plurality of working modes, such as, for example, installation 1110, calibration 1115, RX work mode 1120, and TX work mode 1120.

In an exemplary installation mode 1110, a blank PPS simple node 1100 may be installed in a room after which point a technician shall program the node 1100 with one or more of the following packets of information (step 1111): IDs (such as, for example, node Id, customer id, building id, room id, BLE device id); system profiles (such as, for example, PPS profile, node profile, and configuration profile); location (such as, for example, (x, y, z) of the node in the room); room profile (such as, for example, room layout info, room free space info, number of PPS nodes installed in the room); and security setting to protect the information on the node 1100, e.g., in node memory 1107, and PPS. With reference to profiles which may be programmed into an exemplary noted 1100, such profiles may preferably include HW/SW version tracking, access permission level, and/or user account settings for the node 1100. Following installation, an exemplary installation mode may involve configuring the node 1100 according to installation commands from the technician (step 1112) and thereafter storing the resulting settings and profile into PPS SN 1100 memory 1107 (step 1113).

In an exemplary calibration mode 1115, the PPS SN 1100 may receive packets of information (e.g., signals) from adjacent nodes in the PPS (step 1116). For example each adjacent node may broadcast its location (x, y, z) and node id info. (Step 1116). The PPS SN 1100 may then measure the $RSS_i$ of the i-th node, and subsequently decode the (x, y, z) and node id from the data packet sent from the i-th node. Thereafter, an exemplary calibration mode 1115 may involve measuring RSS to determine the E coefficient for each other node in the same room space. In an exemplary embodiment, the mode 1115 may calculate $E_1$ for i-th node in the room, where "i" is all other node(s) in the room except for PPS SN 1100 (step 1117). With these information, current simple node 1100 may calculate the distance "$d_i$" between the i-th node and current node; and then calculate $E_1$ based on the $d_i$ and $RSS_i$. The calibrated Ei and i-th node id may be stored in memory, and sent to UE (PPS master processor) when UE needs (Step 1118).

An exemplary RX work mode 1120 may include a BLE packet reception (Step 1121), scanning (Step 1122), handshaking with UE, receiving UE command (Step 1123), and executing the UE command (Step 1124).

An exemplary TX work mode 1125 may include a BLE transmission of a packet with command data (Step 1126), advertising the packetized data (Step 1127), engaging in handshake with UE, prepare TX data packet, adjusting TX power, and transmitting the response and data to UE or other nodes (Step 1128).

An exemplary RX/TX work mode may be diagrammatically shown in the illustrative embodiment of FIG. 11. According to the illustrative embodiment of FIG. 11, an exemplary node 50 and UE 20 have a plurality of operation modes, such as, for example, sleep mode 151, wakeup mode 152, and PPS working mode 153.

In a time-order sequence, a node 50 or a UE 20 may start from sleep mode 151 or "off" by being powered "on". In an exemplary time interval 151a of sleep mode 151 for node 50, the node 50 may scan UE 20 wakeup signal for a short time, e.g., 200 ms, or, when node 50 has been asleep for a proportionately longer period of time, it may scan a UE 20 wakeup signal for a longer time period, e.g., 2-3 seconds. Accordingly, an exemplary sleep mode 151 for node 50 may continue following repeated attempts 151a to discover a UE 20 wakeup signal. In a preferred embodiment, during sleep mode 151, the BLE of a BLE node 50 may be "off," thereby conserving battery power. Once a UE 20 wakeup signal is detected, the node may exit sleep mode 151 and engage in scanning 152a and sending advertising signals 152b over a period of time Tx.

In an exemplary sleep mode 151 for UE 20, a signal transmission may be turned off until an application (e.g., a mobile app or PPS app on UE 20) needs to start PPS operation. The UE 20 may scan 152a for a PPS node 50's working mode signal. If discovered, UE 20 may operate in a normal working mode 153, otherwise, it may transmit a command signal 152c to wake up other PPS nodes 50 and instruct them to operate in a working mode 153 or operate for a certain duration (t1, t2). UE 20 and other nodes 50 may continue an iterative process of scanning signals 152a and transmitting signals 152c/152e until the next node awakens and receives the UE 20's response transmission 152c. In another embodiment, the UE 20 command signals 152c may be received on a timed interval basis over a block of time or a period 152d. In an exemplary embodiment, a UE wake up command signal 152c may be coded for multiple functions, such as, for example, setting the next working mode time period t1, t2, which may be, for example, 10 minutes, 10 hours, updating node ID, or requesting node 50 to report battery power status.

In an exemplary embodiment, UE 20 may transfer from a wakeup mode 152 to a PPS working mode 153. In one embodiment, UE 20 may receive a wake up command 152e, and then switches to work mode 153 for a time period 153a specified by the command signal 152c or pre-programmed via an application on UE 20. Accordingly, the node 50 may then transmit a PPS signal 152e to begin normal working operation 153 at UE 20. In an alternative embodiment, UE 20 may receive a node 50 working advertising data packet 152e, at which time it may also switch to a normal working mode 153. In an exemplary working mode, a node 50 may check if UE 20 sent a new command for updating information or stop working-mode earlier than previously instructed over a period 153b.

In an exemplary embodiment, after expiration of a working mode 153 time period (t1 or t2, t1+t2, etc.), node 50 may go into sleep mode 151 again. To continue PPS operation, UE 20 would need to send a new wake up command signal 152c to the node 50. Alternatively, after node 50 enters sleep mode 151, UE 20 may thereafter enter sleep mode 151. Further alternatively, node 50 may enter sleep mode 151 following UE 20 entering into sleep mode 151.

Figure 12A:
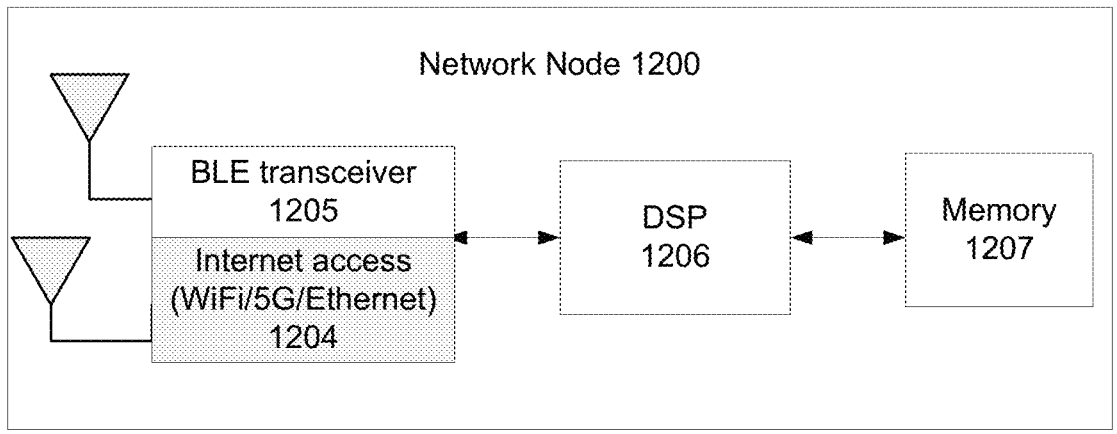
FIGS. 12A-B illustrate an exemplary simple node and operation in another embodiment of PPS.
Figure 12B:
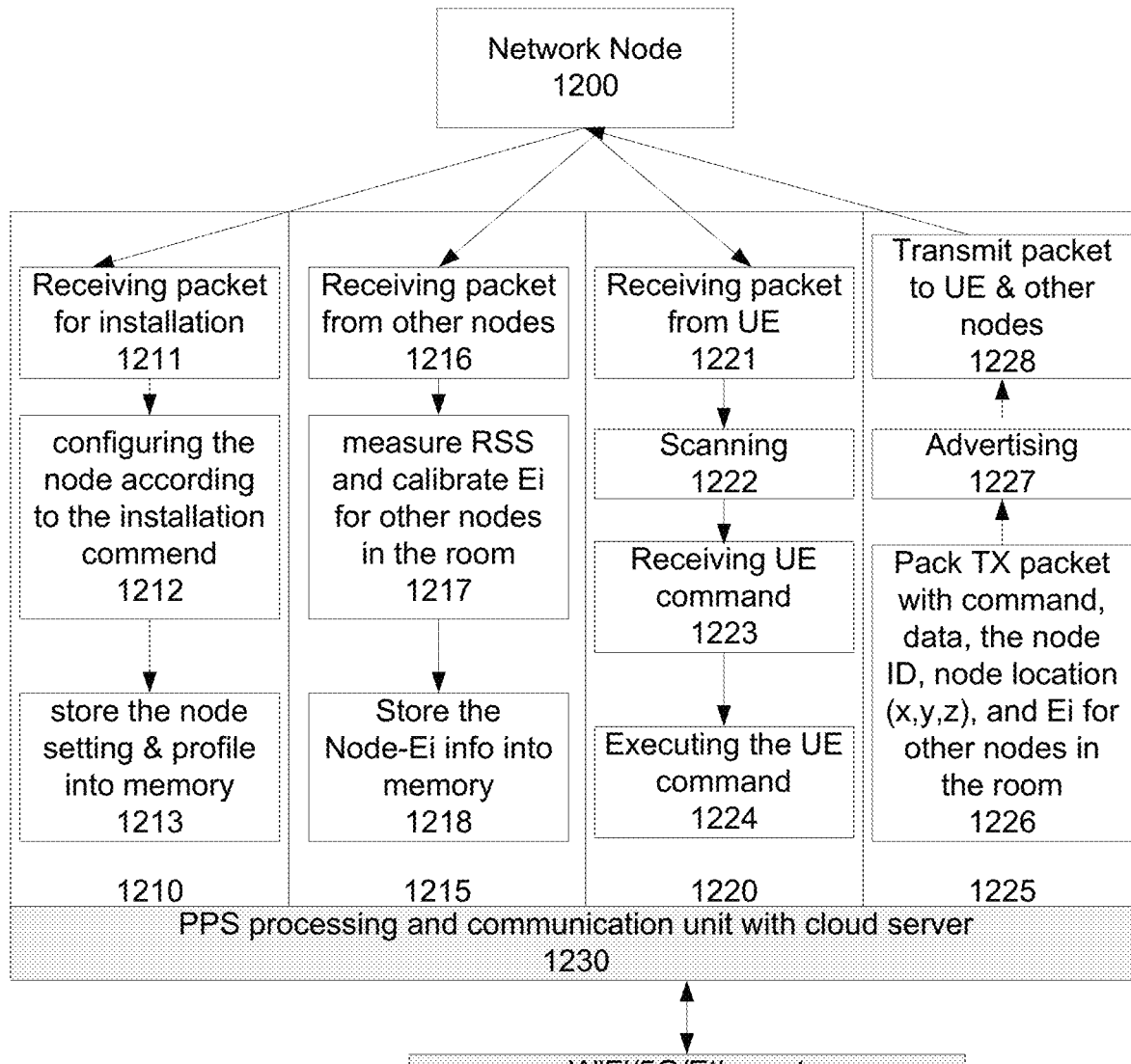

An exemplary PPS NN 1200 may be illustratively provided for in FIGS. 12A and 12B. According to the illustrative embodiment of FIG. 12A, an exemplary PPS NN may be represented in a block diagram form. Similar to a PPS SN, a PPS NN may have a BLE transceiver 1205, DSP 1206, and Memory 1207. In a preferred embodiment, a PPS NN may have the same BLE transceiver, DSP, and memory of a PPS SN, with the addition of a WiFi/5G/Ethernet internet access hardware component 1204. Similarly, a PPS NN may have the same operation modes (installation 1210, calibration 1215, RX work mode 1220, and TX work mode 1225). Likewise, each of the steps (installation mode steps 1211-1213, calibration mode steps 1216-1218, RX work mode steps 1221-1224, and TX work mode steps 1226-1228) may be similar to PPS SN steps (installation mode steps 1111-1113, calibration mode steps 1116-1118, RX work mode steps 1121-1124, and TX work mode steps 1126-1128). However, a PPS NN provides for a processing and communication unit with cloud server 1230, and WiFi/5G/Ethernet protocol and API 1235.

According to an exemplary embodiment of a PPS NN 1200, a single PPS NN 1200 may directly communicate with cloud server 1230. Thus, in an embodiment of a PPS nodal arrangement, one node may be a PPS NN 1200 and the remainder PPS SN 1100. In a preferred embodiment, final UE position calculation may be assigned to either a PPS NN or stored locally on the UE.

An exemplary PPS UE 20 may be a device that has one or more of the following technical characteristics: (i) a BLE transceiver; (ii) a processor with PPS software, or a circuit that has PPS functionality; (iii) memory; (iv) Internet access (2G/3G/4G/5G/WiFi); (v) architecture and/or operation modes of a PPS SN 1100; or (vi) architecture and/or operation modes of a PPS NN 1200. An exemplary PPS UE 20 may be a smart phone with a PPS application, a wearable device, a tag, a badge, or other portable device known to those skilled in the art.

In an exemplary embodiment, an exemplary PPS communication from a PPS node 50 and a UE 20 may take one or more of the forms illustratively provided for in FIGS. 13-20. For purposes of advertising and responding, a UE 20 may be configured as a either a slave BLE or master BLE. A PPS node 50 may also be configured as a either a slave BLE or master BLE. Therefore, in an exemplary PPS, there may exist a plurality of different work modes, e.g., node advertising mode (where the PPS node 50 operates as a slave device) and UE advertising mode (where the UE 20 operates as a slave device). The advertising mode selection is based on each application.

In accordance with this exemplary embodiment, the delivery of an advertising signal by a master BLE and scanning, reception, and processing of the same by a slave BLE may denote a timing interval for the PPS. In an exemplary PPS operation, each subsequent time interval may involve both slave BLE and master BLE repeating the same procedure as in the last timing interval. In a preferred embodiment, each of the BLE timing intervals may have the same length in accordance with industry standards, e.g., Beacon standard and Apple Beacon standard. However, in a more preferred embodiment, the BLE timing intervals may have varying lengths defined by a coded interval length. One benefit of this more-preferred embodiment is a coded interval length may act to better detect PPS nodes and reject non-PPS nodes. Another benefit of this more-preferred embodiment is the ability to save battery power for the PPS node(s). An exemplary coded timing interval length may be defined either by a fixed interval changing pattern, or by a scheduler that dynamically defines next timing interval to reach max gain.

In an exemplary UE-node protocol, a processor may be identified as a central processor if it collects information from all nodes 50 and UE 20 and then calculates the final UE 20 position. A central processor located on a node 50 may be defined as node central, whereas a central processor located on a UE 20 may be defined as UE central. In an exemplary UE central mode, all nodes may send information to UE 20 for processing information and calculating UE position. In an exemplary node central mode, a UE 20 and other nodes 50 may send information to a central node, in which information is processed and UE position is calculated.

According to the exemplary embodiment illustratively provided for in FIG. 13, a slave BLE 50B transmits an advertising signal 27 to connect with a master BLE device, which may take the form of a UE 20A. According to this embodiment, all other nodes (e.g., 51) may likewise be considered in slave mode. An exemplary slave BLE 50B may maintain a beacon property, e.g., sending an advertising signal 27 during each time interval, and/or a PPS property, e.g. sending an advertising signal 27 according to a scheduler configured by the master BLE 20A.

According to the exemplary embodiment illustratively provided for in FIG. 14, an exemplary master BLE 20A may scan the advertising signal, such that once it receives the advertising signal 27, it sends a response signal 28 with further communication commands to the slave BLE 50B. Consequently, each of the BLE devices may establish a communication link over which they can exchange data. When a node sends an advertising signal to a master BLE that is a UE 20A, it also comes with a data packet that comprises one or more of the following and combinations of same: (i) the node id, device id, customer id, building id and room id; (ii) the node location info: (x, y, z); (iii) number of installed PPS nodes in the room; (iv) central processor location for the room at UE 20A, or at a node 50B/51; and/or (v) the measured calibration coefficients $E_1$ for other nodes (e.g., node 51) in the room.

In an exemplary embodiment according to FIGS. 13-14, upon receipt of an advertising signal 27, the master BLE 20A may: (i) measure $RSS_i$ for the node i based on the received node data packet; (ii) collect all PPS nodes information and group it room by room (e.g., received node set for room 1, received node set for room 2)—since a UE 20A may receive node BLE signals from neighbor rooms; (iii) send each room node set info to corresponding central processor device (a node or UE) for UE positioning processing.

According to the exemplary embodiment illustratively provided by FIG. 15, an exemplary PPS node 50A may be configured as a master BLE node and UE 20B configured as a slave BLE. In an exemplary embodiment, each PPS node (e.g., 50A, 51) in a room may be configured as a master BLE. An exemplary master node BLE 50A may always scan an advertising signal 29. In a further exemplary embodiment, UE 20B may always transmit (by broadcasting) advertising signal 29 to all nodes (e.g., 50A and 51) once every timing interval. According to this exemplary embodiment, a slave UE 20B may transmit an advertising signal 29 having at least one data packet comprising one or more of the following information and/or combinations of the same: (i) UE ID; and (ii) a PPS service active status of the UE 20.

After a node 50A receives the UE 20B advertising signal 29 and confirmed that the UE's PPS service is in active state, the node 50A may then send a data packet to UE 20B. The data packet comprises one or more of the following information and/or combinations of the same: (i) node id, device id, customer id, building id and room id; (ii) the node location info: (x,y,z); (iii) number of installed PPS nodes in the room; (iv) central processor location for the room: at UE, or at a node; (v) the measured calibration coefficients Ei for other nodes in the room.

In further accordance with the exemplary embodiments illustratively represented by FIGS. 15 and 16, once slave UE 20B receives the node advertising signal 30, UE 20B may take one or more of the following actions and combinations of the same: (i) measure $RSS_i$ for the node "i" based on the received node data packet; (ii) collect all PPS nodes information and group it room by room (received node set for room 1, received node set for room 2, etc.) since a UE 20B may receive node BLE signals from neighbor rooms; (iii) send each room node set info to corresponding central processor device (a node or UE) for UE positioning processing.

Figure 17:
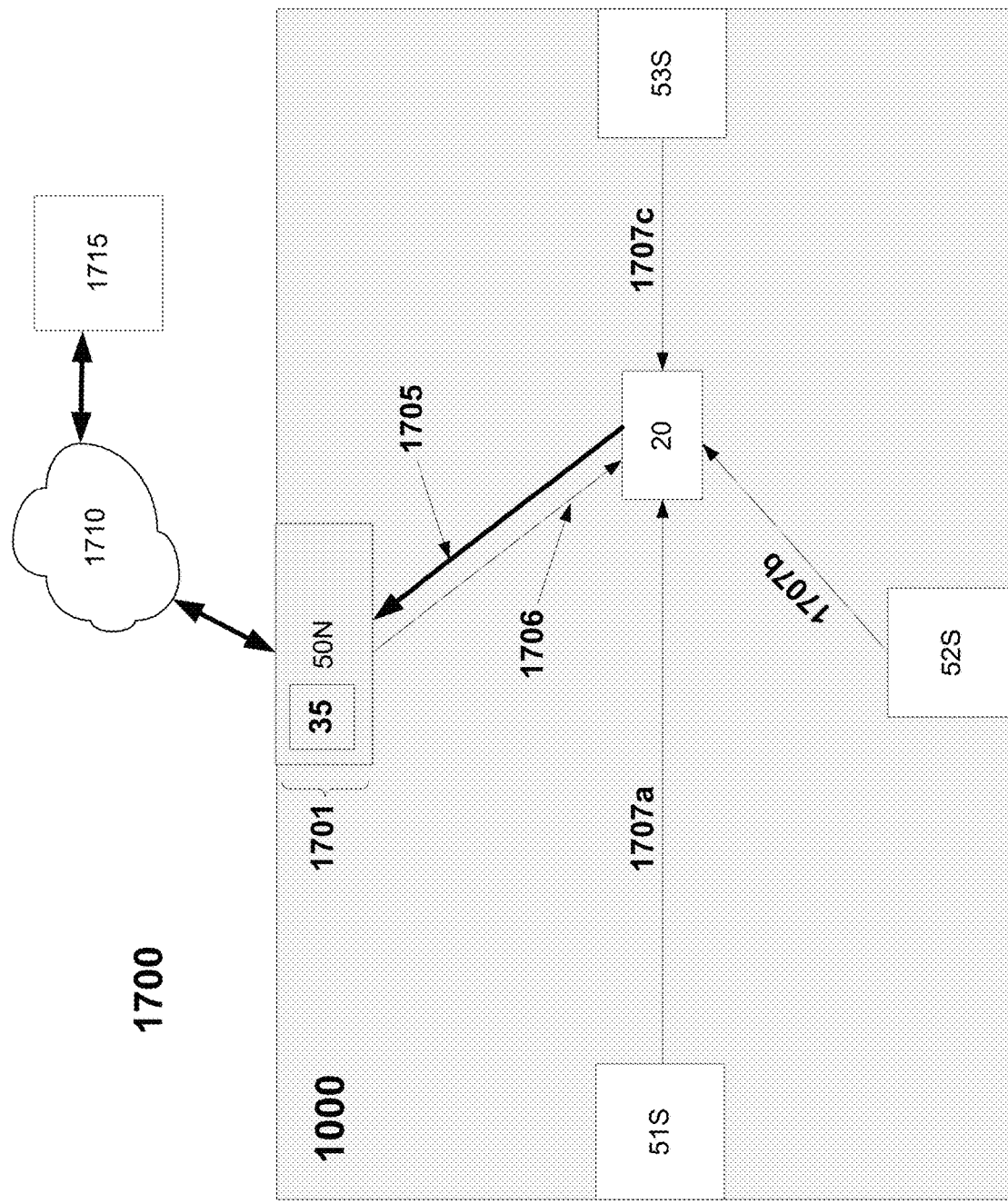
FIG. 17 illustrates an exemplary centralized node PPS.

According to the exemplary embodiment illustratively provided by FIG. 17, an exemplary node-central PPS 1700 may be shown in block diagram form. Typically for node central PPS 1700, central processor 35 is located at network node 50N of room 1000. nodes 51-53 may be simple nodes (51S, 52S, 53S), although use of such nodes as network nodes may be desirable depending on application. Central node 1701 has the central processor 35 to perform UE 20 positioning tasks and Internet access 1710 to work with cloud server 1715. In an exemplary procedure for use of a node 50N in central node 1701 mode may comprise one or more of the following steps, although none necessarily in the order recited: (i) each node 50N/51-53S sends its data packet to UE (1705 and 1707a-c); (ii) UE 20 measures the node $RSS_i$, whereby "i" corresponds to nodes 50N/51-53S; (iii) UE 20 groups node set per room 1000; (iv) UE 20 sends the room node set to corresponding central node 1701 (1706); (v) the central node 1701 calculates the UE 20 position; (vi) the central node 1701 works with cloud server 1715, e.g., updates the cloud database; (vii) the central node 1701 sends the UE positioning result to UE 20 (1705); and (viii) UE 20 takes action based on the calculated UE position.

Figure 18:
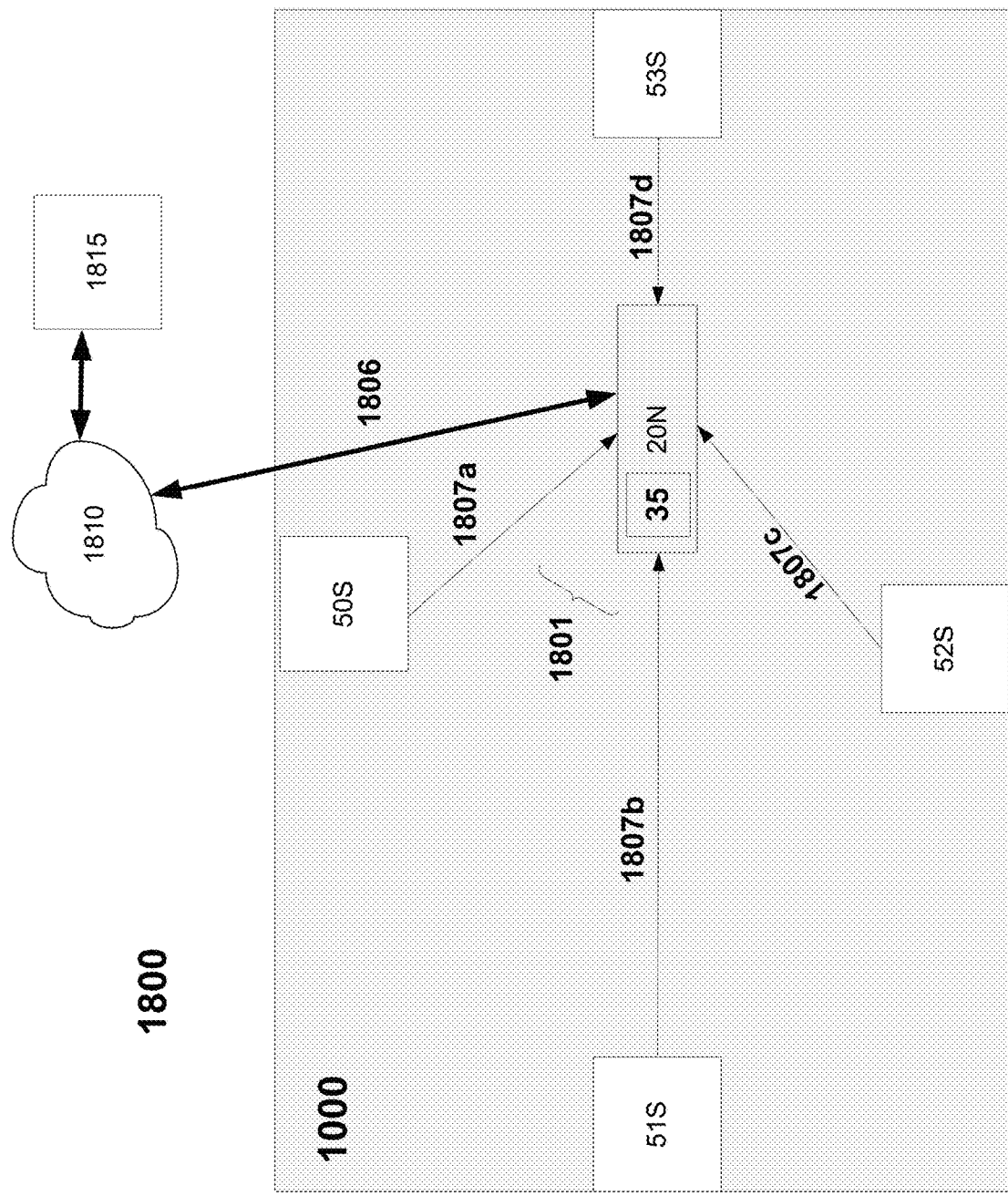
FIG. 18 illustrates an exemplary centralized user equipment PPS.

According to the exemplary embodiment illustratively provided by FIG. 18, an exemplary UE-central PPS 1800 in a room 1000 may contain a central node 1801 comprising a network UE 20N with a central processor 35 that allows UE 20N to perform positioning calculations. In an exemplary procedure for use of a UE 20N in central node 1801 mode may comprise one or more of the following steps, although none necessarily in the order recited: (i) each node 50S, 51S, 52S, 53S sends its data packet to UE 20N (1807a-d); (ii) UE 20N measures the node $RSS_i$, whereby "i" corresponds to each node 50-53S in room 1000; (iii) UE 20N groups node set per room 1000; (iv) UE 20N calculates the UE position; (v) UE 20N works with cloud server 1815 and update the cloud database; and (vi) UE 20N takes action based on the calculated UE position.

Figure 19:
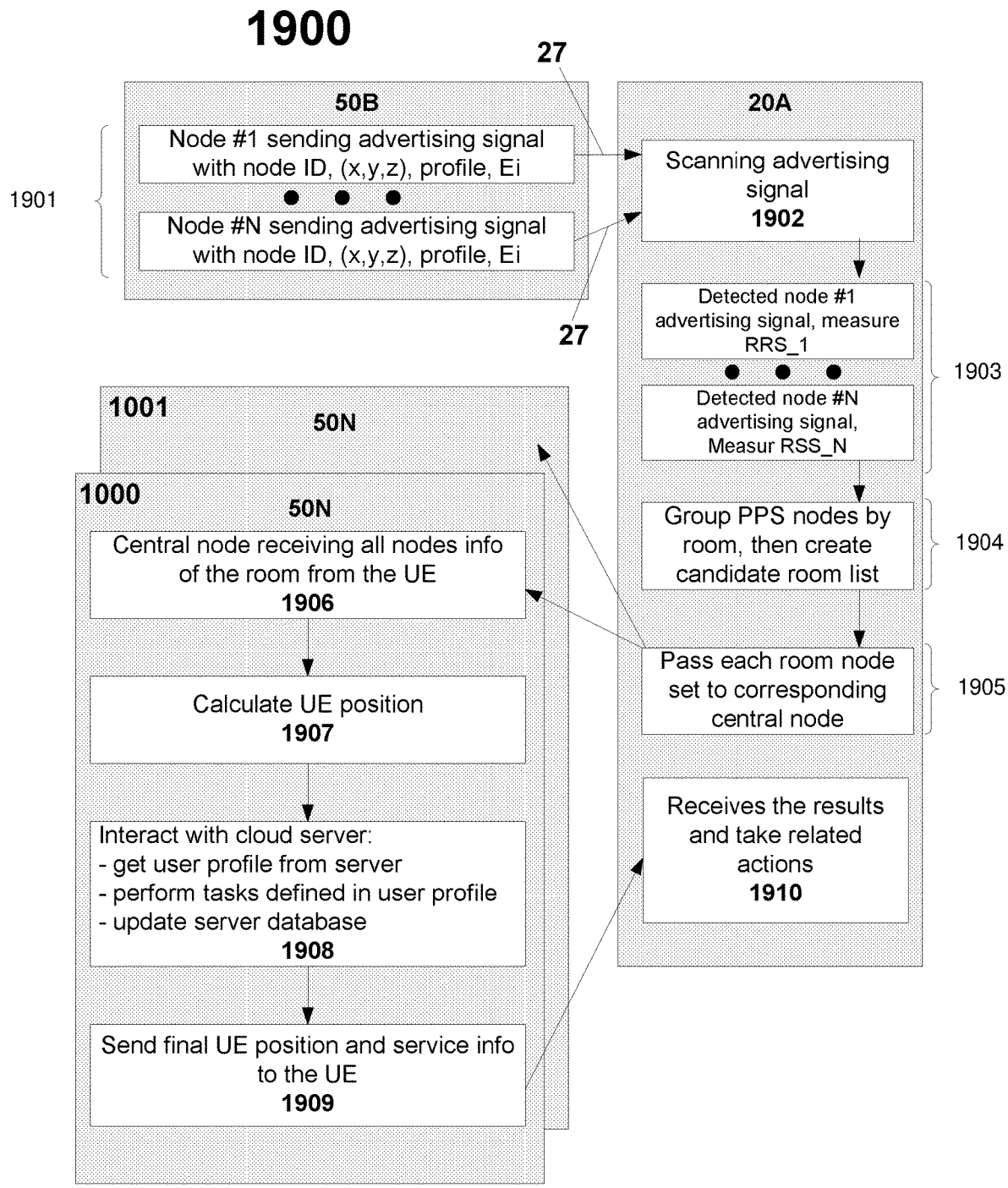
FIG. 19 illustrates an exemplary node-slave and centralized node version of PPS.

According to the exemplary embodiment illustratively provided by FIG. 19, an exemplary node-slave and node-central protocol 1900 may be provided. As illustratively indicated, each PPS node may be configured as a slave node (e.g., a slave BLE, 50B), and the UE configured as a master (e.g., a master BLE, 20A). In steps 1901, each slave node 50B sends an advertising signal 27 at least once per timing interval with a data packet that comprises one or more of the following information and/or combinations of the same: (i) node id, device id, customer id, building id and room id; (ii) node location info: (x,y,z); (iii) number of installed PPS nodes in the room; (iv) central processor location for the room (e.g., central node ID); and (v) measured calibration coefficients $E_i$ for other nodes in the room.

In further accordance with the exemplary embodiment illustratively provided by FIG. 19, an exemplary node-slave and node-central protocol may have the master UE 20A scan the advertising signal from each node (step 1902), after which point, the UE 20A and its respective advertising node 50B exchange data packets bidirectionally via a handshake method known to those skilled in the art.

In further accordance with the exemplary embodiment illustratively provided by FIG. 19, an exemplary node-slave and node-central protocol may have the master UE 20A measure $RSS_i$ for each node "i" based on the received node data packet (step 1903). A master UE 20A according to the illustrative embodiment of FIG. 19 may thereafter collect each node's information and group it room by room (e.g., room 1 node set, room 2 node set) since a UE 20A may receive node BLE signals from neighbor rooms (Step 1904). An exemplary composition of node set information may be one or more of the following or combinations of same: (i) node i ID; (ii) node i (x, y, z); and (iii) $E_i$ for node "i" measured from UE 20A.

In further accordance with the exemplary embodiment illustratively provided by FIG. 19, an exemplary node-slave and node-central protocol may have the master UE 20A send each room node 50B set info corresponding to a central node 50N (step 1905) for that room (e.g., room 1000's central node 50N and room 1001's central node 50N).

In an exemplary embodiment of a PPS acting pursuant to the illustrative operation depicted by FIG. 19, a central node 50N may receive node set information of the room from UE 20A (step 1906), calculate UE 20A position using one or more of the calculations described (step 1907), and interact with cloud server (e.g., such as cloud server 1710, 1810). An exemplary interaction with a cloud server may include, for example, (i) getting user profile from server; (ii) performing tasks defined in user profile; and (iii) updating server database. Subsequently, each central node 50N may then send a calculated UE 20A position result to UE 20A (step 1909). Thereafter, the UE 20A may have an application for receiving the calculated UE 20A position from each central node 50N for each room 1000, 1001, etc. and executing functions based on the received UE 20A position (step 1910). In an exemplary embodiment, the data communication between a plurality of BLE devices, e.g., 50N and 20A, may use a data channel in a connected mode. In this way, the information passed between a plurality of BLE devices may be bidirectional as a result of using the advertising channel in the scanning mode and the data channel in the connected mode.

Figure 20:
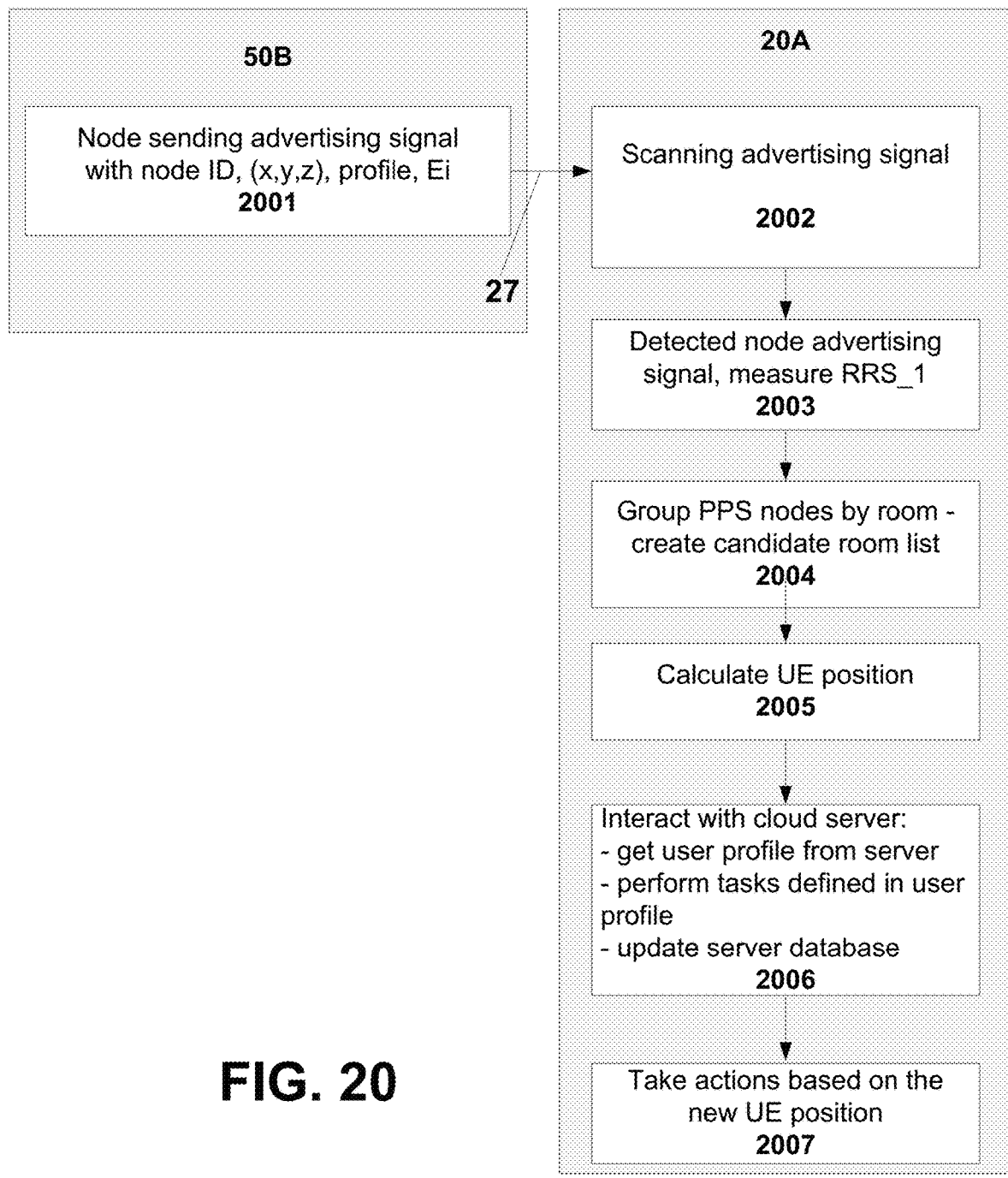
FIG. 20 illustrates an exemplary node-slave and centralized user equipment version of PPS.

According to the exemplary embodiment illustratively provided by FIG. 20, an exemplary node-slave and UE-central protocol 2000 may be provided. As illustratively indicated, an exemplary node-slave UE-central mode PPS may first establish a UE-node link between nodes configured as slave (e.g., node 50B) and an UE 20A configured as a master. Like the PPS illustrated in FIG. 19, each slave node 50B sends an advertising signal 27 at least once per timing interval with a data packet that comprises one or more of the following information and/or combinations of the same: (i)

node id, device id, customer id, building id and room id; (ii) node location info: (x, y, z); (iii) number of installed PPS nodes in the room; (iv) central processor location for the room (e.g., central node ID); and (v) measured calibration coefficients $E_1$ for other nodes in the room (step 2001).

As exemplified in the illustrative embodiment of FIG. 19, a master UE 20A according to the embodiment illustrated in FIG. 20 may scan the advertising signal from each node 50B (step 2002), exchange data packets with the node 50B via a bi-directional using handshake method to allow it to thereafter measure $RSS_i$ for the node "i" based on the received node data packet (step 2003), and collect all PPS nodes information and group it room by room (step 2004). An exemplary composition of node set information may be one or more of the following or combinations of same: (i) node i ID; (ii) node i (x, y, z); and (iii) $E_i$ for node "i" measured from UE 20A.

In further accordance with the illustrative embodiment of FIG. 20, a UE 20A may then calculate its UE position (step 2005), interact with a cloud server (such as cloud server 1710, 1810) (step 2006), and then take actions based on the UE position calculated (step 2007). An exemplary interaction with a cloud server may include, for example, (i) getting user profile from server; (ii) performing tasks defined in user profile; and (iii) updating server database.

Figure 21:
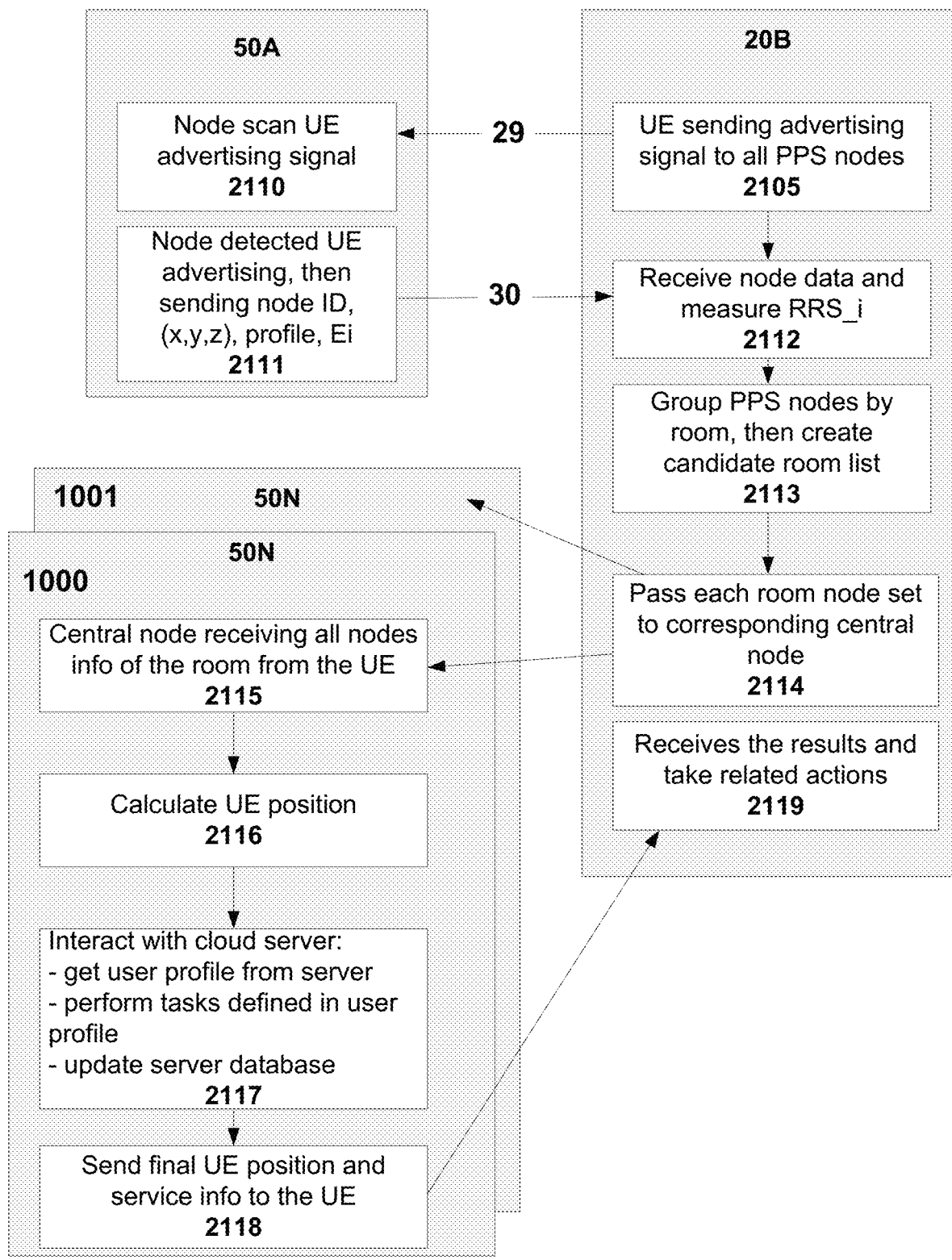
FIG. 21 illustrates an exemplary node-master and centralized node version of PPS.

According to the exemplary embodiment illustratively provided by FIG. 21, an exemplary node-master and node-central protocol 2100 may be provided. As previously described, the protocol 2100 may involve configuring each node as a master node (e.g., 50A) and the UE as a slave (e.g., 20B). According to this exemplary embodiment, UE 20B transmits an advertising signal 29 with a data packet, that comprises one or more of the following: (i) UE ID, customer ID, customer profile info; (ii) application info; and (iii) UE HW/SW version.

According to this exemplary embodiment, in response to UE 20B signal 29 according to protocol 2100, each node 50A may scan the signal and data packet (step 2110). According to an exemplary embodiment, once UE 20B status is verified, each node 50A may transmit a data packet 30 to UE that comprises one or more of the following and combinations of same: (i) node id, device id, customer id, building id and room id; (ii) node location info: (x, y, z); (iii) number of installed PPS nodes in the room; (iv) central processor location for the room (e.g., central node ID); (v) measured calibration coefficients $E_1$ for other nodes in the room (step 2111).

In further accordance with the illustrative embodiment of FIG. 21, after node 50A received UE 20B's advertising signal, UE 20B and node 50A may exchange data packets (29/30) via bi-directional handshake method. Subsequently, UE 20B may measure $RSS_i$ for the node "i" based on the received node data packet (step 2112), collect all PPS nodes information and group it room by room (e.g., for instances where a UE 20B may receive node 50 signals from neighbor rooms) (step 2113), and pass room node information to each network node 50N for a given room (e.g., rooms 1000, 1001). An exemplary node set information has been previously provided for with respect to embodiments of FIGS. 19-20 and would apply to this exemplary embodiment according to FIG. 21 as well. Subsequently, UE 20B sends each room node set info obtained in Step 2113 to a corresponding central node 50N.

In further accordance with the illustrative embodiment of FIG. 21, an exemplary central node 50N receives node set information of the room from UE 20B (step 2115), calculates UE 20B position (step 2116), interacts with a cloud server as previously detailed in the disclosures related to embodiments 19-20 (step 2117), and sends the calculated UE position result to UE 20B (step 2118).

Like the UE 20A of FIGS. 19 and 20, slave UE 20B may possess an application for receiving the calculated UE position from central node 50N (step 2119) and may allow UE 20B to execute based on the calculated position.

Figure 22:
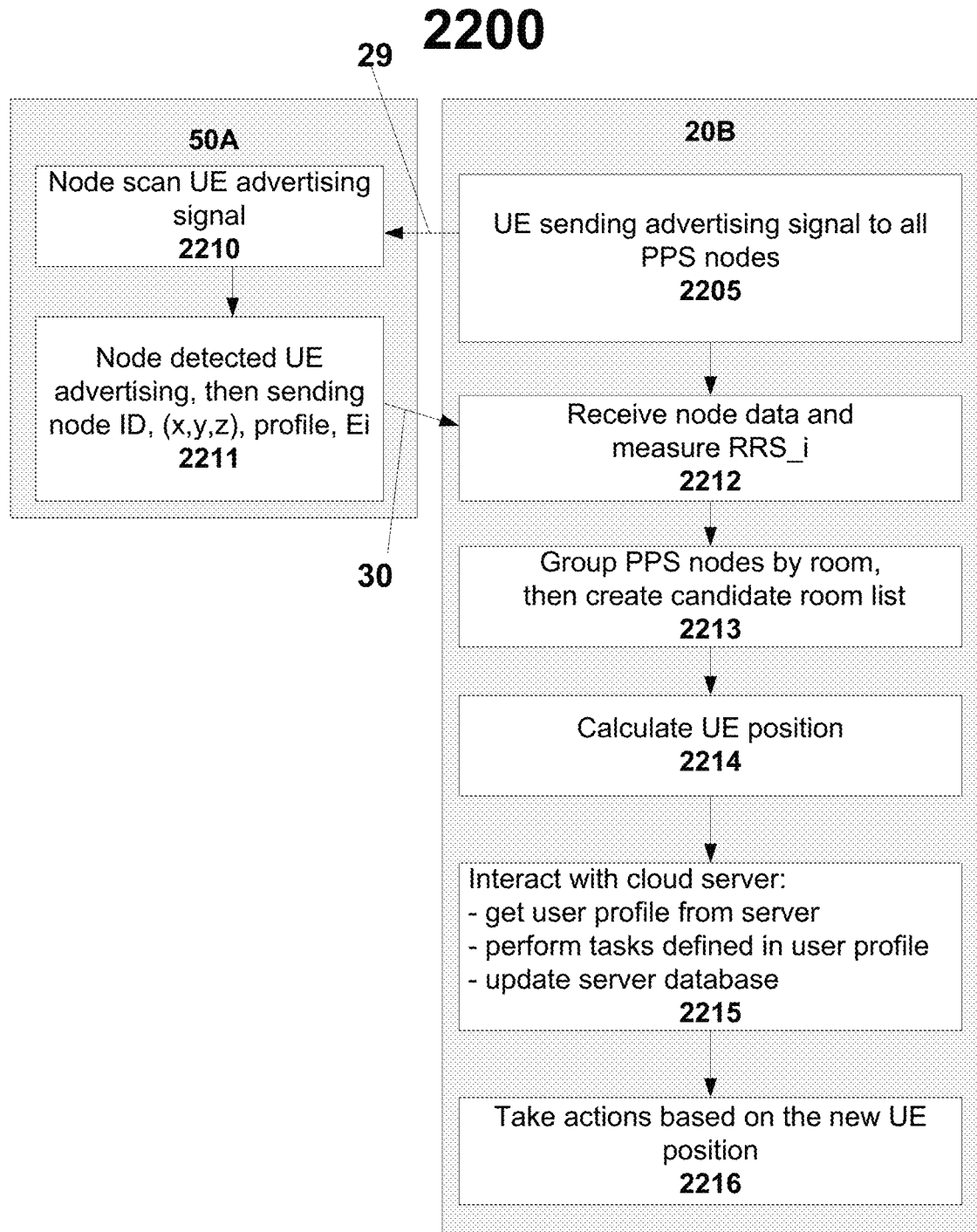
FIG. 22 illustrates an exemplary node-master and centralized user equipment version of PPS.

According to the exemplary embodiment illustratively provided by FIG. 22, an exemplary node-master and UE-central protocol 2200 may be provided. Like the illustrative embodiment of FIG. 21, an exemplary node master and UE-central protocol 2200 may configure each node 50A as a master (e.g., a master BLE) and an exemplary UE as a slave UE 20B (e.g., a slave BLE). According to an exemplary protocol 2200, an UE 20B may transmit an advertising signal 29 with a data packet, which may comprise one or more of the following and combinations of same: (i) UE ID, customer ID, customer profile info; (ii) application info; and (iii) UE HW/SW version (step 2205). Subsequently, each node 50A may scan and receive the UE 20B advertising signal 29 and UE 20B data packet (step 2210). In accordance with an exemplary embodiment of protocol 2200, if UE 20B status is verified, each node sends data packet to UE that comprises one or more of the following and combinations of the same: (i) node id, device id, customer id, building id and room id; (ii) node location info: (x, y, z); (iii) number of installed PPS nodes in the room; (iv) central processor location for the room (e.g., central node ID); (v) measured calibration coefficients $E_1$ for other nodes in the room (step 2211). In further accordance with the illustrative embodiment of FIG. 22, after node 50A received advertising signal 29, UE 20B and node 50A may exchange data packets bi-directional using handshake method (steps 29/30).

In further accordance with the exemplary embodiment illustratively provided by FIG. 22, an exemplary UE 20B may measure $RSS_i$ for the node "i" based on the received node data packet (step 2212), collect all PPS nodes information and group it room by room (e.g., room 1 node set, room 2 node set) since a UE 20B may receive node 50A signals from neighbor rooms (step 2213), calculate UE 20B position (step 2214), interact with cloud server (e.g., servers 1710, 1810) (step 2215), and execute applications based on calculated UE 20B position (step 2216). According to this aspect of the exemplary embodiment of protocol 2200, information of a node set may comprise: (i) node i ID, (ii) node i (x, y, z), and/or (iii) coefficient E, measured from UE 20B for each node i. According to this aspect of the exemplary embodiment of protocol 2200, exemplary interactions with the cloud server may comprise (i) getting user profile from server; (ii) performing tasks defined in user profile; and/or (iii) updating the server database.

In certain embodiments, a PPS node 50 may be battery driven, but an exemplary PPS may enable battery-saving features to maintain node 50 in an optimal and/or active state of operation. In one example, a small signal detection circuit (or function) (e.g., a BLE RF signal detection circuit) may be provided within a node to detects if an UE is nearby. If an UE's signal is detected, then circuit may allow the node 50 to "awaken" or else otherwise remain in a "sleep" mode. One embodiment of this exemplary sleep mode circuit system may entail an UE 20 as an iPhone (or other mobile device or smart device) with app and when the application starts, the iPhone may send out a "wake up" signal until the UE-node BLE link is established. In accordance with this embodiment, the nodes for an enclosure (e.g., a store, museum, or other structure for scheduled visitation) may be scheduled on the opening and closing times or be programed based on dynamic working periods. In the latter scenario, an exemplary PPS may work based on numerous pre-defined working periods, or frames. Accordingly, an UE 20 request to any given node may start a new frame, and the node may return to sleep mode upon passage of the frame time period (e.g., after receiving last frame start request). In this way, an exemplary UE may send frame requests every frame period so as to establish a handshake-based PPS working mode. Thus, a PPS may be enabled based on its desired usage by the UE in the system and need not remain in constant activation awaiting the UE.

In another example of battery-saving features for a PPS, an enclosure may independently detect certain indicia to start the frame, rather than the UE or a pre-defined frame, such as, for example, light sensors detecting day time and night time, motion sensors for when individuals are awake or asleep, temperature/pressure/viscosity/force sensors to detect environmental activity on different parts of an enclosure.

While an exemplary PPS may provide the exemplary indoor-positioning services, it may need to incorporate/combine with other information technology systems such as smart office, smart building, smart home, smart factory, etc. Such incorporated systems may allow a smart PPS to be even more intelligent based on accurate tracking of people's or other object's positions in a space or room.

Figure 23:
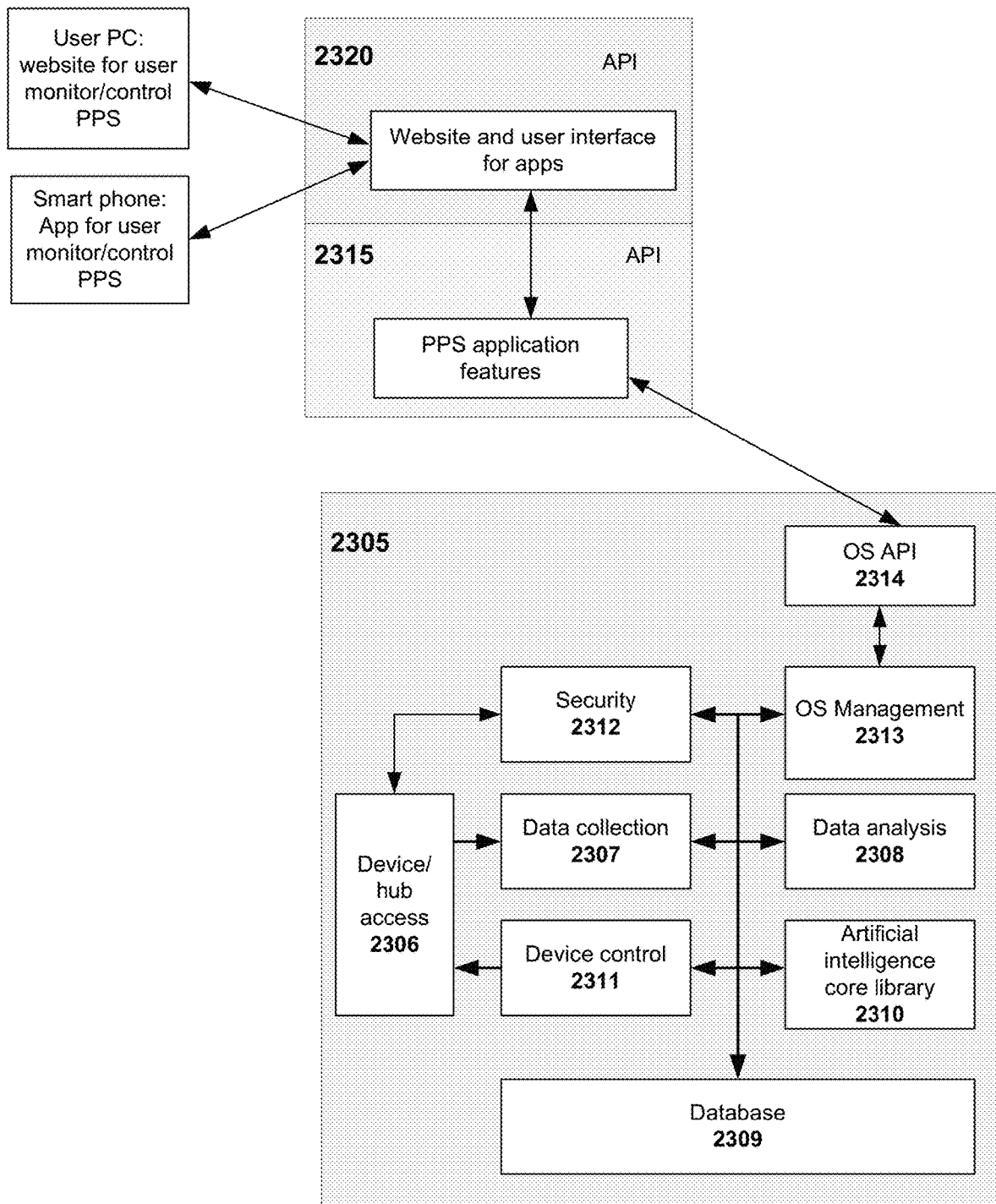
FIG. 23 illustrates an exemplary PPS cloud server layout.

According to the exemplary embodiment illustratively provided by FIG. 23, an exemplary PPS Cloud System 2300 may be provided in block diagram form. An exemplary PPS Cloud System 2300 may comprise a general purpose cloud server software development platform for embedded systems that incorporate a PPS, smart home system, smart building system, and other compatible or related systems known to those skilled in the art.

In association with the exemplary embodiment of FIG. 23, reference to the term "embedded system' may refer to general IoT HW/SW sub-system such as PPS node/UE for indoor positioning, and control systems, such as, sensor board, actuator/control board for smart building, etc. In association with the exemplary embodiment of FIG. 23, reference to the term "device" may refer to PPS node, UE, sensors, and other actuators.

An exemplary Cloud System 2300 may be a general purpose cloud server software development environment for integrating embedded system, smart phone app, and user activities into the cloud server. An embedded system may be connected to the cloud server either through WiFi/5G/Ethernet router or wireless communication based smart phone. As an operating system, Cloud System 2300 may comprise 3 software layers: (i) OS-Layer 2305; (ii) feature layer 2315; and (iii) application layer 2320.

An exemplary OS-Layer 2305 may be a core of the operation system that is a common base for all users, all embedded system (PPS, smart building, etc.), all devices (PPS node/UE, sensors, actuators, and customized I/O), and all application features. In one aspect, it may manage device connectivity, data collections, database dynamic update, data analysis, artificial intelligent core, security, resource management, and API interface to upper layers.

In an exemplary embodiment, device/router access unit 2306 is to establish an access link between the cloud server 2300 and the embedded system devices (nodes, UEs, sensors and actuators) through WiFi/5G/Ethernet, broad band access, or wireless base station, or third party servers. The device access unit 2306 performs read/write data from/to the devices in real time. The OS may connect devices made by different manufactures with different communication standards and interfaces. The device access unit 2306 may also have a common (device independent) access processing module and a device driver library that matches to the different manufactures, communication standards, and interfaces.

In an exemplary embodiment, data collection unit 2307 may enable device read-processing and data collection for each device. The read-processing has a polling mode that reads data when OS pulling, and an interrupt mode that may be configured to automatically read data into a buffer and interrupt OS when the buffer is ready for processing. A choice of the polling mode or interrupt mode may be based on the factors of synchronization, urgent and frequent. An exemplary trigger of the device reading function may also have 3 modes: (i) OS trigger, (ii) user change, and (iii) device-configured read pattern. The device data collection may further include information of the device data and the recording date, time, and measured data from other sensors. It stores a set of history data over certain period.

In an exemplary embodiment, database and data analysis unit 2308 may provide for information correction and processing. In an exemplary database and data analysis unit 2308, 3 categories of unit may exist either alone or in combination: (i) database for single device, single node/UE/room in a PPS, and/or single user; (ii) database for all devices in an embedded system (e.g., a PPS); and (iii) database for multiple embedded systems (e.g., multiple PPSs), and/or for multiple users. These databases may record history data and analyze the data. An exemplary form of history data may include device operation history, events of device operation/status changes, environment change, sensor data change, user activity (UE position movement and route path) and each of these changes' correlations. An exemplary data analysis may include statistical analysis, usage analysis, correlation analysis, and/or user activity pattern analysis.

In an exemplary embodiment, a database 2309 of a device may be used to perform functions using the data collection and analysis for one device. In contrast, a database 2309 of an embedded system may be used to perform functions using the data collection and data analysis across a plurality of devices for all features that are operated over a set of devices (e.g., even if one out of three devices does not interact over the PPS via a certain feature, the database of an embedded system may be used to perform functions involving data collected by that feature on that device nonetheless). Another example of a database 2309 of an embedded system being used to perform functions may include data collection and data analysis cross many different systems and/or multiple users, such as how many users are using each feature and each devices, reliability (based on error detection and reporting) for each feature and each device, frequency of use of operation settings, and correlations between features, devices operations, environment, and the users of same.

In an exemplary embodiment, artificial intelligent core library ("AIC Library") 2310 may hold a set of artificial intelligent core algorithms for application automation. An exemplary AIC Library may automatically detect UE position change and sensor changes (e.g., indicating user activities and environment changes), machine-learn user's habit and environment change patterns, establish user/environment pattern, and control existing device operations and feature settings to optimize the performance for specific applications such as energy saving capabilities, comfort or user preference, predictive selections, automation, etc. An exemplary application feature of an exemplary artificial intelligent algorithm for use with an AIC Library 2310 may include (based on PPS detected people's location), for example, temperature automation, humidity automation, lighting automation, security automation (monitor/notification/alert/control), health monitor and alert, and industry manufacture automation.

In an exemplary embodiment, device control unit 2311 may generate control data and send it to other devices in the PPS. The control data may be generated by combining the input of user operations, sensor measured data, AIC Library 2310 function, database and data analysis unit 2308, and security unit 2312.

In an exemplary embodiment, security unit 2312 may perform security measures for all data and communication links. In an exemplary embodiment, all the data exchanged over the system may be encrypted using, for example, an encryption algorithm known to those skilled in the art, an encryption algorithm mixed with a standard algorithms (like AES (Advanced Encryption Standard) and other proprietary algorithms, such as, for example non-copyable data storage disk security systems as described in U.S. Pat. No. 8,452,988, which is incorporated herein by reference in its entirety. In another alternative embodiment, different embedded systems may use different encryption methods and configurations such that, for example, breaking one device/user does not breach the security of another device/user. Different devices in an embedded system may use different keys or passwords, including configurations in which all such keys/passwords may be changed frequently or be randomly generated for use. The security unit may also have a security checking and reporting function to detect unusual activities and report suspected security attacks.

In an exemplary embodiment, OS management unit 2313 may utilize a server scheduler function that manages timing for all events, devices, features and users as well as quality of service ("QoS") for all users that optimizes server resources and network bandwidth usage. In an exemplary situation, OS management unit 2313 may manage networking resource over loading by giving different processing priority to different users based on the different level of QoS for each of the users. In another exemplary situation, OS management unit 2313 may manage the timing control and resource allocation to user(s) and task(s). In yet another exemplary situation, OS management unit 2313 may detect and analyze resource usage and optimize the resource allocations for the PPS Cloud System 2300.

In an exemplary embodiment, OS API unit 2314 may perform all input/output control for Feature Layer 2315 and Application Layer 2320. In a preferred embodiment, all the information and processing inside OS API 2314 may not be connected to the upper layers except predefined API functions. Accordingly, API functions in this embodiment may only provide top level interface for each feature and device that is needed for user applications. In another exemplary embodiment, access of the API 2314 may require user-authorization check.

In an exemplary embodiment, Feature Layer 2315 may be the application layer of the OS. An exemplary Feature Layer 2315 performs functions to create different application features based on OS core API. It may combine multiple devices together to serve a specific feature by using OS Layer API 2314 functions from device access, device database, data analysis, artificial intelligent lib, and OS-management units. The examples of the features may include (based on PPS detected UE position) for temperature automation, humidity automation, lighting automation, security monitor and alert automation, and manufacture line automation etc.

In an exemplary embodiment, Application Layer 2320 may be a user layer that directly interfaces to a user. An exemplary Application Layer 2320 may have a plurality of types of user interfaces, such as, for example, a web site from any computer, app on smart device (iPhone, Android, iPad, etc.). An exemplary Application Layer 2320 may also permit users to monitor, control, or reconfigure automation settings for their home through either website or smart device apps. In a preferred embodiment, an exemplary Application Layer 2320 may not directly access the OS Feature-Layer, OS-Layer, and database, but may only interact with OS by API functions defined securely for data and user security.

Figure 24:
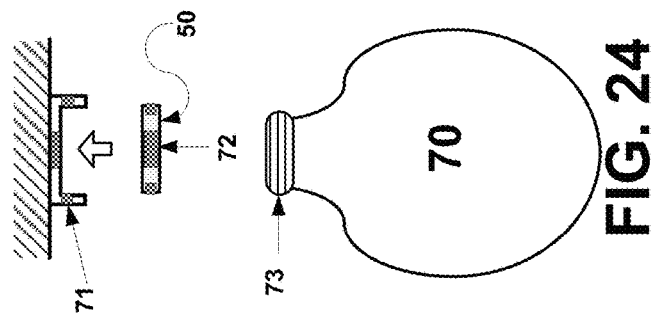
FIG. 24 illustrates an exemplary PPS installation.

According to the exemplary embodiment illustratively provided by FIG. 24, an exemplary PPS node 50 may be a wall-plug powered PPS node 72 via an exemplary light bulb 70 connector port 71. According to one exemplary embodiment, use of a PPS node 50 within a plug-in component 72 may avoid wiring for wall power to the PPS node 50. As illustratively provided for in FIG. 24, an electrical contact part 73 of the light bulb 70 may come into contact with the plug-in component 72 housing PPS node 50. Such an exemplary PPS node 50 may then be powered through the same power supply used to power the light bulb 70. Those skilled in the art would appreciate the use of additional circuitry between the PPS node 50 and light bulb 70 to enable power and voltage regulation to reduce of heat, e.g., feedback control systems tied to thermoresisters and voltage/current shunts. Additionally, plug-in component 72 may contain substantially the same circuitry used in an exemplary wall-mounted node 50, UE 20, including BLE, WiFi, and 5G variants. However, in certain applications, node 50 and its related circuitry may be adequately space and situated to avoid over-heating by bulb 70. In a preferred embodiment, node 50 and/or its circuitry may be insulated with heat resistant material or located towards the center of the plug-in component 72.

Figure 25:
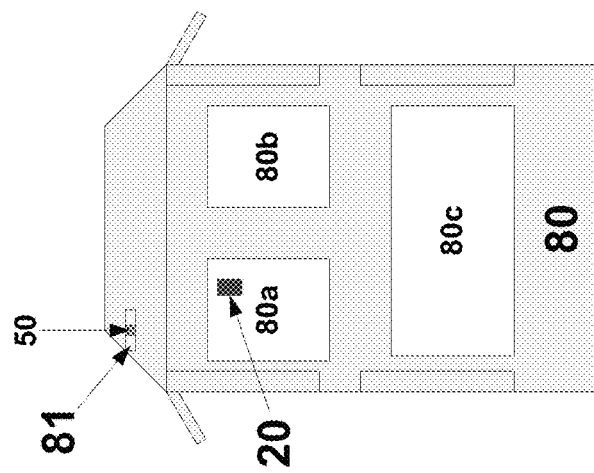
FIG. 25 illustrates another type of exemplary PPS installation.

According to the exemplary embodiment illustratively provided by FIG. 25, an exemplary PPS node 50 may take the form of a chipset adequately sized for being embedded within, adhered to, or otherwise conformed-with a vehicle inspection sticker 81, e.g., a label that is typically placed at the left side of a vehicle 80. Alternatively, a PPS node 50 may be placed in the middle of the vehicle using a single or multi-antenna array to control node working angle, e.g., one antenna in array is substantially targeted to the front of the vehicle as opposed to another, one antenna is pointed towards the driver and another antenna is pointed towards one or more of the passengers). In a preferred embodiment, PPS node 50 in FIG. 25 may be a 1D PPS that can detect whether UE 20, such as, for example, a smart device, is within arm's length of the driver's seat 80a. According to this preferred embodiment, if the UE 20 is within arm's length of driver seat 80a, a PPS application may turn the UE 20 to hands-free mode with speaker for safe communication and entertainment. Additionally and alternatively, UE 20 may also be configured by the PPS application to disable the ability to text or use web-based searching.

Figure 26:
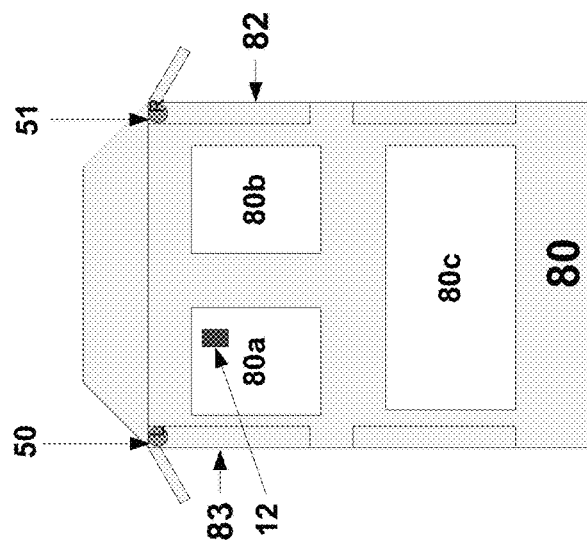
FIG. 26 illustrates yet another type of exemplary PPS installation.

According to the exemplary embodiment illustratively provided by FIG. 26, an exemplary plurality of PPS nodes 50, 51 may be installed at left and right sides of a vehicle 80, such as a car or truck. In a preferred embodiment, each node 50/51 may be the size of a coin that is powered by a battery (not shown). Each node 50/51 may be placed inside the vehicle 80, such as at the corner of a side-mirror, inside a vehicle door 82/83, on the vehicle's dashboard or control section, on an interior ceiling, or in or on a back window.

A PPS node 50 programmed for use in a vehicle 80 may be configured with the following: (i) a unique node ID that is mapped to an vehicle identification number (VIN), (ii) distance of any other nodes placed in the vehicle, such as may be provided by the car manufacturer, (iii) a maximum distance needed by the node 50 for power transmission and use settings (e.g., to save battery power, the node transmitting power shall be set to max distance that is needed by the car size, which may be significantly lower than the power need to transmit in a more open environment such as a large room), and (iv) automatic detection of battery power remaining level and configured to deliver a "low battery" signal to cloud server through any UE 20 installed with the corresponding PPS application.

According to exemplary embodiments in which a smart device or other type of UE 20 uses a PPS application, the application may be downloaded and perform one or more of the following functions in any combination: (i) work in background mode, which means that the user does not need to open the app; (ii) automatically start to work as soon as it scans an advertising signal (e.g., an advertising signal from a node 51 previously installed in a vehicle 80); (iii) calculate the UE 20's position inside a space, e.g., a vehicle 80; (iv) measure moving speed (of UE 20 in a vehicle 80 for example) using GPS or other car speed measurement utilities known to those skilled in the art; and/or (v) interact with an exemplary PPS cloud server 2300 for database update and additional policy and functions defined by the user profile and service agreement. For example, a user may adjust the degree of restrictions to be applied by the PPS against text-and-driving (e.g., parents can set it for the teenage drivers such that they cannot text-and-drive regardless of the speed of the car (as long as the phone is in the car, it is prevent from being able to send/receive text messages)).

In those exemplary embodiments in which a PPS application allows UE 20 to detect vehicle 80 moving speed, a preferred location for such a UE 20 is at driver seat area 80*a*. According to this preferred embodiment, when vehicle 80's speed is above a threshold (e.g., a threshold designed to filter out people's walking speed), then the PPS app may disable all driver distracted functions from the UE (texting, web use, etc.), and may otherwise configure the smartphone for "driver safe" mode.

In those exemplary embodiments in which a PPS application is connected to a PPS cloud server 2300 in conjunction with a UE 20 in a vehicle 80, an exemplary PPS cloud server 2300 may manage user account and database and provide real-time updates to the database through the UE 20 application. According to such exemplary embodiments, a server database 2309 and server analysis unit 2308 may perform the following functions: (i) Vehicle driving status monitoring, such as, for example, identification of who is driving (by Smartphone number) for which car (by PPS node ID) at what time in which location, how many people are sitting inside the car and who is sitting at which seat; (ii) Vehicle driving safety detection and monitoring, such as, for example, how long the driver has been driving, as what time the drive drove the vehicle, on what road was the vehicle, frequency of use of safety application by driver and other usage patterns, average car driving speed compared to speed limit, display and or notification of reminders to driver of any of the foregoing; (iii) Vehicle accident investigation assistance, such as, for example, existence of UE in active mode during a car accident period, status of UE's text or web use during car accident period, hands-free use of UE during accident period, proper attention of user and vehicle to traffic signals (stopping at a stop sign at or before accident period), proper attention of any other user and vehicle involved in accident to traffic signals, number of participants in accident, data from other installed PPS in spaces, including vehicles, not involved in the accident (e.g., witness identification via UE possession); (iv) Finding a lost vehicle, such as, for example, identification of current vehicle location through use of surrounding PPS nodes and sending alert regarding same to intended recipients (e.g., police, insurance company, owner of vehicle), which may be configurable by cloud server account management system; and (v) Privacy control, such as, for example, providing security and privacy control for viewing information obtained via the PPS.

In those exemplary embodiments where a PPS node 50 for use in a vehicle 80 is a network node 50N, a GPS receiver may be added to the node 50N to allow an exemplary cloud server 2300 to send commands to other nodes 50N regarding a vehicle 80's location.

Figure 27:
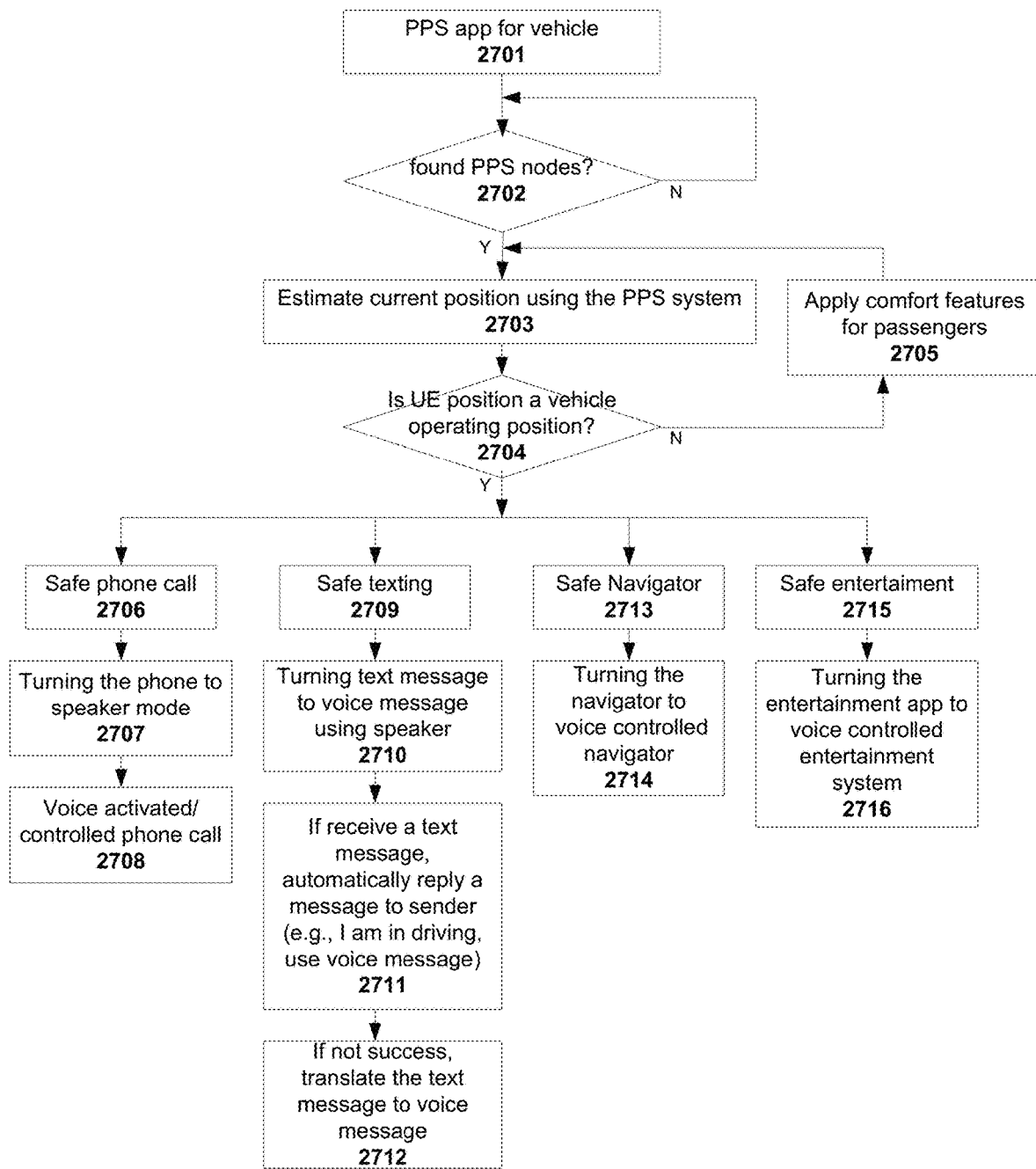
FIG. 27 illustrates an exemplary method of using another embodiment of PPS in a vehicle.

In an exemplary embodiment as illustratively provided by FIG. 27, a safe communication function for texting-while-driving may be provided. According to the illustrative methodology of FIG. 27, a PPS app may be installed for a vehicle 80 and then located (steps 2701 and 2702). The PPS may then be used to estimate the current position of the UE 20 to determine whether the UE is that of a vehicle operator or passenger (Steps 2703-2705).

In one embodiment, a PPS app may still allow user of vehicle 80 to have short message communication while driving, but only in hands free speaker mode (steps 2706-2708). Accordingly, a user may use voice to launch and send a short voice message (steps 2709-2710). In this embodiment, when a text message is received during vehicle operation, an exemplary PPS app may automatically reply to the sender that the user is unavailable and request a voice message from the sender (step 2711). However, in accordance with this embodiment, if the sender also uses an installed PPS app, the voice message used for driving may be automatically activated and used. In further accordance with these embodiments described, where a sender does not have a PPS voice message app available, then an exemplary PPS app of the user receiving the text message may have it automatically translated into a voice message (step 2712). In another embodiment, a user of a PPS app in vehicle operation may use voice to control all phone calls, GPS, Music and other entertainment functions by hands free operation (steps 2713-2716).

Figure 28:
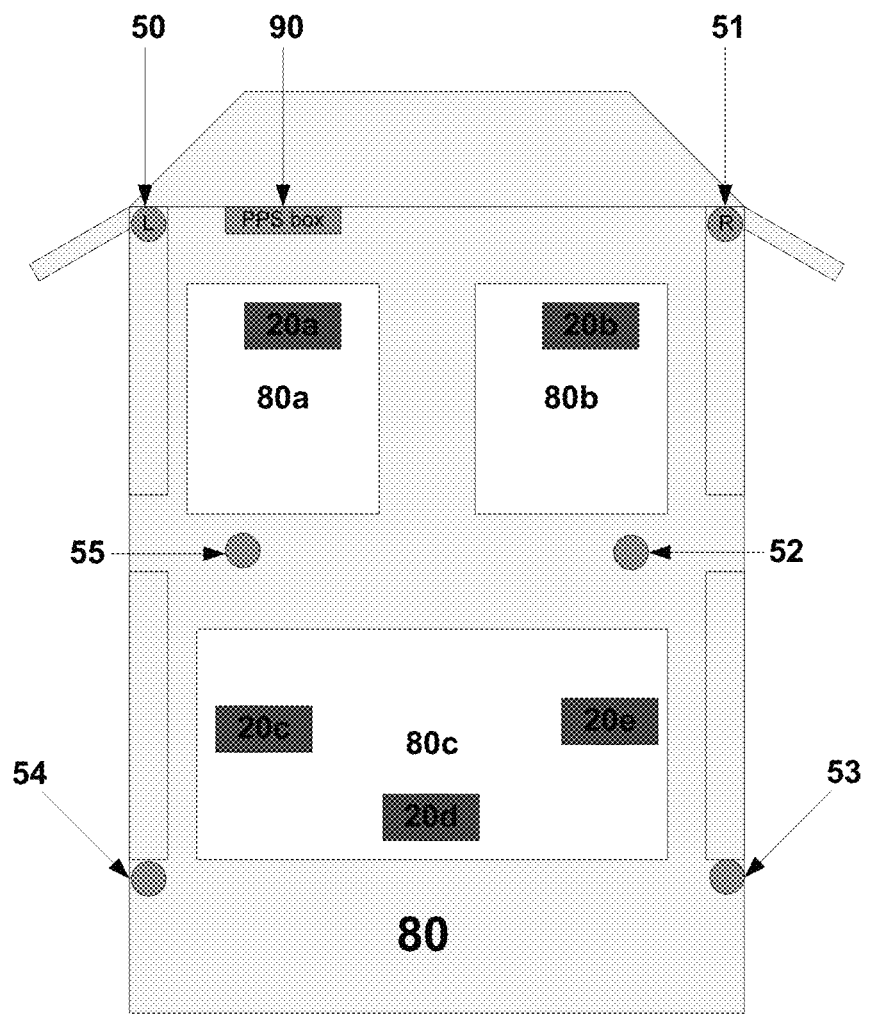
FIG. 28 illustrates a further type of exemplary PPS installation.

According to the exemplary embodiment illustratively provided by FIG. 28, an in-car positioning for a vehicle 80 may be provided. In an exemplary embodiment illustratively provided for in FIG. 28, a vehicle 80 may comprise a plurality of PPS nodes, e.g., nodes 50-55, sufficient to detect positions of persons or objects in a vehicle 80, one or more PPS UE 20*a-e*, such as, for example, a smart phone with PPS app, that the PPS can use to position current location of each of the UE, a PPS control box 90 that may be either built-in a vehicle, or plugged into the vehicle's On-Board Diagnostic (OBD) port (not shown). An exemplary PPS control box 90 may communicate with PPS nodes 50-55 and UE 20*a-e*. Based on PPS-detected information of which passenger sits on which seat in a vehicle 80, the PPS control box 90 may adjust vehicle settings, configuration, such as adjust temperature for occupied area; turn on/off power for heated seat; adjust music volume when driver/passenger is talking on a phone, or on a short message etc. An exemplary PPS control box 90 may have a built-in 4G/5G function that can connect the car to the Internet, and allow the people on the car to do more function on the Internet, but driver only can do hands free, voice controlled functions. As previously described, an exemplary PPS used in conjunction with a vehicle 80 and in accordance with the illustrative embodiment of FIG. 28 may enable real-time monitor and report the vehicle driving status, and issue warnings like speeding, stop sign, high accident area etc.

In another exemplary embodiment, an exemplary PPS control box 90 can communicate with other car's PPS control box and report warnings when another vehicle or PPS-enabled object (e.g., building in which PPS lightbulb node is mounted) is too close by detecting PPS BLE signal. In yet another exemplary embodiment, an exemplary PPS control box 90 may automatically connect to PPS cloud server 2300 and get more real-time assistance when the driver/passenger need. In still a further exemplary embodiment, an exemplary PPS control box 90 may include a built-in GPS, to allow vehicle 80 location to be determined by monitoring sources (e.g., where a parent wishes to locate a child's car, police locating stolen vehicle, insurance locating broken-down carrier of goods).

There exist many other applications for PPS in enclosed locations, such as buildings, museums, and hospitals. For example, in an office building context, a PPS may utilize at least three nodes 50 per room to establish a 3D PPS to locate a UE 20 position based on floor plan and floor number. However, where height information and floor identification are not required, an exemplary PPS in an office context may be a 2D PPS. In a preferred embodiment, any 50-100 feet diameter area of a room or a free space (50 feet range for battery powered node, or 100 feet rang for wall power-plug node) may have 3 or more PPS nodes 50. In a further preferred embodiment, any 50-100 feet diameter area shall have 1 network node 50N that connect all nodes in the area to the cloud server 2300. Where a large space is to be analyzed, multiple POPS nodes 50 may be used to carve the large space into smaller spaces that can be reconnected via the cloud server 2300.

In an exemplary a building context for use of a PPS, an exemplary UE 20 may be a smartphone, wearable, or a portable device, for example, a chip set incorporated into a company badge or company-issued piece of clothing. In another aspect of this exemplary embodiment, a wearable/portable device UE 20 may have buttons, LEDs, displays, and user interface for the application and communication with other devices and cloud server.

Further, an exemplary UE 20 may have different services and/or functions at different locations detected by the PPS, e.g., location-based services and operation. In an aspect of this exemplary embodiment, a Smartphone UE 20 may have a control and communication function to other UE 20 devices as well as location-based applications. Exemplary location-based services may include applications executing when arriving to an office, at which point the application may provide the user office information, such as attendance of other individuals, resources for day, service availability, updates relevant to particular industry, etc. Another exemplary location-based service may include applications executing when the UE 20 arrives in front of an object, at which point audio, video, or virtual reality may be utilized, and/or text information about the object may be generated and provided.

In an exemplary embodiment of a PPS in a building context, an exemplary cloud server 2300 may provide two-way communications with nodes 50 and each UE 20. An exemplary cloud server 2300 may also manage user accounts, databases, data analyses in real time, as well as perform application services.

An exemplary application service for use by a PPS in a smart building context may include: (i) detecting who is in which room and how many people in a room; and/or (ii) automatically configuring and adjusting room temperature, humidity, air quality, and lightings for comfortable and energy saving.

An exemplary application service for use by a PPS in an indoor navigation service context may include: (i) navigating to a destination in a building based on current UE position and current floor plan; (ii) changing floor plan when entering a new floor; and/or (iii) quickly finding and navigating to safe passage from fire or threats, restrooms, exit to a street, information center etc.

An exemplary application service for use by a PPS in a building security service context may include: (i) embedding the UE 20 device (e.g., a chip) into a badge; (ii) tracking a person's route in the building space; (iii) tracking a person entering which room at what time staying for how long; and/or (iv) sending an alarm if a person entering into a security room without room access permission.

An exemplary application service for use by a PPS in a building security service context may include: (i) embedding the UE 20 device (e.g., a chip) into a badge; (ii) tracking a person's route in the building space; (iii) tracking a person entering which room at what time staying for how long; and/or (iv) sending an alarm if a person entering into a security room without room access permission. Additionally and alternatively, an exemplary application service may also allow for a PPS UE device 20 (e.g., a Smartphone) to enable a click or voice-activated emergency help request (e.g., in-building 911 button, call to fire department, medic, or elevator service).

An exemplary application service for use by a PPS in a recording and tracking service context may include: (i) defining a "service target" using an UE 20, or a node 50, and/or a UE/node (x, y, z) position; (ii) use an UE 20 to define a person or an object as a "service executor"; and (iii) define "service done" if a service executor is moving closer to a service target within a certain range (e.g., less than or equal to a defined distance) and/or stays within a given range for a certain time period (e.g., a time range or a maximum or minimum time). In an exemplary application of recording and tracking, a PPS cloud server may be used to determine the service provider, service receiver, and times and locations of a given service.

An exemplary application service for use by a PPS in an office building context to tracking objects in the building may include applying a portable UE 20 on an object and tracking the position of the object in the building. However, additional variations of this context may be disclosed with respect to further embodiments described herein.

An exemplary PPS may be utilized in a museum or other display-based space in much the same way as in the office building context, but with the following additional features and abilities: (i) navigation of a person to a specific displaying art (e.g., when a visitor downloads a PPS app in their UE 20, when the visitor arrives to a displaying art, an exemplary app may show the detailed information about the art in text, audio, video, and virtue reality etc.); (ii) locating missing persons; and (iii) confirming occupancy for purposes of closing, vending, and climate controls (e.g., too many people requires more air conditioning).

An exemplary PPS may be utilized in a hospital space in much the same way as in the office building context, but with the following additional features and abilities: (i) each hospital patient wears an PPS US 20 functioning as an ID device (e.g., a wearable UE 20 with a bush button) allowing hospital personnel to determine patient's current location and track the patient's route; (ii) emergency switches and/or buttons about space to enable UE 20 wearer to call nurse/doctor; (iii) medical staff wearing or carrying their own UE device 20 to enable patients to locate proximity of caretaker; (iv) tracking the time of visit of each medical professional, e.g., which doctor/nurse visited which patient at what time in which room for how long.

An exemplary PPS may be utilized in a mall, shopping center, or related retail space in much the same way as in the office building context, but with the following additional features and abilities: (i) utilizing a mall shopper set of a list of target stores to allow the PPS app to optimize the route and navigate the shopper to each store; (ii) displaying advertisements for stores within proximity of UE carried by user; (iii) enabling other user and/or child location via wearable UE 20 on children, including locations outside of space if UE 20 is a network UE 20N; (iv) Using PPS app creating a target shopping list for a store, optimizing the route and navigating the customer to the location of each shopping item on the list; and/or (v) automatically showing descriptions of the product, list price, discount and other information as well as similar products if unavailable.

In another exemplary embodiment of a PPS used in a retailer context, a self-service store procedure may include a first step of identifying a customer id at an entry (e.g., location with a PPS node and a BLE/camera combination). According to this exemplary embodiment, when a customer is approaching the gate, an exemplary BLE node may automatically perform handshake and check if the customer has a valid account and app on their UE 20. Provided verification of account, a customer ID is identified.

In another exemplary embodiment of a PPS used in a retailer context, a self-service store procedure may include a second step following the aforementioned first step, such second step including verification of the person identity following validation of the customer id. According to this aspect of this exemplary embodiment, the camera may take facial recognition and verify if the person matches a pre-stored personal profile.

In another exemplary embodiment of a PPS used in a retailer context, a self-service store procedure may include a third step following the aforementioned first and second steps, such third step including PPS analysis of a node or UE placed within a store bag for automatic merchandise accuracy.

In another exemplary embodiment of a PPS used in a retailer context, a self-service store procedure may include a fourth step following the aforementioned first, second and third steps, such fourth step including locating merchandise items via a coarse or fine PPS arrangement. An exemplary coarse PPS may be a PPS BLE navigating system that may be installed within the framework of the space, e.g., installed in the room ceiling, and having 1-5 meter accuracy. An exemplary use for an exemplary coarse PPS may be to guide people to the right direction and to the destination merchandise location. An exemplary fine PPS, which may be installed within the merchandise carrying framework, e.g., a shelf or stand, may be utilized to locate objects within inches. In an exemplary embodiment, the coarse PPS may become deactivated based on a user's UE proximity to a fine PPS node and vice-versa.

In another exemplary embodiment of a PPS used in a retailer context, a self-service store procedure may include a fifth step following the aforementioned first, second, third, and fourth steps, such fifth step including detecting a customer picking up a merchandise from a shelf or stand. According to this exemplary embodiment, multiple BLE/Camera nodes may be installed atop each shelf that can see all merchandise placed inside the self. when a customer removes a merchandise from the shelf the camera picture recognition may detect that which piece of merchandise has been removed. This exemplary methodology may also be used in the context of detecting customers putting merchandise back in a given location.

In another exemplary embodiment of a PPS used in a retailer context, a self-service store procedure may include a sixth step following the aforementioned first, second, third, fourth, and fifth steps, such sixth step including detecting when and what merchandise goes into a particular shopping bag. According to this exemplary embodiment, multiple PPS BLE may be installed inside each shelf that provides inch-level accuracy to allocate which customer is closest to the merchandise, and the camera recognition can show the merchandise is moving towards to which customer. or camera can use facial recognition. In a preferred embodiment, a combination of fine PPS and camera recognition/scanning may increase performance of this exemplary embodiment. This exemplary methodology may also be used in the context of detecting customers putting merchandise back in a given location.

In another exemplary embodiment of a PPS used in a retailer context, a self-service store procedure may include a seventh step following the aforementioned first, second, third, fourth, fifth, and sixth steps, such seventh step including verification of total merchandise at an exit gate. In an exemplary embodiment, at an exit gate, a customer may put the shopping bag on a scale to get total weight of the all combined merchandise. Accordingly, a UE 20 phone app may send the total weight of the merchandise to the exit gate node 50 that has scale reading. In one aspect, if the weight numbers from UE 20 and node 50 match, the gate may open and the customer can finish shopping.

An exemplary PPS may be utilized in a manufacturing space in much the same way as in the office building context, but with the following additional features and abilities: (i) tracking staff location; (ii) managing workers and production lines by using UE 20 for workers and sensors for product quantity; (iii) presenting information to workers when in proximity of particular machine/object; and (iv) locating tools/objects as requested.

An exemplary PPS may be utilized in a manufacturing space in much the same way as in the office building context, but with the following additional features and abilities: (i) detecting who is in which room to configure/adjust lightings, temperature, fans, doors, entertainment equipment, and security equipment and (ii) issuing emergency notices for family members donning wearable UE 20.

In another exemplary application of a PPS, one or more PPS nodes 50 may be installed in a television, laptop, or other audio and/or visual entertainment device located a known distance apart from one another (e.g., such as two PPS nodes located at two opposite corners of a television). Alternatively, a PPS according to this embodiment may operate as a separate setup box for the entertainment device or be incorporated into an existing setup box (e.g., such as Apple TV, Google Chromecast, Cable box). A PPS node may be built into the TV or attached on a TV. An exemplary PPS entertainment node may use BLE or WiFi or 3GPP (2G/3G/4G/5G). In an additional embodiment, a PPS Cloud Server 2300 may manage node data collection, data analytic and personalized TV advertisement.

In an exemplary embodiment, a PPS may provide for detecting the UE of a TV viewer and managing personalized TV advertisement. In an exemplary first step of such a methodology, an exemplary PPS node detects who is watching TV, what TV program, and for how long. Where a PPS app may be installed on the UE of the TV viewer, the PPS node may detect the distance to the UE (e.g., a Smartphone) using 1D PPS technology as described herein. Where a PPS app may not be installed on the UE of the TV viewer, the PPS node may then detect the distance to the UE (e.g., a Smartphone) using PPS passive positioning technology as described herein. In an exemplary second step, after detecting the UE distance from the TV or other entertainment device known to those skilled in the art, if the distance is less than a threshold, then the PPS node may consider the user to be the one watching the TV. Concurrently with this exemplary second step, a built-in node within the entertainment device may also know which TV program is playing and for how long. An exemplary cloud server 2300 may also be performing data analytics for a particular program or channel use rate. In a an exemplary third step, the server may manage the entertainment device to personalize the media displayed, broadcast, or otherwise provided to a user as well as personalizing advertisements.

According to this exemplary application of a PPS, the node-installed entertainment device may know exactly which users and how many users are sitting in front of it and whose UE (e.g., smartphone or remote) possess a PPS application. In one aspect, the entertainment device may turn on automatically and tune to a specific channel or station based on the presence of a UE in the room. In another aspect, a station or channel may be automatically chosen depending on time of day and the changing viewing habits of each user stored on UE 20 or associated cloud server 2300. Accordingly, any amount of entertainment device usage may be tracked to each user to provide feedback and lifestyle analytics/habit changes to a data analytics unit via cloud server 2300. Additionally, another aspect of the aforementioned exemplary use of an exemplary PPS may be to select particular advertisements and programming based on the UE 20 in the viewing space of the entertainment device. Additionally, the UE may display different advertisements based on those advertisements and/or entertainment channels or stations that had been viewed by the user of the UE. In this way, this exemplary embodiment of a PPS dynamically alters presentation of media on the entertainment device housing PPS nodes and the presentation of media on one or more UE that interact with those nodes.

Figure 29:
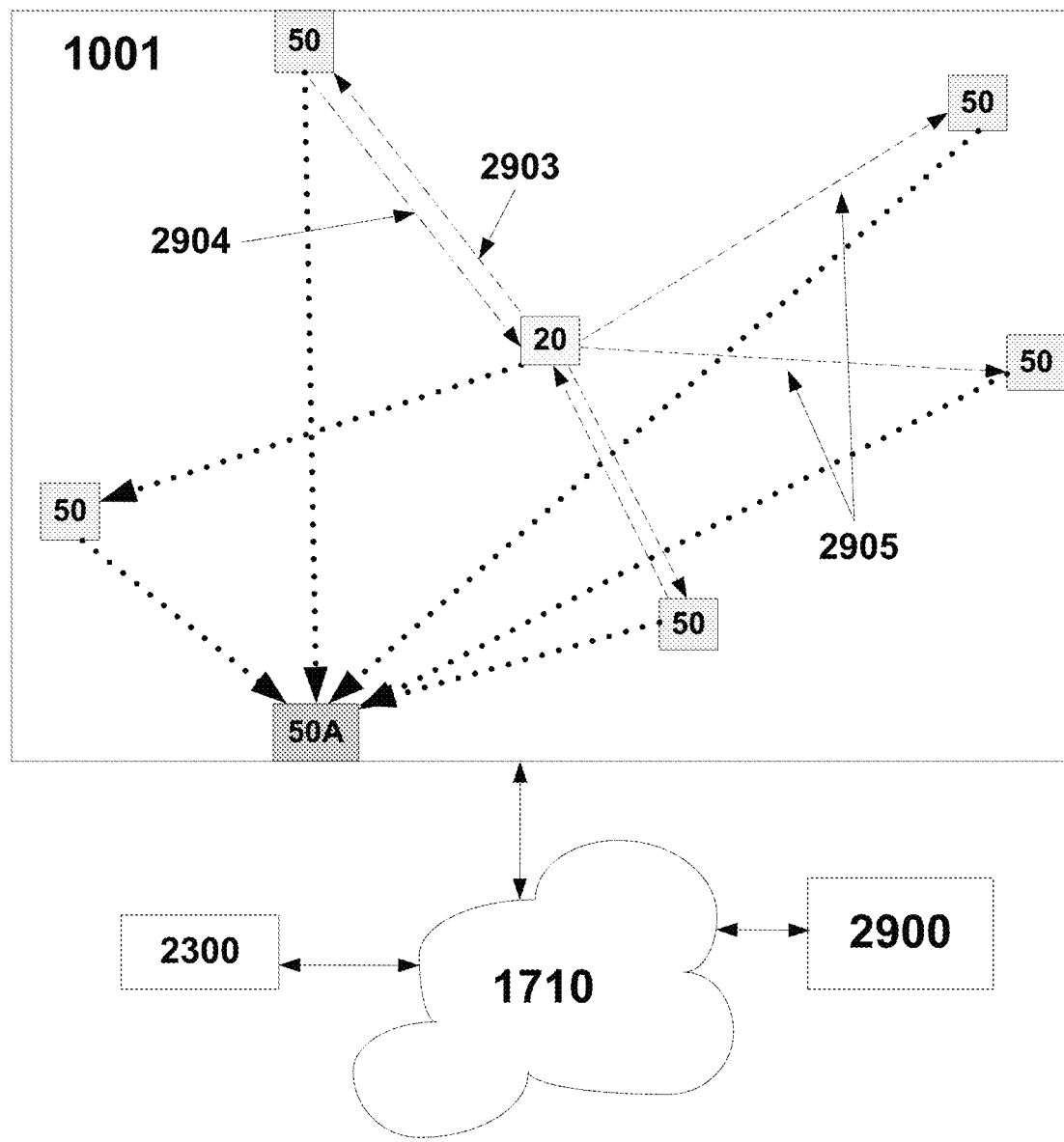
FIG. 29 illustrates an exemplary passive PPS network.

In another exemplary embodiment and with reference to the illustrative embodiment of FIG. 29, detecting a UE 20 (x, y, z) position without need to pre-install an app (e.g., downloading app on smartphone) may be desired for certain applications. Such an exemplary "passive" user positioning system, may comprise a plurality of PPS nodes 50S/N that may contain BLE, WiFi and 3GPP (2G/3G/4G/5G) wireless standard for cell phone). According to this exemplary embodiment, an exemplary PPS node 50S/N may be a fixed node with a pre-known location in space 1001. In another exemplary embodiment, the PPS node 50S/N may be a low cost node device with or without an Internet connection 1710, but having communication pathways with a PPS central node 50A, a PPS cloud server 2300, and/or a customer application server 2900.

With reference to the illustrative embodiment of FIG. 29, an exemplary PPS central node 50A according to the aforementioned embodiment may connect the plurality of PPS nodes 50S/N to the Internet 1710. In a preferred embodiment, the PPS central node 50A may play a central processing role for calculating a UE 20 position.

An exemplary method of passively detecting the position of a UE 20 device may involve determining whether the UE 20 (such as, for example, a Smartphone) is transmitting any BLE, WiFi and 3GPP signal 2903 or 2905 that is communicating to any devices or base-station 50, the PPS node 50 may receive its RSSI and other information, and then calculate its position. In an exemplary embodiment, a PPS node 50 may communicate to the UE 20 (e.g., Smartphone) through a WiFi device-to-device mode (e.g., WiFi Direct). During an exemplary device-to-device initiation and communication, the PPS node 50 may receive the WiFi RSSI 2903 of the UE 20. Subsequently, an exemplary PPS may detect the UE 20 position by using 4D PPS positioning technology as described herein. In another exemplary embodiment, a PPS node 50 may communicate with UE 20 via 3GPP (like 4G/5G) device-to-device mode (e.g., LTE Direct). During an exemplary device-to-device initiation and communication according to this exemplary embodiment, the PPS node 50 may receive the 3GPP RSSI of the UE 20. Subsequently, an exemplary PPS may detect the UE 20 position by using 4D PPS positioning technology as described herein.

In yet another exemplary embodiment, an exemplary PPS node 50 may communicate to a UE 20, such as, for example a Smartphone, through a cell phone location service system (e.g., 911 emergency call service system). According to this exemplary embodiment, during the location service communication, the PPS node 50 may receive the UE 20 signal and information. Subsequently, an exemplary PPS may detect the UE 20 position by using the location service, or 4D PPS positioning technology as described herein.

Figure 30:
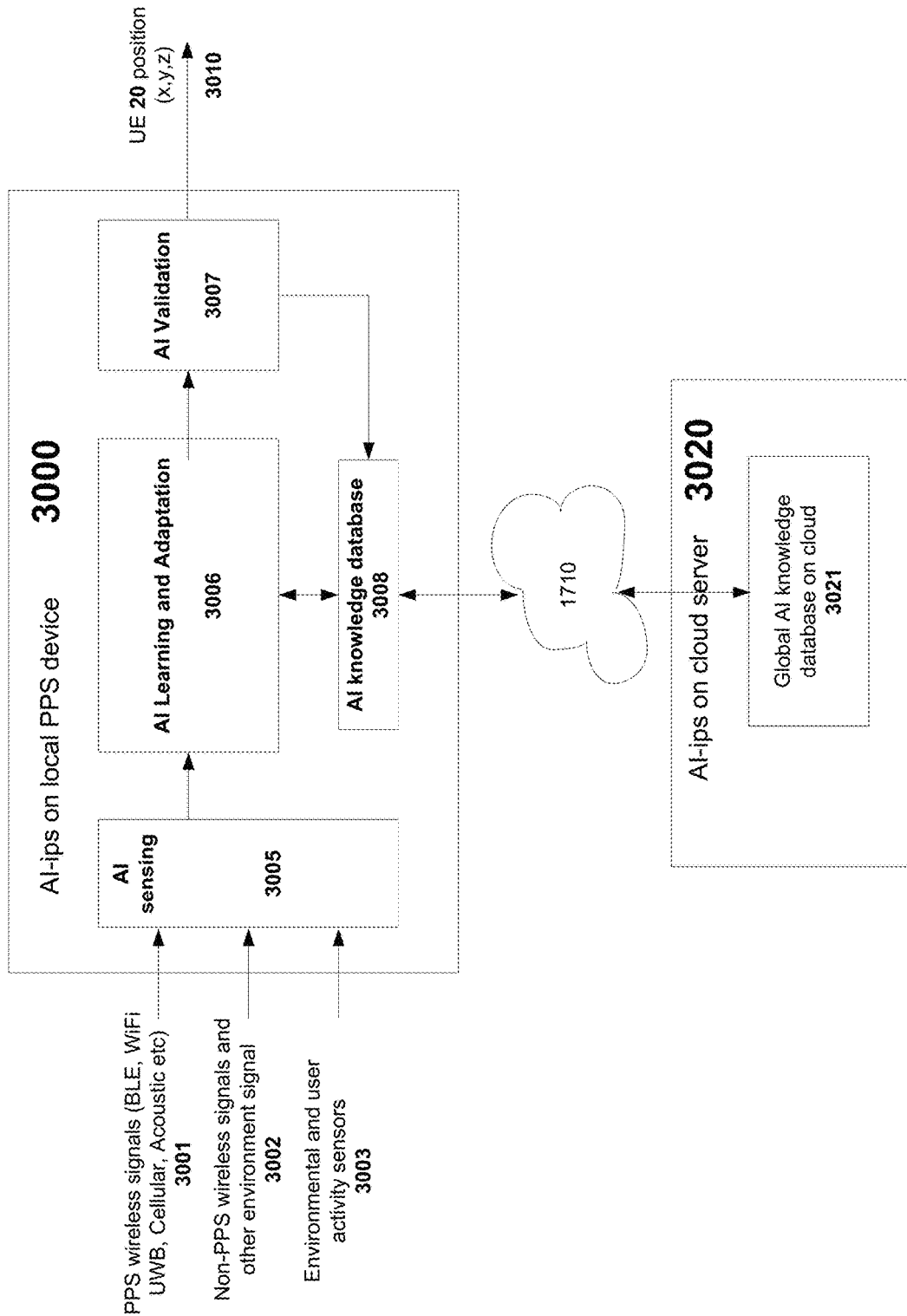
FIG. 30 illustrates an exemplary PPS with an exemplary artificial intelligence enhancement.

According to another aspect of an exemplary PPS, the use of artificial intelligence ("AI") may expand the accuracy and utility of the system. In the illustrative embodiment of FIG. 30, an exemplary Artificial Intelligent Indoor Positioning System ("AI-IPS") 3000 is provided. In an exemplary AI-IPS 3000, an artificial intelligence ("AI") sensing unit 3005 may receive PPS wireless signals (BLE, WiFi, UWB, cellular, acoustic, etc.) 3001, non-PPS wireless signals (e.g., nodes or UE unregistered on PPS network) 3002; and/or information from user/environment/activity sensors 3003. For example, an exemplary AI sensing unit 3005 may detect how many people are nearby a node, e.g., by detecting/analyzing all UE 20 positions at a given time. As another example, an exemplary AI sensing unit 3005 may detect time, weather (temperature, humidity, season), changes in environment via use of AI algorithms for detecting UE routing changes and comparing same to maps or schedules either stored a priori or learned over time. While AI is referenced for use with an indoor positioning system, it is understood that any of the positioning systems disclosed, included those After synthesizing the information obtained, an exemplary AI sensing unit 3005 delivers the synthesized information to an AI learning and adaptation unit 3006. AI learning and adaptation unit 3006 may take the form of a data processing CPU inside a node 50 or UE 20 hardware as described herein, but may call for different performance resources compared to node 50 and UE 20 depending on the AI features utilized. AI software may be distributed on node firmware/digital signal processing equipment, UE CPU, and/or cloud server 2300. In an exemplary embodiment, local AI software on a node 50 or UE 20 may be responsible for signal and data collection and signal and data synthesis in which raw signal data is taken into the system and the AI performs machine learning to adapt environmental changes for the UE 20 which can then be sent to an AI database on the cloud server. In another exemplary embodiment, once the cloud server receives data, the cloud server may have its own AI software to further analyze the information across multiple connected UE to self-learn relationships and/or distinctions between environments and correspond the same to the particular UE(s) and node(s) in that environment.

The AI learning and adaptation unit 3006 may engage in environmental self-learning, user behavior self-learning, AI-modeling adaptation, ALG adaptation, and/or database management, according to AI learning techniques and algorithms known to those skilled in the art. The AI learning and adaptation unit 3006 may operate between the AI validation controller 3007 and the AI knowledge database 3008 to provide the UE position 3010 in Cartesian coordinate. In an exemplary embodiment, the AI knowledge database 3008 may be interconnected via the Internet 1710 to an AI-IPS cloud server 3020, which may contain a global AI knowledge database 3021 accessible via cloud computing or other secure storage facilities known to those skilled in the art.

In an exemplary AI-IPS, the AI learning and modeling may complement or replace the need to increase the number of nodes 50 in a given PPS to achieve accuracy and spatial diversity. In other words, implementing AI at the central node 50A/50N or UE 20A/20N may allow the PPS to accurately locate positions in a space 1001 based on patterns of learned behaviors, movements, and historical positioning. However, if UE 20 is a known mobile device, AI knowledge database 3008 may be able to determine that the UE 20 may be stored at a waist level of a user (e.g., in a pocket, belt clip, or purse) so that the location of the UE 20 is not assumed to be the head of the user. If the AI knowledge database 3008 also contains information on a user's overall height and width as well as limb length, then an AI-IPS 3000 may be capable of identifying the coordinates of the UE 20 within a greater degree of accuracy, and in some cases, within inches. In another exemplary embodiment, the AI-IPS 3000 may be able to select between nodes in different spaces based on patterns of movement for a particular UE 20 (e.g., for a UE 20 that frequently is taken on public transportation, knowledge of the routes would facilitate which nodes to activate to locate said UE 20).

Alternatively, an AI-IPS 3000 may be capable of learning patterns of noise or interference that would need to be discounted in any given PPS measurement analysis. Thus, using the AI-IPS knowledge database 3008, a known disruption pattern can be taken into account when conducting a positioning analysis in the PPS at the same time. Further alternatively, an AI-IPS 3000 may utilize access to a cloud server 3020 and knowledge database 3021 to preempt future disruptions for purposes of positioning identification. (e.g., news of inclement weather thereby increasing populations in a food store and potential increase in non-PPS signals, power outages necessitating reliance on battery power in nodes, band access interruptions for particular UE).

Figure 31:
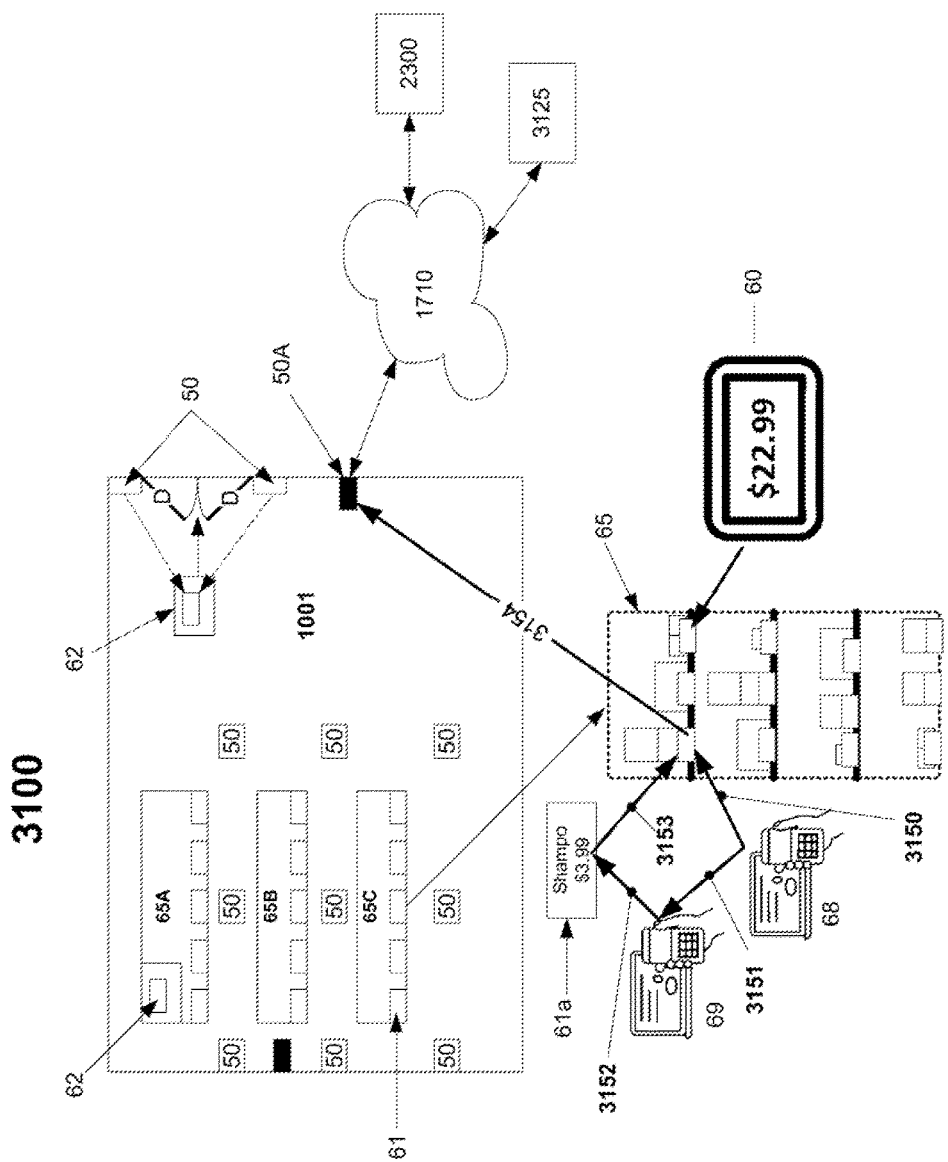
FIG. 31 illustrates an exemplary PPS and method of using the same for product location.

With reference to the illustrative embodiment of FIG. 31, an exemplary PPS inventory management ("PPS-IM") system 3100 may automatically create a product location map for a retail store or a warehouse. An exemplary PPS-IM may comprise a PPS tag 60, which may be substantially the same as a PPS UE 20 as described herein (e.g., a digital device). An exemplary PPS tag 60 may also be an embedded device and come in a plurality of types: (i) a PPS price tag 61 that is placed at a product shelf to display the price for the product next to the tag 61 (e.g., the price tag 61 would be stationary when product is removed from the shelf); and (ii) a PPS product tag 62 placed on an individual product (e.g., the product tag 62 moves as the product moves). An exemplary PPS-IM may further comprise at least one PPS node 50, which may be pre-installed at a known location in the space 1001, and may be substantially the same as PPS nodes described herein. An exemplary PPS-IM may further comprise at least one PPS central node 50A, which may have both BLE (to communicate to PPS nodes 50 and PPS tags 60) and WiFi (or 2G/3G/4G/5G) to communicate with PPS cloud server 2300 over the Internet 1710. An exemplary PPS-IM may further comprise a cloud server 2300 for managing the data and product location map. In an exemplary embodiment, a computer server 3125 for a PPS-IM 3100 may be capable of collecting all product information and location, and then build/update a product location map in real-time.

In a preferred embodiment, a PPS inventory management system 3100 may require to install multiple PPS nodes, multiple PPS price tags, multiple PPS product tags, and multiple PPS central nodes for the good coverage of an inventory house.

According to an exemplary PPS-IM 3100 methodology, in a first step 3150, the system may permit programming of a PPS tag 60. According to this exemplary embodiment, a PPS tag 60 may be either a digital tag (e-Paper, LCD, etc.) or a paper tag. In the event of a paper PPS tag 60, step 3150 may further involve using a hand-held device 68 (e.g., an iPad or portable product scanner) scanning a UPC code of a product and correlating the UPC code with the PPS tag 60. Other examples of the device 68 may include a Smartphone or an embedded device. In further examples the portable device 68 may scan a bar code, have a CPU to run an app program, and/or may communicate with other devices, the indoor positioning system ("IPS"), a computer server, the Internet, etc. In one embodiment, the portable device 68 may scan a product bar code at the product location, obtain product information and placement location information, and then take one or more of the following actions: print out a price tag, display the price on a digital display, and/or send the scanned information to a cloud server database for future use.

In an exemplary second step, which may take place simultaneously with the first step, device 68 may send the product information to a printer 69, which may be attached to device 68. In an exemplary third step, price tag 61a may be printed or otherwise rendered onto a tangible medium. In an exemplary fourth step, the price tag 61a may be placed onto the label on the product to collectively form a PPS tag 61/62. In an exemplary fifth step, the PPS tag 61/62 may engage in (i) location detection; (ii) product information transmission to a UE 20 or server 2300; or both.

In an exemplary embodiment of a PPS-IM system 3100, a PPS tag 60 may have a working mode in which it either transmits or receives signals. Additionally or alternatively, an exemplary PPS tag 60 may have a sleeping mode, during which it may only work in a limited scanning mode every given time period (e.g., it may turn off a BLE transmitter and receiver while not in scanning mode).

Where a PPS tag 60 is located on a shelf 65 (e.g., a PPS price tag 61), it may be able to detect its location in real time by transmitting/receiving a BLE signal to a PPS node 50. The 3D coordinates of an exemplary PPS tag 61 may be obtained with at least 3 PPS nodes as described herein. In an exemplary embodiment, after detecting its location, the PPS tag 62 may report its current location and programmed product information to a PPS server 2300 through a PPS central node 50A (step 3154). Additionally and alternatively, a PPS price tag 60 may automatically detect and report its location (e.g., every time a price tag 60 is programmed (step 3150-3151), the price tag may start to detect its location and report its new location and product info to the PPS server 2300. In an alternative embodiment, a PPS server 2300 may issue a "report location" command to the price tag 62, the tag may detect its current location and report its location and product info to the server, otherwise, the price tag may be kept in sleep mode to save battery.

An exemplary PPS product tag 62 may automatically detect and report its location. An exemplary PPS product tag 62 may comprise an accelerometer sensor or other sensing apparatus or may be without any sensor(s) at all. In those embodiments where an exemplary PPS product tag 62 contains an accelerometer sensor, it automatically detects and reports its new location every time the product moves; for a product tag without accelerometer sensor, the product tag may detect and report its location and the product's identification every configured time period (e.g., a time period configured by PPS server 2300). For example, if a product enters a warning area (e.g., exiting the store), an exemplary PPS product tag 62 may detect its new location and report to PPS server 2300 with a location and/or a warning message and/or remain in a sleep mode to conserve battery life.

In another exemplary embodiment, PPS Server 2300 may request the PPS product tag 62 to detect and report its current location and product information. An exemplary aspect of this embodiment is enabling location of a lost or misplaced product in a space 1001. Another exemplary aspect of this embodiment is to build a product location map dynamically. In a n exemplary embodiment, a PPS-IM System 3100 may automatically build a product location map using a broadcast command to all tags 60/61/62 requesting detection and reporting of current location and product information. In a preferred embodiment, all tags 60/61/62 may detect their location simultaneously. In an exemplary embodiment, upon reception of product and location reports, PPS Server 2300 may build a product location map for the space 1001. In another exemplary embodiment, as some products (or corresponding tags 60/61/62) may be moved about space 1001, an exemplary PPS-IM System 3100 may automatically and/or periodically update the product location map.

In another exemplary embodiment, a PPS-IM System 3100 may detect and alarm if a product/tag 62 leaves the store without authorization. In one aspect of this exemplary embodiment, when a product tag 62 approaches an exit door D and the product tag 62 may be removed by an unauthorized person, the product tag 62 may automatically report the event to server 2300 with an alarm. In another exemplary embodiment, a PPS-IM System 3100 may screen product pre-tagged as it enters space 1001 to determine how much product has come into space 1001 as well as whether the product is authorized to leave the space 1001. In an exemplary embodiment, PPS server 2300 may generate a database of product tags 62 that enter space 1001 over time and create a log of how long the tags 62 are within the space 100. In such an exemplary embodiment, a PPS-IM system 3100 may be able to determine whether certain product needs to be replaced or replenished over time by virtue of the history of existence of tag 62 in space 1001.

In yet another exemplary embodiment, an exemplary PPS-IM System 3100 may detect a product entering a section of a space (e.g., retail store or warehouse) and report a necessary indication to PPS Server 2300 that the new location of product/tag 62 is a hazard.

While in numerous of the foregoing embodiments a PPS or IPS system has been specifically identified, any one or more of the system identified as systems 100/200/300/400/1700/1800/1900/2000/2100/2200/3000/3100 may be combined or interchanged to serve a particular purpose or multiple purposes in accordance with the disclosures herein. Furthermore, any one of the systems, sub-systems, and embodiments may be interchanged, combined, and/or modified in view of any other to achieve the benefits identified as well as those which are inherent from the disclosures contained herein.

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A location node having an operation angle for a space, the location node comprising:
   a processor coupled to at least one transceiver; and
   a plurality of antenna coupled to the at least one transceiver, each of the plurality of antenna has a uniform antenna gain over the same operation angle as the location node, wherein the location node is configured to receive or transmit a plurality of signals within the location node operation angle, wherein the plurality of signals is used to determine a position in the space.

2. A method of determining a position in space, comprising the steps of:
   obtaining signals received or transmitted from the location node of claim 1; and
   communicating the signals received or transmitted to a device or server to determine a position in space.

3. The method of claim 2, wherein the signals are communicated to the device or server first.

4. The method of claim 3, wherein the signals are communicated to the device first.

5. The method of claim 2, wherein the determining of the position in space includes using received signal strength, angle of arrival, angle of departure, time of flight, time division multiplexing of a plurality of data packets by each of the plurality of antenna, simultaneous transmission of a plurality of data packets by each of the plurality of antenna, a wireless protocol, a cloud server, artificial intelligence, GPS, or combinations thereof.

6. The method of claim 2, wherein the position is within one or more of a manufacturing space, storage warehouse, hospital, office building, and retail store.

7. The method of claim 6, wherein the position is one belonging to an object located within in one or more of a manufacturing space, storage warehouse, hospital, office building, and retail store.

8. The method of claim 2, further comprising the step of tracking the position of an object in the space.

9. The method of claim 2, further comprising the step of:
   calculating time or space diversity of estimates for multiple positions over a time; and
   filtering or combining time or space diversities to determine a final position.

10. The location node of claim 1, wherein the space is an enclosed space.

11. The location node of claim 1, wherein the position in space is determined by using received signal strength, angle of arrival, angle of departure, time of flight, time division multiplexing of a plurality of data packets by each of the plurality of antenna, simultaneous transmission of a plurality of data packets by each of the plurality of antenna, a wireless protocol, a cloud server, artificial intelligence, GPS, or combinations thereof.

12. The location node of claim 11, wherein the position is determined using only wireless protocol.

13. The location node of claim 11, wherein the position is determined using a cloud server or artificial intelligence.

14. The location node of claim 13, wherein the cloud server comprises a database comprising information related to an object and information related to the space.

15. A method of locating the object in the space, comprising the steps of:
    identifying the object to be located;
    communicating with the location node of claim 14; and
    generating an electronic map using the database of information related to the space and the information related to the object.

16. A handheld mobile device configured to use the method of claim 15.

17. The handheld mobile device of claim 16, wherein the electronic map displays a position of the handheld mobile device and a position of the object.

18. A downloadable software application configured to enable the method of claim 15 on computing hardware.

19. A method of locating the object in the space, comprising the steps of:
    identifying the object to be located using artificial intelligence;
    communicating with the location node of claim 14; and
    generating an electronic map using the database of information related to the space, the information related to the object, and artificial intelligence.

20. A handheld mobile device configured to use the method of claim 19.

21. The handheld mobile device of claim 20, wherein the electronic map displays a position of the handheld mobile device and a position of the object.

22. A downloadable software application configured to enable the method of claim 19 on computing hardware.

23. The location node of claim 11, wherein the position is determined using only GPS.

24. The location node of claim 11, wherein the cloud server comprises a database comprising information related to an object and information related to the space.

25. A method of locating the object in the space, comprising the steps of:
    identifying the object to be located using GPS;
    connecting the object to the cloud server using a wireless protocol;
    communicating with the location node of claim 24; and
    generating an electronic map using the database of information related to the space and the information related to the object.

26. A handheld mobile device configured to use the method of claim 25.

27. The handheld mobile device of claim 26, wherein the electronic map displays a position of the handheld mobile device and a position of the object.

28. The handheld mobile device of claim 27, wherein the electronic map displays a position of the handheld mobile device and a position of the object.

29. A downloadable software application configured to enable the method of claim 25 on computing hardware.

30. The location node of claim 1, wherein the position in space is determined by using received signal strength.

31. The location node of claim 30, wherein the space is an enclosed space.

32. The location node of claim 31, wherein the position is of an object in one or more of a manufacturing space, storage warehouse, hospital, office building, and retail store.

33. The location node of claim 1, wherein the position in space is determined by using angle of arrival or angle of departure.

34. The location node of claim 33, wherein the space is an enclosed space.

35. The location node of claim 34, wherein the position is of an object in one or more of a manufacturing space, storage warehouse, hospital, office building, and retail store.

36. The location node of claim 1, wherein the position in space is determined by using time division multiplexing of a plurality of data packets by each of the plurality of antenna, simultaneous transmission of a plurality of data packets by each of the plurality of antenna, or combinations thereof.

37. The location node of claim 36, wherein the space is an enclosed space.

38. The location node of claim 37, wherein the position is of an object in one or more of a manufacturing space, storage warehouse, hospital, office building, and retail store.

39. The location node of claim 36, wherein the position in space is determined via an RF switch.

40. The location node of claim 36, wherein the processor encodes a data packet based on which antenna in the plurality of antenna is used to transmit the data packet.

41. The location node of claim 36, wherein the position in space is used to build an electronic map.

42. The location node of claim 41, wherein the processor encodes a data packet based on which antenna in the plurality of antenna is used to transmit the data packet.

43. The location node of claim 1, wherein the position in space is determined by using simultaneous transmission of a plurality of data packets by each of the plurality of antenna.

44. The location node of claim 43, wherein the space is an enclosed space.

45. The location node of claim 44, wherein the position is of an object in one or more of a manufacturing space, storage warehouse, hospital, office building, and retail store.

46. The location node of claim 1, wherein the position is one belonging to a huma or animal.

47. The location node of claim 1, wherein the plurality of signals is used to determine a distance to the position in the space.

48. The location node of claim 47, wherein a distance from the position is determined using received signal strength, angle of arrival, angle of departure, time of flight, time division multiplexing of a plurality of data packets by each of the plurality of antenna, simultaneous transmission of a plurality of data packets by each of the plurality of antenna, a wireless protocol, a cloud server, artificial intelligence, GPS, or combinations thereof.

49. The location node of claim 47, wherein the position is determined using a database.

50. The location node of claim 49, wherein the database comprises information related to an object and information related to the space.

51. A method of locating the object in the space, comprising the steps of:
    identifying the object to be located;
    communicating with the location node of claim 49; and
    generating an electronic map using the database of information related to the space and the information related to the object.

52. A handheld mobile device configured to use the method of claim 51.

53. The handheld mobile device of claim 52, wherein the electronic map displays a position of the handheld mobile device and a position of the object.

54. A downloadable software application configured to enable the method of claim 51 on computing hardware.

55. The method of claim 51, wherein the position is within one or more of a manufacturing space, storage warehouse, hospital, office building, and retail store.

56. The method of claim 55, wherein the position is one belonging to an object located within in one or more of a manufacturing space, storage warehouse, hospital, office building, and retail store.

57. The method of claim 56, further comprising the step of tracking the position of an object in the space.

58. The location node of claim 56, wherein the position is one belonging to a huma or animal.

59. The method of claim 51, further comprising the step of:
calculating time or space diversity of estimates for multiple positions over a time; and
filtering or combining time or space diversities to determine a final position.

60. The location node of claim 1, wherein the position is one belonging to a huma or animal.

61. The location node of claim 1, wherein the position in space is determined by using time of flight.

62. The location node of claim 61, wherein the space is an enclosed space.

63. The location node of claim 62, wherein the position is of an object in one or more of a manufacturing space, storage warehouse, hospital, office building, and retail store.

64. The location node of claim 1, wherein the position in space is determined by using time division multiplexing of a plurality of data packets by each of the plurality of antenna.

65. The location node of claim 64, wherein the space is an enclosed space.

66. The location node of claim 65, wherein the position is of an object in one or more of a manufacturing space, storage warehouse, hospital, office building, and retail store.

67. The location node of claim 64, wherein the position in space is determined via an RF switch.

68. The location node of claim 67, wherein the processor encodes a data packet based on which antenna in the plurality of antenna is used to transmit the data packet.

* * * * *